United States Patent
Fukushige

(10) Patent No.: US 7,939,576 B2
(45) Date of Patent: May 10, 2011

(54) ANTIREFLECTION FILM, PROCESS OF PRODUCING THE SAME, AND POLARIZING PLATE AND DISPLAY DEVICE INCLUDING THE SAME

(75) Inventor: Yuuichi Fukushige, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 1136 days.

(21) Appl. No.: 11/604,226

(22) Filed: Nov. 27, 2006

(65) Prior Publication Data

US 2007/0217014 A1 Sep. 20, 2007

(30) Foreign Application Priority Data

Nov. 25, 2005 (JP) ............................... P2005-340630

(51) Int. Cl.
*C08F 2/50* (2006.01)
*G02B 1/00* (2006.01)
(52) U.S. Cl. ............................ 522/6; 349/137; 359/586
(58) Field of Classification Search .................. 359/586; 349/137; 522/6
See application file for complete search history.

(56) References Cited

U.S. PATENT DOCUMENTS

| 6,033,743 A * | 3/2000 | Suzuki et al. ............... 428/1.31 |
| 6,950,236 B2 * | 9/2005 | Hokazono et al. ............ 359/586 |
| 7,212,341 B2 * | 5/2007 | Ikeyama ..................... 359/582 |
| 2005/0154086 A1 * | 7/2005 | Yoneyama ................... 523/213 |
| 2006/0057307 A1 * | 3/2006 | Matsunaga et al. .......... 428/1.31 |
| 2006/0216438 A1 * | 9/2006 | Nishimura et al. .......... 428/1.31 |

FOREIGN PATENT DOCUMENTS

| JP | 9-169847 A | 6/1997 |
| JP | 11-189621 A | 7/1999 |
| JP | 11-228631 A | 8/1999 |
| JP | 2000-313709 A | 11/2000 |
| WO | WO 2004017105 A1 * | 2/2004 |

OTHER PUBLICATIONS

George Odian, "Principles of Polymerization" John Wiley & Sons, Inc., 1991, p. 223 plus two cover pages.*

* cited by examiner

*Primary Examiner* — Randy Gulakowski
*Assistant Examiner* — Robert Loewe
(74) *Attorney, Agent, or Firm* — Buchanan Ingersoll & Rooney PC

(57) ABSTRACT

An antireflection film comprising a transparent support, a hard coat layer and a low refractive index layer, wherein the low refractive index layer is formed with a composition containing a binder polymer, a polymerization initiator and an ethylenically unsaturated group-containing hardenable compound.

17 Claims, 7 Drawing Sheets

ANTIREFLECTION FILM, PROCESS OF PRODUCING THE SAME, AND POLARIZING PLATE AND DISPLAY DEVICE INCLUDING THE SAME

FIELD OF THE INVENTION

The present invention relates to an antireflection film having more improved scar resistance in spite of low reflectance and a process of producing the same. In particular, the invention relates to an antireflection film which is used for a display device such as liquid crystal display devices and a process of producing the same.

BACKGROUND OF THE INVENTION

In applications of adhesives, exterior paints, hard coats, antireflection layers, and so on in which an organic material or inorganic material is blended, investigations for improving the scar resistance, the strength of a hardened material, the adhesion to other raw material to be contacted, and so on have been made.

Above all, in a combination with an organic material of a polymerization hardening system, a polymerization group-containing alkoxysilane and/or a hydrolyzate thereof is being watched. For example, JP-A-9-169847 proposes a joint use of a specified polyalkoxypolysiloxane and a polymerizable silane coupling agent.

On the other hand, in general, in display devices such as a cathode ray tube display device (CRT), a plasma display (PDP), an electroluminescence display (ELD), and a liquid crystal display device (LCD), for the purpose of preventing a lowering of contrast or reflection of an image due to the reflection of external light, an antireflection film is arranged on the outermost surface of a display device so as to reduce a reflectance by using a principle of optical interference.

Such an antireflection film can be prepared by forming a high refractive index layer such as a hard coat layer on a support and further forming a low refractive index layer having an appropriate thickness thereon. In order to realize a low reflectance, it is desired to use a material having a low refractive index as far as possible for the low refractive index layer. Also, since the antireflection film is used for the outermost surface of a display device, in many cases, the low refractive index layer which becomes an uppermost layer is required to have high scar resistance. However, in the low refractive index layer which is a thin film having a thickness of about 100 nm, in order to realize high scar resistance, the film itself must have strength by itself and adhesion to a lower layer.

In order to decrease the refractive index of a layer, there are measures such as (1) introduction of a fluorine atom and (2) decrease of density (introduction of voids). However, in all of these measures, the film strength or adhesion is deteriorated so that the scar resistance tends to be lowered. Thus, it was a difficult problem to make low refractive index and high scar resistance compatible with each other.

For example, JP-A-11-189621, JP-A-11-228631 and JP-A-2000-313709 describe a measure for lowering a friction coefficient of a film surface to improve the scar resistance by introducing a polysiloxane structure in a fluorine-containing polymer.

SUMMARY OF THE INVENTION

In the technology of JP-A-9-169847, since the reaction between the polyalkoxypolysiloxane and the polymerizable silane coupling agent does not sufficiently proceed and a degree of introduction of the polymerizable group is low, the scar resistance and strength of a hardened material are not sufficient.

In the technologies of JP-A-11-189621, JP-A-11-228631 and JP-A-2000-313709, though the disclosed measure is effective for improving the scar resistance to some extent, sufficient scar resistance cannot be obtained only by this measure against films having substantially insufficient film strength and interface adhesion.

On the other hand, as one of measures for increasing the film strength, there is a method of introducing an inorganic filler in a low refractive index layer. When an inorganic fine particle with a low refractive index is applied as a filler, it becomes possible to increase the film strength without increasing the refractive index of the layer itself. However, by the introduction of an inorganic filler, it is difficult to obtain adhesion to a lower layer, and the scar resistance is not sufficient yet.

An object of the invention is to provide an antireflection film having not only sufficient antireflection performance but also improved scar resistance and a process of producing the subject antireflection film. In particular, the invention is aimed to provide an inexpensive process of producing such an antireflection film. A further object of the invention is to provide a polarizing plate and a display device each provided with such an antireflection film.

The present inventors have found that by localizing a polymerization initiator and an ethylenically unsaturated group-containing hardenable compound in a lower part of a low refractive index layer, a great effect such that rapid hardening is achieved, thereby improving scar resistance is obtained, leading to accomplishment of the invention.

That is, according to the invention, the foregoing objects have been achieved by the following constructions.

(1) An antireflection film comprising a transparent support having thereon at least a hard coat layer and a low refractive index layer, with the low refractive index layer being formed with a composition for forming a low refractive index layer containing a binder polymer, at least one polymerization initiator and an ethylenically unsaturated group-containing hardenable compound.

(2) The antireflection film as set forth above in (1), wherein the polymerization initiator and the hardenable compound are localized and hardened in a lower part of the low refractive index layer.

(3) The antireflection film as set forth above in (1) or (2), wherein the polymerization initiator is a thermally decomposable and/or photodecomposable initiator.

(4) The antireflection film as set forth above in any one of (1) to (3), wherein the binder polymer is a thermally hardenable and/or ionizing radiation hardenable fluorine-containing polymer, and the hardenable compound is a non-fluorine compound.

(5) The antireflection film as set forth above in any one of (1) to (4), wherein an SP value of each of the polymerization initiator and the hardenable compound is larger than that of the binder polymer.

(6) The antireflection film as set forth above in any one of (1) to (5), the hardenable compound is a hydrolyzate of an organosilane and/or a partial condensate thereof.

(7) The antireflection film as set forth above in any one of (1) to (6), wherein the low refractive index layer contains a compound in which the hardenable compound and a polymerization initiation of the polymerization initiator are intramolecularly connected to each other.

(8) The antireflection film as set forth above in any one of (1) to (7), wherein the low refractive index layer further contains an inorganic filler selected from a silica particle and a hollow silica particle.
(9) A process of producing an antireflection film as set forth above in any one of (1) to (8) including a transparent support having thereon at least a hard coat layer and a low refractive index layer, which comprises coating a composition for forming a low refractive index layer, drying and then hardening upon irradiation with ionizing radiations under an atmosphere having an oxygen concentration of not more than 3% by volume, thereby forming an antireflection film.
(10) The process of producing an antireflection film as set forth above in (9), wherein the composition for forming a low refractive index layer is coated, dried, thermally hardened and then hardened upon irradiation with ionizing radiations under an atmosphere having an oxygen concentration of not more than 3% by volume, thereby forming an antireflection film.
(11) A polarizing plate, wherein the antireflection film as set forth above in any one of (1) to (8) or the antireflection film produced by the process as set forth above in (9) or (10) is used in at least one of two protective films of a polarizing film in a polarizing plate.
(12) A display device having the antireflection film as set forth above in any one of (1) to (8), the antireflection film produced by the process as set forth above in (9) or (10) or the polarizing plate as set forth above in (11), with the low refractive index layer being arranged in a viewing side.

Furthermore, the following embodiments are preferable, too in the invention.
(13) The antireflection film as set forth above in (8), wherein the inorganic filler is a silica particle or a hollow silica particle each having been subjected to a surface treatment with an organosilane compound represented by the following formula (a).

$(R^{11})_{m1}$—$SiX^{11}_{4-m1}$     Formula (a)

In the formula, $R^{11}$ represents a substituted or unsubstituted alkyl group or a substituted or unsubstituted aryl group; $X^{11}$ represents a hydroxyl group or a hydrolyzable group; and m1 represents an integer of from 0 to 3.
(14) The antireflection film as set forth above in (13), wherein the substituent $R^{11}$ of the organosilane compound represented by the formula (a) is a (meth)acryloyl group or an epoxy group-containing group.

According to the invention, it is possible to produce an antireflection film having not only sufficient antireflection performance but also more improved scar resistance by an inexpensive production process. Also, according to the production process of the invention, it is possible to stably obtain such an antireflection film in high productivity. In addition, the display device provided with the antireflection film or polarizing plate as produced by the invention has characteristic features such that the reflection of external light or the reflection of the background is small and that the visibility is extremely high.

DESCRIPTION OF REFERENCE NUMERALS AND SIGNS

Figure 1:
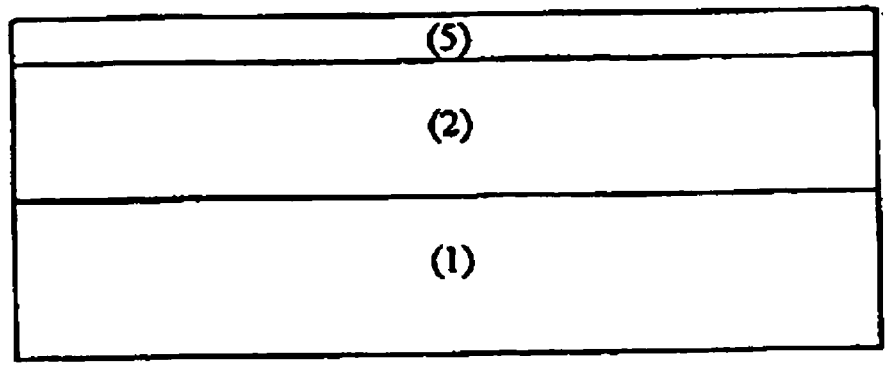
FIG. 1 is an outline sectional view to schematically show a preferred embodiment of the antireflection film of the invention.

1: Support
2: Hard coat layer
3: Middle refractive index layer
4: High refractive index layer
5: Low refractive index layer
10: Coater
11: Backup roll
W: Web
13: Slot die
14: Coating solution
14a: Bead
14b: Coating film
15: Pocket
16: Slot
16a: Slot opening
17: Tip lip
18: Land
18a: Upstream side lip land
18b: Downstream side lip land
$I_{UP}$: Land length of upstream side lip land 18a
$I_{LO}$: Land length of downstream side lip land 18b
LO: Overbyte length (difference in distance between downstream side lip land 18b and upstream side lip land 18a from web W)
$G_L$: Gap between tip lip 17 and web W (gap between downstream side lip land 18b and web W)
30: Conventional slot die
31a: Upstream side lip land
31b: Downstream side lip land
32: Pocket
33: Slot
40: Vacuum chamber
40a: Back plate
40b: Side plate
40c: Screw
$G_B$: Gap between back plate 40a and web W
$G_S$: Gap between side plate 40b and web W

DETAILED DESCRIPTION OF THE INVENTION

The invention will be hereunder described in more detail. Incidentally, in this specification, in the case where a numeral value exhibits a physical property value, a characteristic value or the like, the terms "from (numeral value 1) to (numeral value 2)" means "(numeral value 1) or more and not more than (numeral value 2)". Also, the term "polymerization" referred to in the invention includes copolymerization, too. In addition, it is meant by the terms "on the support" as referred to in the invention that both the case of a direct surface of the subject support and the case of a surface provided with some layer (film) on the subject support are included.

<Antireflection Film>

[Layer Configuration of Antireflection Film]

The antireflection film of the invention has a hard coat layer as described later on a transparent support (hereinafter often referred to as "substrate" or "substrate film") and further an antireflection layer as stacked thereon so as to reduce the reflectance due to optical interference while taking into consideration the refractive index, the thickness, the number of layers, the order of layers, and so on. As the simplest configuration of the subject antireflection layer, a configuration in which a hard coat layer having a higher refractive index than that of a substrate film and a low refractive index layer having a lower refractive index than that of a substrate are combined is preferable. As configuration examples, there are proposed a configuration in which a hard coat layer is provided on a substrate film and a low refractive index layer is further provided thereon; a configuration in which a hard coat layer is provided on a substrate film and two layers of a high refractive index layer and a low refractive index layer are further provided thereon; and a configuration in which three layers having a different refractive index from each other, namely a middle refractive index layer (a layer having a higher refractive index than that of a substrate film or a hard coat layer and having a lower refractive index than that of a high refractive index layer), a high refractive index layer and a low refractive index layer are stacked in this order. In addition, a number of configurations in which an antireflection layer is stacked are also proposed. Furthermore, the antireflection film of the invention may have a functional layer such as an antiglare layer and an antistatic layer.

Preferred examples of the configuration of the antireflection film of the invention will be given below. Outline views are illustrated in FIGS. 1 to 5.

(a) Transparent support/hard coat layer/low refractive index layer (see FIG. 1)

Figure 2:
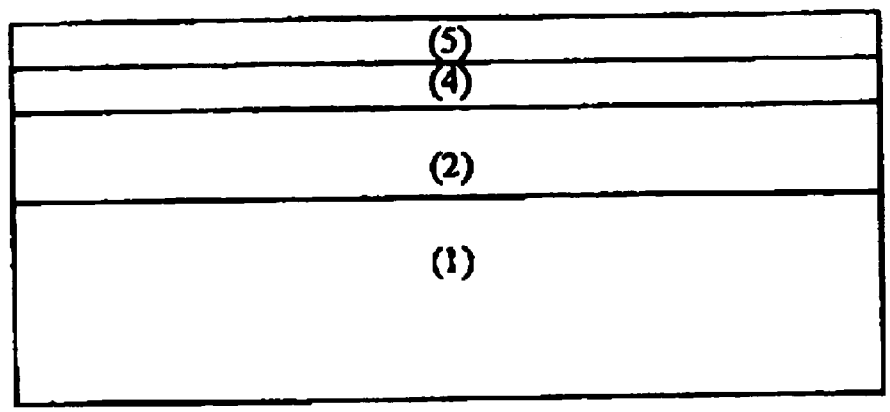
FIG. 2 is an outline sectional view to schematically show other preferred embodiment of the antireflection film of the invention.

(b) Transparent support/hard coat layer/antiglare layer/low refractive index layer (c) Transparent support/hard coat layer/high refractive index layer/low refractive index layer (see FIG. 2)

Figure 3:
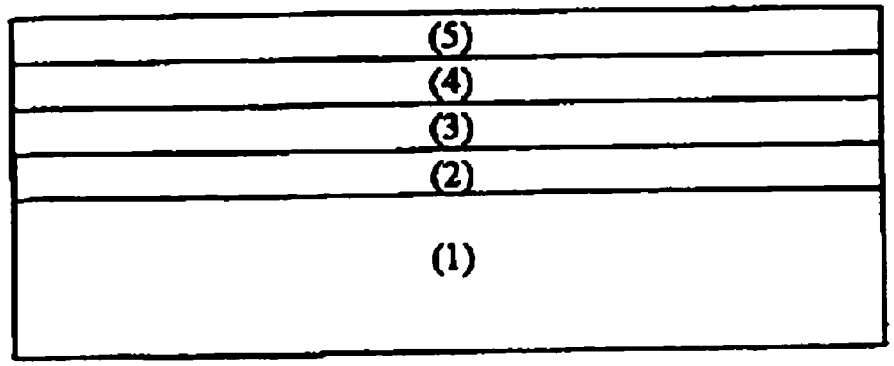
FIG. 3 is an outline sectional view to schematically show a still other preferred embodiment of the antireflection film of the invention.

(d) Transparent support/hard coat layer/middle refractive index layer/high refractive index layer/low refractive index layer (see FIG. 3)

(e) Transparent support/antistatic layer/hard coat layer/middle refractive index layer/high refractive index layer/low refractive index layer (f) Antistatic layer/transparent support/hard coat layer/middle refractive index layer/high refractive index layer/low refractive index layer As in the foregoing (a) (see FIG. 1), by stacking a low refractive index layer (5) on a hard coat layer (2) having been coated on a transparent support (1), it is possible to suitably use the stack as the antireflection film. By forming the low refractive index layer (5) in a thickness of approximately ¼ of the wavelength of light on the hard coat layer (2), it is possible to reduce the surface reflection due to a principle of thin film interference.

Furthermore, as in (c) (see FIG. 2), by stacking a high refractive index layer (4) and a low refractive index layer (5) on a hard coat layer (2) having been coated on a transparent support (1), it is also possible to suitably use the stack as the antireflection film. In addition, as in (d) (see FIG. 3), by setting up a layer configuration of a transparent support (1), a hard coat layer (2), a middle refractive index layer (3), a high refractive index layer (4), and a low refractive index layer (5) in this order, it is possible to keep a reflectance at not higher than 1%.

Figure 4:
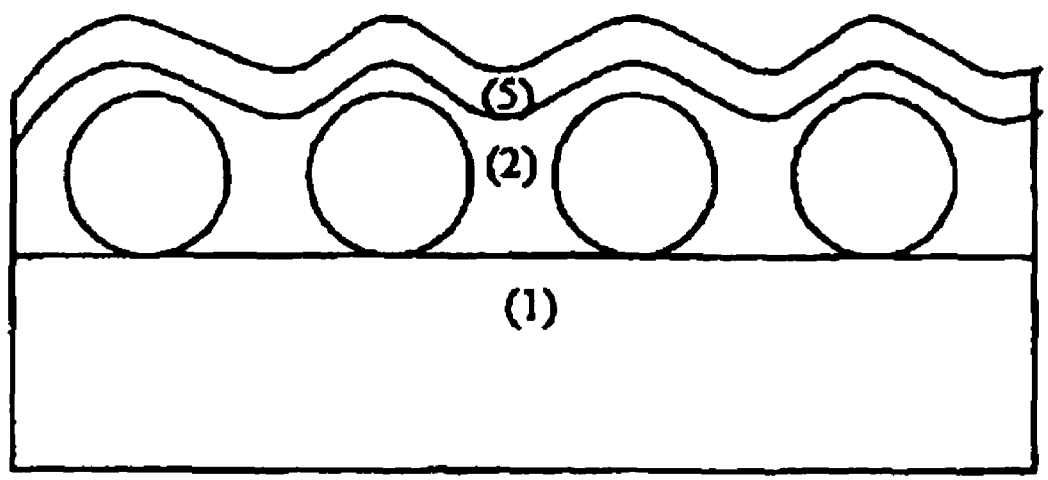
FIG. 4 is an outline sectional view to schematically show a preferred embodiment of the antireflection film having an antiglare hard coat layer of the invention.
Figure 5:
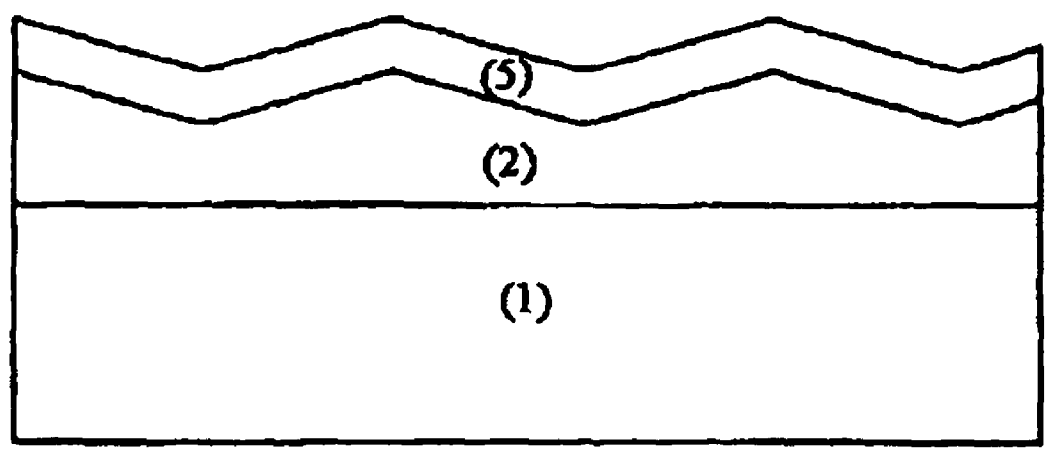
FIG. 5 is an outline sectional view to schematically show other preferred embodiment of the antireflection film having an antiglare hard coat layer of the invention.

In the foregoing configurations (a) to (f) of the antireflection film, the hard coat layer (2) can be formed as an antiglare hard coat layer having antiglare properties. The antiglare properties may be provided by dispersing a mat particle as illustrated in FIG. 4, or may be provided by shaping the surface by a method such as embossing as illustrated in FIG. 5. An antiglare hard coat layer which is formed by dispersing the mat particle is made of a binder and a translucent particle as dispersed in the binder. The antiglare hard coat layer has both antiglare properties and hard coat properties. The hard coat layer may be made of by plural layers such as an antiglare hard coat layer and a smooth hard coat layer. Furthermore, an antiglare layer may be provided separately from the hard coat layer.

Furthermore, examples of a layer which may be provided between a support and a layer in the side of the surface or on the outermost surface include a layer for preventing interference unevenness (spectral unevenness), an antistatic layer (in the case where requirements such as reduction of the surface resistivity value from the display side are presented or in the case where staining on the surface or the like becomes problematic), other hard coat layer (in the case where the hardness is insufficient only by the hard coat layer or antiglare hard coat layer made of a single layer), a gas barrier layer, a water absorbing layer (moisture-proof layer), an adhesiveness improving layer, and an antifouling layer (anti-contamination layer).

It is preferable that the refractive index of each of the layers which constitute the antireflection film having an antireflection layer in the invention meets the following relationship.

(Refractive index of hard coat layer)>(Refractive index of transparent support)>(Refractive index of low refractive index layer)

So far as the reflectance can be reduced due to optical interference, it should be construed that the antireflection film of the invention is not particularly limited only to these layer configurations.

The high refractive index layer may be a light diffusible layer having no antiglare properties. Furthermore, the antistatic layer is preferably a layer containing a conductive polymer particle or a metal oxide fine particle (for example, $SnO_2$ and ITO) and can be provided by coating, treating with an atmospheric-pressure plasma, or the like.

[Hard Coat Layer]

The antireflection film of the invention has a hard coat layer on a transparent support and further has a low refractive index layer thereon. In addition, the antireflection film of the invention can also be formed as an antireflection film in which the subject hard coat layer is an antiglare hard coat layer corresponding to the required performance. In the antireflection film of the invention, for the purpose of improving the film strength, a hard coat layer having no antiglare properties can be further provided in a lower layer of the antiglare hard coat layer.

[Binder Polymer]

The binder which is used in the hard coat layer is preferably a polymer containing a saturated hydrocarbon chain or a polyether chain as a principal chain thereof, and more preferably a polymer containing a saturated hydrocarbon chain as a principal chain thereof. Furthermore, it is preferable that the binder polymer has a crosslinking structure.

(Binder Polymer Containing a Saturated Hydrocarbon Chain as a Principal Chain Thereof)

The binder polymer containing a saturated hydrocarbon chain as a principal chain thereof is preferably a polymer of an ethylenically unsaturated monomer. The binder polymer containing a saturated hydrocarbon chain as a principal chain thereof and having a crosslinking structure is preferably a (co)polymer of a monomer containing two or more ethylenically unsaturated groups.

In order to make the layer have a high refractive index, it is preferable that an aromatic ring or at least one atom selected from a halogen atom other than fluorine, a sulfur atom, a phosphorus atom and a nitrogen atom is contained in the structure of this monomer.

Examples of the monomer containing two or more ethylenically unsaturated groups include (meth)acrylic esters of a polyhydric alcohol [for example, ethylene glycol di(meth) acrylate, 1,4-cyclohexanediol di(meth)acrylate, pentaerythritol tetra(meth)acrylate, pentaerythritol tri(meth)acrylate, trimethylolpropane tri-(meth)acrylate, trimethylolethane tri (meth)acrylate, dipentaerythritol tetra(meth)acrylate, dipentaerythritol penta(meth)acrylate, dipentaerythritol hexa(meth)acrylate, 1,2,3-cyclohexanetriol tri(meth)acrylate, polyurethane polyacrylate, and polyester polyarylates], ethylene oxide modified compounds of an ester, vinylbenzene and derivatives thereof [for example, 1,4-divinylbenzene, 2-(meth)acryloylethyl 4-vinylbenzoate, and 1,4-divinylcyclohexanone], vinylsulfones (for example, divinylsulfone), and (meth)acrylamides (for example, methylenebis-acrylamide). Two or more kinds of such a monomer may be used together.

Specific examples of a high refractive index monomer include bis-(4-methacryloylthiophenyl) sulfide, vinylnaphthalene, vinylphenyl sulfide, and 4-methacryloxyphenyl-4'-methoxyphenyl thioether. Two of more kinds of such a monomer may be used together.

The crosslinking structure may be introduced into the binder polymer by using a monomer containing a crosslinking functional group in place of, or in addition to, the monomer containing two or more ethylenically unsaturated groups, thereby introducing a crosslinking functional group into the polymer and then making this crosslinking group to react.

Examples of the crosslinking functional group include an isocyanate group, an epoxy group, an aziridine group, an oxazoline group, an aldehyde group, a carbonyl group, a hydrazine group, a carboxyl group, a methylol group, and an active methylene group. Vinylsulfonic acid, acid anhydrides, cyano acrylate derivatives, melamine, etherified methylol, esters and urethanes, and metal alkoxides such as tetra-methoxysilane can also be used as the monomer for introducing a crosslinking structure. A functional group exhibiting crosslinking properties as a result of decomposition reaction, such as a block isocyanate group, may be used. That is, in the invention, the crosslinking functional group may be a crosslinking functional group which does not immediately exhibit reactivity but exhibits reactivity as a result of decomposition.

After coating, the binder polymer containing such a crosslinking functional group is able to form a crosslinking structure by heating.

(Polymerization Initiator)

The polymerization of such an ethylenically unsaturated group-containing monomer can be carried out by irradiation with ionizing radiations or heating in the presence of a photo radical initiator or a heat radical initiator. Accordingly, the hard coat layer of the antireflection film can be formed by preparing a coating solution containing an ethylenically unsaturated group-containing monomer, a photo radical initiator or a heat radical initiator, an inorganic filler, and optionally a mat particle, coating the subject coating solution on a transparent support and then hardening it due to a polymerization reaction by ionizing radiations or heat.

<Photo Radical Polymerization Initiator>

Examples of the photo radical polymerization initiator include acetophenones, benzoins, benzophenones, phosphine oxides, ketals, anthraquinones, thioxanthones, azo compounds, peroxides (for example, ones described in JP-A-2001-139663), 2,3-dialkyldione compounds, disulfide compounds, fluoroamine compounds, aromatic sulfoniums, onium salts, borate salts, and active halides.

Examples of the acetophenones include 2,2-diethoxyacetophenone, p-dimethylacetophenone, 1-hydroxydimethylphenyl ketone, 1-hydroxy-cyclohexylphenyl ketone, 2-methyl-4-methylthio-2-morpholinopropiophenone, and 2-benzyl-2-dimethylamino-1-(4-morpholinophenyl)butanone.

Examples of the benzoins include benzoin benzenesulfonic acid ester, benzoin toluenesulfonic acid ester, benzoin methyl ether, benzoin ethyl ether, and benzoin isopropyl ether.

Examples of the benzophenones include benzophenone, 2,4-dichlorobenzo-phenone, 4,4-dichlorobenzophenone, and p-chlorobenzophenone. Examples of the phosphine oxide include 2,4,6-trimethylbenzoyl diphenylphosphine oxide.

A variety of examples are also described in *Saishin UV Koka Gijutsu* (Latest UV Curing Technologies) (page 159, issuer: Kazuhiro Takasusuki, publishing office: Technical Information Institute Co., Ltd., published in 1991) and *Shigaisen Koka Shisutemu* (Ultraviolet Ray Curing Systems) (written by Kiyoshi Kato and published by Sogo Gijutsu Center, pages 65 to 148 (1989)) and are useful in the invention.

As a commercially available photo cleavage type photo radical polymerization initiator, IRGACURE Series (trade names as manufactured by Nihon Ciba-Geigy K. K. (for example, 651, 184 and 907)) are preferably enumerated.

The photo radical polymerization initiator is preferably used in an amount in the range of from 0.1 to 15 parts by weight, and more preferably in the range of from 1 to 10 parts by weight based on 100 parts by weight of the polyfunctional monomer.

(Photosensitizer)

In addition to the photo polymerization initiator, a photosensitizer may be used. Specific examples of the photosensitizer include n-butylamine, triethylamine, tri-n-butyl phosphine, Michler's ketone, and thioxanthone.

(Heat Radical Initiator)

As the heat radical initiator, organic or inorganic peroxides, organic azo or diazo compounds, and so on can be used.

Concretely, examples of the organic peroxides include benzoyl peroxide, halogen benzoyl peroxides, lauroyl peroxide, acetyl peroxide, dibutyl peroxide, cumene hydroperoxide, and butyl hydroperoxide; examples of the inorganic peroxides include hydrogen peroxide, ammonium persulfate, and potassium persulfate; examples of the azo compounds include 2,2'-azobis(isobutyronitrile), 2,2'-azobis(propionitrile), and 1,1'-azobis(cyclohexanedinitrile); and examples of the diazo compounds include diazoaminobenzene and p-nitrobenzene diazonium.

(Binder Polymer Containing a Polyether Chain as a Principal Chain Thereof)

The polymer containing a polyether as a principal chain thereof is preferably a ring-opened polymer of a polyfunctional epoxy compound. The ring opening polymerization of a polyfunctional epoxy compound can be carried out upon irradiation with ionizing radiations or by heating in the presence of a photo acid generator or a heat acid generator.

Accordingly, the hard coat layer can be formed by preparing a coating solution containing a polyfunctional epoxy compound, a photo acid generator or a heat acid generator, a mat particle and an inorganic filler, coating the subject coating solution on a transparent support and then hardening it by a polymerization reaction by ionizing radiations or heat.

[Inorganic Filler]

It is preferable that an inorganic filler is added in the respective layers to be formed on the support inclusive of the hard coat layer. The inorganic fillers which are added in the respective layers may be the same or different. It is preferable that the kind and addition amount of the inorganic filler are adjusted depending upon required performances such as refractive index, film strength, film thickness, and coating properties of each layer.

The shape of the inorganic filler which is used in the invention is not particularly limited, and, for example, any of a spherical, plate-like, fibrous, rod-like, amorphous or hollow shape is preferably employed. Of these, a spherical shape is more preferable from the viewpoint of good dispersibility.

Furthermore, the kind of the inorganic filler is not particularly limited, and an amorphous inorganic filler is preferably used. An inorganic filler made of a metal oxide, nitride, sulfide or halide is preferable, and an inorganic filler made of a metal oxide is especially preferable. Examples of metal atoms include Zr, Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb, and Ni.

In order to obtain a transparent hardened film, an average particle size of the inorganic filler is preferably a value falling within the range of from 0.001 to 0.2 µm, more preferably from 0.001 to 0.1 µm, and further preferably from 0.001 to 0.06 µm. Here, the average particle size of the particle is measured by a Coulter counter.

In the inorganic filler, the surface thereof is preferably subjected to a silane coupling treatment or a titanium coupling treatment. In this case, a surface treating agent containing a functional group capable of reacting with a binder species on the filler surface is preferably used.

The addition amount of the inorganic filler is preferably from 10 to 90%, more preferably from 20 to 80%, and especially preferably from 30 to 75% of the total weight of the hard coat layer. In any case of an antiglare hard coat layer and a smooth hard coat layer as described later, the addition amount of the inorganic filler can be properly selected within the same range of the use amount.

Incidentally, since such an inorganic filler does not cause scattering because its particle size is sufficiently small as compared with the wavelength of light, a dispersion having the subject filler dispersed in a binder polymer acts as an optically uniform substance.

The use method of the inorganic filler in the invention is not particularly limited. For example, the inorganic filler can be used in a dried state or can be used in a state that it is dispersed in water or an organic solvent.

[Dispersion Stabilizer]

In the invention, for the purpose of inhibiting coagulation or sedimentation of the inorganic filler, it is also preferable that a dispersion stabilizer is used jointly. Examples of the dispersion stabilizer which can be used include polyvinyl alcohol, polyvinylpyrrolidone, cellulose derivatives, polyamides, phosphoric esters, polyethers, surfactants, hydrolyzates of an organosilane compound and/or partial condensates thereof, silane coupling agents, and titanium coupling agents. Of these, silane coupling agents are especially preferable because a film after hardening is strong.

Though the addition amount of the silane coupling agent as the dispersion stabilizer is not particularly limited, for example, a value of 1 part by weight or more based on 100 parts by weight of the inorganic filler is preferable. Furthermore, the addition method of the silane coupling agent as the dispersion stabilizer is not particularly limited. However, for example, a method of adding a previously hydrolyzed silane coupling agent can be used; and a method in which after mixing a silane coupling agent as the dispersion stabilizer and an inorganic filler, the mixture is further hydrolyzed and condensed can be employed. Of these, the latter is more preferable.

As described previously, a hydrolyzate of an organosilane compound and/or a partial condensate of the hydrolyzate can be used as a dispersion stabilizer of the inorganic filler. Besides, a hardenable compound of a composition for forming a low refractive index layer as described later or the like can be used as an additive at the time of preparing a coating solution as a part of a matrix constituting component of each layer. In particular, it is preferred to use a hydrolyzate of a specified organosilane compound and/or a partial condensate of the hydrolyzate in the low refractive index layer, and details of this will be described later.

[Antiglare Hard Coat Layer]

Next, the antiglare hard coat layer which is preferably used in the invention will be described. The antiglare hard coat layer is formed of a binder for imparting hard coat properties, a mat particle for imparting antiglare properties, an inorganic filler for realizing a high refractive index, preventing crosslinking shrinkage and realizing a high strength, and the like.

(Mat Particle)

For the purpose of imparting antiglare properties, the antiglare hard coat layer contains a mat particle having a larger particle size than a coagulating silica particle or a filler particle and having an average particle size of from 1.0 to 10.0 µm, and preferably from 1.5 to 7.0 µm, for example, particles of an inorganic compound or translucent resin particles.

As a specific example of the foregoing mat particle, there are preferably enumerated particles of an inorganic compound (for example, a silica particle and a $TiO_2$ particle); and resin particles (for example, a crosslinked acrylic resin particle, a crosslinked styrene resin particle, a melamine resin particle, and a benzoguanamine resin particle).

Though the silica particle may be a spherical particle having a primary particle size of from 0.5 to 10 µm, coagulating silica in which particles having a primary particle size of several tens nm form a coagulate is especially preferable for preventing whitening from occurring.

The coagulating silica can be obtained by a so-called wet method for synthesis by a neutralizing reaction of sodium silicate and sulfuric acid, but it should not be construed that the invention is limited thereto.

The wet method is further roughly classified into a sedimentation method and a gelation method, and all of these methods may be employed in the invention.

A secondary particle size of the coagulating silica is preferably in the range of from 0.1 to 10.0 µm.

In particular, a value obtainable by dividing the secondary particle size of the coagulating silica particle by the thickness of the hard coat layer is preferably from 0.1 to 1.0, and more preferably from 0.3 to 0.8.

The translucent resin particle which can be used jointly with the foregoing silica particle, and preferably the coagulating silica particle will be hereunder described.

As specific examples of the translucent resin particle which can be used jointly, there are preferably enumerated resin particles such as a poly((meth)acrylate) particle, a crosslinked poly((meth)acrylate) particle, a polystyrene particle, a crosslinked polystyrene particle, a crosslinked poly(acryl-styrene) particle, a melamine resin particle, a benzoguanamine resin particle. Of these, a crosslinked polystyrene particle, a crosslinked poly((meth)acrylate) particle, and a crosslinked poly(acryl-styrene) particle are preferable; and in particular, a crosslinked poly((meth)acrylate) particle and a crosslinked poly(acryl-styrene) particle are the most preferable. By adjusting the refractive index and addition amount of the translucent resin adaptive to each translucent fine particle selected among these particles, it is possible to make each of an internal haze and a surface haze fall within a desired range.

An average particle size of the translucent resin particle which can be used jointly is preferably from 0.5 to 10 µm, and more preferably from 2.0 to 6.0 µm.

In order to improve the scar resistance, the translucent resin particle which can be used jointly preferably has a compression strength of from 2.2 to 10.0 kgf/mm$^2$, and more preferably from 2.5 to 8.0 kgf/mm$^2$. In order to enhance the compression strength of the resin particle, it is effective to select a crosslinking agent or to enhance a degree of crosslinking.

With respect to the shape of the mat particle, all of a truly spherical shape and an amorphous shape can be used. Furthermore, two or more kinds of different mat particles may be used jointly.

The foregoing mat particle is contained in the antiglare hard coat layer such that an amount of the mat particle in the formed antiglare hard coat layer is preferably from 10 to 1,000 mg/m$^2$, and more preferably from 30 to 100 mg/m$^2$.

Furthermore, an especially preferred embodiment is an embodiment in which a crosslinked styrene resin particle is used as the mat particle and a crosslinked styrene resin particle having a particle size larger than ½ of the thickness of the antiglare hard coat layer accounts for from 40 to 100% of the whole of the subject crosslinked styrene particles.

Here, the particle size distribution of the mat particle is measured by a Coulter counter, and a measured distribution is converted into a particle number distribution.

Furthermore, two or more kinds of mat particles having a different particle size from each other may be used jointly.

It is possible to impart antiglare properties by a mat particle having a larger particle size or to impart a separate optical characteristic by a mat particle having a smaller particle size. For example, in the case where an antireflection film is stuck onto a high-definition display device of 133 dpi or more, it is required that a fault on the optical performance called as reflection is not caused. This is caused due to the matter that pixels are enlarged or contracted due to irregularities delicately present on the film surface, thereby loosing the uniformity of display performance. However, this can be largely improved by jointly using a mat particle having a particle size of from 5 to 50% smaller than that of a mat particle capable of imparting antiglare properties.

In addition, the particle size distribution of the foregoing mat particle is preferably monodispersed, and it is desired that the particle size of the whole of particles is closed to the same particle size as far as possible. For example, in the case where a particle having a particle size different from the average particle size by 20% or more is defined as a coarse particle, a proportion of this coarse particle is preferably not more than 1%, more preferably not more than 0.1%, and further preferably not more than 0.01% of the whole number of particles. The mat particle having such a particle size distribution is obtained by classification after a usual synthesis reaction. By increasing the number of classification or strengthening its degree, it is possible to obtain a mat particle having a more preferred distribution.

(Inorganic Filler)

In order to enhance the refractive index of the layer, it is preferable that the antiglare hard coat layer contains an inorganic filler which is made of at least one oxide of a metal selected from titanium, zirconium, aluminum, indium, zinc, tin and antimony and which preferably has an average particle size in the range of from 0.001 to 0.2 µm, more preferably from 0.001 to 0.1 µm, and further preferably from 0.001 to 0.06 µm, in addition to the foregoing mat particle.

Conversely, in the antiglare hard coat layer using a mat particle with a high refractive index for the purpose of increasing a difference of the refractive index from the mat particle, it is also possible to use an oxide of silicon for the purpose of keeping the refractive index of the layer in a low level. A preferred particle size is the same as in the foregoing inorganic filler.

Specific examples of the inorganic filler which is used in the antiglare hard coat layer include $TiO_2$, $ZrO_2$, $Al_2O_3$, $In_2O_3$, $ZnO$, $SnO_2$, $Sb_2O_3$, ITO (indium tin oxide), and $SiO_2$. Of these, $TiO_2$ and $ZrO_2$ are especially preferable in view of realizing a high refractive index. In such an inorganic filler, it is preferable that its surface is subjected to a silane coupling treatment or a titanium coupling treatment, and a surface treating agent containing a functional group capable of reacting with a binder on the filler surface is preferably used.

Incidentally, in such an inorganic filler, since its particle size is thoroughly small as compared with the wavelength of light, scattering is not generated, and a dispersion having the subject filler dispersed in a binder polymer acts as an optically uniform substance.

A refractive index of the total sum of the mixture of the binder and the inorganic filler of the antiglare hard coat layer in the antireflection film of the invention is preferably from 1.48 to 2.00, and more preferably from 1.50 to 1.80. In order to make the refractive index fall within the foregoing range, the kind of each of the binder and the inorganic filler and a proportion of the amounts thereof may be selected. How to select them can be experimentally known in advance.

(Surfactant)

In the antiglare hard coat layer in the invention, in particular, for the purpose of ensuring uniformity in surface properties by suppressing a fault of surface properties such as coating unevenness, drying unevenness, and point defect, it is preferable that any one or both of a fluorine based surfactant and a silicone based surfactant are contained in a coating composition for forming an antiglare hard coat layer. In particular, a fluorine based surfactant is preferably used because it reveals an effect for improving a fault of surface properties of the antireflection film of the invention such as coating unevenness, drying unevenness, and point defect in a smaller amount of addition.

Preferred examples of the fluorine based surfactant include perfluoroalkyl group-containing oligomers such as "MEGAFAC F-171", "MEGAFAC F-172", "MEGAFAC F-173", and "MEGAFAC F-176" (all of which are a trade name) as manufactured by Dainippon Ink and Chemical, Incorporated. Examples of the silicone based surfactant include polydimethylsiloxanes in which a side chain or a terminal of the principal chain is modified with various substituents, such as oligomers of ethylene glycol, propylene glycol, etc.

However, when the foregoing surfactant is used, surface energy of the antiglare hard coat layer is lowered due to segregation of an F atom-containing functional group and/or an Si atom-containing functional on the surface of the antiglare layer. As a result, when the low refractive index layer is subjected to overcoating on the subject antiglare hard coat layer, there may possibly be caused a problem that the antireflection performance is lowered. It is estimated that since wettability of a coating composition for forming a low refractive index layer against the surface of the antiglare hard coat layer is lowered, fine unevenness which cannot be detected by visual observation of the thickness of the low refractive index layer is generated.

In order to solve such a problem, it is effective to control the surface energy of the antiglare hard coat layer preferably at from 25 to 70 mN·m$^{-1}$, and more preferably from 35 to 70 mN·m$^{-1}$ by adjusting the structure and addition amount of the fluorine based surfactant and/or the silicone based surfactant. In addition, as described later, it is more effective to use a solvent having a boiling point of not higher than 100° C. in an amount of from 50 to 100% by weight of a coating solvent of the low refractive index layer.

Furthermore, in order to realize the foregoing surface energy, it is preferable that F/C which is a ratio of a peak derived from a fluorine atom to a peak derived from a carbon atom as measured by X-ray photoelectron spectroscopy is not more than 0.40 and/or Si/C which is a ratio of a peak derived from a silicon atom to a peak derived from a carbon atom as measured by X-ray photoelectron spectroscopy is not more than 0.30.

A thickness of the antiglare hard coat layer is preferably from 1 to 10 μm, and more preferably from 1.2 to 6 μm.

[Smooth Hard Coat Layer]

In the antireflection film of the invention, for the purpose of further improving the film strength, a so-called smooth hard coat layer not having antiglare properties is also preferably used. It is more preferable that the smooth hard coat layer is used jointly with the antiglare hard coat layer. The smooth hard coat layer is applied between the transparent support and the antiglare hard coat layer.

A raw material which is used for the smooth hard coat layer is the same as those enumerated in the antiglare hard coat layer, except for the matter that the mat particle for imparting antiglare properties is not used, and is made of a binder and suitably an inorganic filler.

In the smooth hard coat layer in the invention, silica and alumina are preferable as the subject inorganic filler in view of strength and multiplicity of use, with silica being especially preferable. Furthermore, in the inorganic filler, it is preferable that its surface is subjected to a silane coupling treatment, and a surface treating agent containing a functional group capable of reacting with a binder species on the filler surface is preferably used.

A thickness of the smooth hard coat layer is preferably from 1 to 10 μm, and more preferably from 1.2 to 6 μm.

[Low Refractive Index Layer]

The low refractive index layer of the antireflection film of the invention will be hereunder described.

A refractive index of the low refractive index layer in the antireflection film of the invention is preferably in the range of from 1.38 to 1.49, and more preferably from 1.38 to 1.44.

In addition, it is preferable in view of realizing a low refractive index that the low refractive index layer is satisfied with the following numerical expression (1).

$$(j\lambda/4) \times 0.7 < n_1 d_1 < (j\lambda/4) \times 1.3 \qquad \text{Numerical Expression (1)}$$

In the foregoing expression, j represents a positive odd number; $n_1$ represents a refractive index of the low refractive index layer; and $d_1$ represents a thickness (nm) of the low refractive index layer. Furthermore, λ represents a wavelength and is a value in the range of from 500 to 550 nm. The thickness ($d_1$) of the low refractive index layer is preferably from 70 to 150 nm, more preferably from 80 to 120 nm, and most preferably from 85 to 115 nm.

Incidentally, what the low refractive index layer is satisfied with the foregoing numerical expression (1) means that j (a positive odd number, and usually 1) capable of being satisfied with the numerical expression (1) within the foregoing wavelength range is present.

Respective raw materials capable of forming the low refractive index layer in the invention will be hereunder described.

The low refractive index layer which is used in the invention is formed of a composition for forming a low refractive index layer containing a binder polymer, at least one polymerization initiator and an ethylenically unsaturated group-containing hardenable compound. In addition, it is preferable that the polymerization initiator and the hardenable compound are localized in a lower part of the low refractive index layer.

The polymerization initiator (C) is preferably a thermally decomposable and/or photodecomposable initiator. Furthermore, the binder polymer (A) is preferably a fluorine-containing polymer containing a crosslinking or polymerizable functional group; and the hardenable compound (B) is a non-fluorine compound.

[Binder Polymer] (A)

[Fluorine-Containing Polymer]

In the case of, for example, coating and hardening a rolled film while being web conveyed, it is preferable in view of improving the productivity that the fluorine-containing polymer is a polymer having a dynamic friction coefficient of a film formed upon hardening of from 0.03 to 0.20, a contact angle against water of from 90 to 120° and a slipping down angle of pure water of not more than 70° and capable of being crosslinked by heat or ionizing radiations.

Furthermore, in the case where the antireflection film of the invention is installed in a display device, when a peel force against a commercially available adhesive tape is low, the antireflection film is liable to be peeled away after sticking a seal or memory thereto. Accordingly, the peel force is preferably not more than 500 gf, more preferably not more than 300 gf, and most preferably not more than 100 gf. Furthermore, when a surface hardness as measured by a micro hardness tester is high, the antireflection film is liable to be hardly scared. Accordingly, the subject surface hardness is preferably 0.3 GPa or more, and more preferably 0.5 GPa.

The fluorine-containing polymer which is used for the low refractive index layer is preferably a fluorine-containing compound containing a crosslinking or polymerizable functional group. Examples thereof include fluorine-containing copolymers of a fluorine-containing monomer and a monomer for imparting a crosslinking group in addition to hydrolyzates or dehydration condensates of a perfluoroalkyl group-containing silane compound [for example, (heptadecafluoro-1,1,2,2- tetradecyl)triethoxysilane]. In the case of the fluorine-containing copolymer, it is preferable that the principal chain thereof is composed of only a carbon atom. That is, it is preferable that the principal chain skeleton does not contain an oxygen atom, a nitrogen atom or the like.

It is preferable that the content of a fluorine atom of the fluorine-containing polymer is from 35 to 80% by weight.

Specific examples of the fluorine-containing monomer include fluoroolefins (for example, fluoroethylene, vinylidene fluoride, tetrafluoroethylene, hexafluoroethylene, hexafluoropropylene, and perfluoro-2,2-dimethyl-1,3-dioxol), partially or completely fluorinated alkyl ester derivatives of (meth)acrylic acid [for example, "VISCOAT 6FM" (manufactured by Osaka Organic Chemical Industry Ltd.) and "M-2020" (manufactured by Daikin Industries, Ltd.)], and completely or partially fluorinated vinyl ethers. Of these, perfluoroolefins are preferable; and hexafluoropropylene is especially preferable from the viewpoints of refractive index, solubility, transparency, easiness of availability, and so on. By increasing a composition ratio of such a fluorine-containing monomer, though the refractive index can be decreased, the film strength is lowered. In the invention, it is preferred to introduce the fluorine-containing monomer such that the fluorine content of the copolymer is from 20 to 60% by weight. The fluorine content of the copolymer is more preferably from 25 to 55% by weight, and especially preferably from 30 to 50% by weight.

As the constitutional unit for imparting crosslinking group, the following units (a), (b) and (c) are mainly enumerated.

That is, examples thereof include:

(a) a constitutional unit obtainable by polymerization of a monomer which contains a self-crosslinking functional group in the molecule thereof in advance (for example, glycidyl (meth)acrylate and glycidyl vinyl ether);

(b) a constitutional unit obtainable by polymerization of a monomer containing a carboxyl group, a hydroxyl group, an amino group, a sulfo group, etc. (for example, (meth)acrylic acid, methylol (meth)acrylate, hydroxyalkyl (meth)acrylates, allyl acrylate, hydroxyethyl vinyl ether, hydroxybutyl vinyl ether, maleic acid, and crotonic acid); and in this case, it is described in JP-A-10-25388 and JP-A-10-147739 that after the copolymerization, a crosslinking structure can be introduced; and (c) a constitutional unit obtainable by reaction of a compound containing a group which is reactive with the foregoing functional group (a) or (b) and another crosslinking functional group in the molecule thereof with the foregoing constitutional unit (a) or (b) (for example, a constitutional unit capable of being synthesized by a measure, for example, to make acrylic acid chloride act to a hydroxyl group).

In the invention, in the foregoing constitutional unit (c), it is especially preferable that the subject crosslinking functional group is a photopolymerizable group. Examples of the photopolymerizable group include a (meth)acryloyl group, an alkenyl group, a cinnamoyl group, a cinnamylideneacetyl group, a benzalacetophenone group, a stylylpyridine group, an α-phenylmaleimide group, a phenylazide group, a sulfonylazide group, a carbonylazide group, a diazo group, an o-quinonediazide group, a furylacryloyl group, a coumarin group, a pyrone group, an anthracene group, a benzophenone group, a stilbene group, a dithiocarbamate group, a xanthate group, a 1,2,3-thiadiazole group, a cyclopropene group, and an azadioxabicyclo group. Such a group may be used singly or in combination of two or more kinds thereof. Of these groups, a (meth)acryloyl group and a cinnamoyl group are preferable; and a (meth)acryloyl group is especially preferable.

As a specific example of a method of preparing a photopolymerizable group-containing copolymer, the following methods can be enumerated. However, it should not be construed that the invention is limited thereto.

(1) A method of reacting a crosslinking functional group-containing copolymer containing a hydroxyl group with (meth)acrylic acid chloride to form an ester.

(2) A method of reacting a crosslinking functional group-containing copolymer containing a hydroxyl group with an isocyanate group-containing (meth)acrylic ester to form a urethane.

(3) A method of reacting a crosslinking functional group-containing copolymer containing an epoxy group with (meth)acrylic acid to form an ester.

(4) A method of reacting a crosslinking functional group-containing copolymer containing a carboxyl group with an epoxy group-containing (meth)acrylic ester to form an ester.

Incidentally, the amount of introduction of the foregoing photopolymerizable group can be arbitrarily adjusted. In view of stability of surface properties of coating film, lowering in defective surface properties at the time of the copresence of an inorganic fine particle and improvement in film strength, it is also preferable that a certain amount of a carboxyl group, a hydroxyl group, etc. remains.

Furthermore, not only the copolymer of the foregoing fluorine-containing monomer and the monomer for imparting a crosslinking group but also a copolymer resulting from copolymerization with other monomer may be used. A plural number of such a vinyl monomer may be combined depending upon the purpose, and these vinyl monomers are preferably introduced in an amount in the range of from 0 to 65% by mole, more preferably in the range of from 0 to 40% by mole, and especially preferably in the range of from 0 to 30% by weight in total in the copolymer.

The vinyl monomer unit which can be used jointly is not particularly limited, and examples thereof include olefins (for example, ethylene, propylene, isoprene, vinyl chloride, and vinylidene chloride), acrylic esters (for example, methyl acrylate, methyl acrylate, ethyl acrylate, and 2-ethylhexyl acrylate), methacrylic esters (for example, methyl methacrylate, ethyl methacrylate, butyl methacrylate, and ethylene glycol dimethacrylate), styrene derivatives (for example, styrene, divinylbenzene, vinyltoluene, and α-methylstyrene), vinyl ethers (for example, methyl vinyl ether, ethyl vinyl ether, cyclohexyl vinyl ether, hydroxyethyl vinyl ether, and hydroxybutyl vinyl ether), vinyl esters (for example, vinyl acetate, vinyl propionate, and vinyl cinnamate), unsaturated carboxylic acids (for example, acrylic acid, methacrylic acid, crotonic acid, maleic acid, and itaconic acid), acrylamides (for example, N-t-butyl acrylamide and N-cyclohexyl acrylamide), methacrylamides, and acrylonitrile derivatives.

As the binder which can be preferably used in the low refractive index layer of the antireflection film of the invention, copolymers as described in paragraphs [0030] to [0047] of JP-A-2004-45462 are enumerated.

In the invention, an especially useful fluorine-containing polymer is a random copolymer of a perfluoroolefin and a vinyl ether or a vinyl ester. It is especially preferable that the fluorine-containing polymer contains a group which is able to undergo a crosslinking reaction singly [for example, a radical reactive group such as a (meth)acryloyl group and a ring-opening polymerizable group such as an epoxy group and an oxetanyl group]. Such a crosslinking reactive group-containing polymerization unit preferably accounts for from 5 to 70% by mole, and especially preferably from 30 to 60% by mole of the whole of polymerization units of the polymer.

As a preferred polymer, polymers as described in JP-A-2002-243907, JP-A-2002-372601, JP-A-2003-26732, JP-A-2003-222702, JP-A-2003-294911, JP-A-2003-329804, JP-A-2004-4444, and JP-A-2004-45462 can be enumerated.

Furthermore, for the purpose of imparting antifouling properties to the fluorine-containing polymer which is used in the invention, it is preferable that a polysiloxane structure is introduced. Though a method of introducing a polysiloxane structure is not limited, for example, a method of introducing a polysiloxane block copolymerization component by using a silicone macro azo initiator as described in JP-A-6-93100, JP-A-11-189621, JP-A-11-228631 and JP-A-2000-313709; and a method of introducing a polysiloxane graft copolymerization component by using a silicone macromer as described in JP-A-2-251555 and JP-A-2-308806 are preferable. Examples of especially preferred compounds include polymers of Examples 1, 2 and 3 of JP-A-11-189621 and copolymers A-2 and A-3 of JP-A-2-251555. Such a polysiloxane component is preferably contained in an amount of from 0.5 to 10% by weight, and especially preferably from 1 to 5% by weight in the polymer.

A molecular weight of the polymer which can be preferably used in the invention is 5,000 or more, preferably from 10,000 to 500,000, and most preferably from 15,000 to 200,000 in terms of a weight average molecular weight. By jointly using polymers having a different average molecular weight from each other, the surface properties and scar resistance of a coating film can be improved.

(Preferred Embodiment of Fluorine-containing Polymer)

As a preferred embodiment of the fluorine-containing polymer which is used in the invention, fluorine-containing polymers represented by the following formula (6) or formula (7) are preferably used.

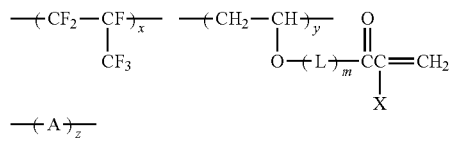

Formula (6)

In the formula (6), L represents a connecting group having from 1 to 10 carbon atoms, more preferably a connecting group having from 1 to 6 carbon atoms, and especially preferably a connecting group having from 2 to 4 carbon atoms; may have a linear or branched structure or a cyclic structure; and may contain a hetero atom selected from O, N and S.

Preferred examples thereof include *—$(CH_2)_2$—O—**, *—$(CH_2)_2$—NH—**, *—$(CH_2)_4$—O—**, *—$(CH_2)_6$—O—**, *—$(CH_2)_2$—O—$(CH_2)_2$—O—**, *—CONH—$(CH_2)_3$—O—**, *—$CH_2CH(OH)CH_2$—O—**, and *—$CH_2CH_2OCONH(CH_2)_3$—O—** (* represents a connecting site of the polymer principal chain side; and ** represents a connecting site of the (meth)acryloyl group side). m represents 0 or 1.

In the formula (6), X represents a hydrogen atom or a methyl group; and from the viewpoint of hardening reactivity, X is more preferably a hydrogen atom.

In the formula (6), A represents a repeating unit which is introduced from an arbitrary vinyl monomer and is not particularly limited so far as it is a constitutional component of a monomer which is copolymerizable with hexafluoropropylene. A can be properly selected from a variety of viewpoints such as adhesion to a substrate, Tg of a polymer (contributing to the film hardness), solubility in a solvent, transparency, slipperiness, and dustproof or antifouling properties and may be constituted of a single vinyl monomer or plural vinyl monomers according to the purpose.

Preferred examples thereof include vinyl ethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether, and allyl vinyl ether; vinyl esters such as vinyl acetate, vinyl propionate, and vinyl butyrate; (meth)acrylates such as methyl (meth)acrylate, ethyl (meth)acrylate, hydroxyethyl (meth)acrylate, glycidyl methacrylate, allyl (meth)acrylate, and (meth)acryloyloxy-propyl trimethoxysilane; styrene derivatives such as styrene and p-hydroxymethylstyrene; and unsaturated carboxylic acids such as crotonic acid, maleic acid, and itaconic acid, and derivatives thereof. Of these, vinyl ether derivatives and vinyl ester derivatives are more preferable; and vinyl ether derivatives are especially preferable.

x, y and z represent % by mole of the respective repeating constitutional components and represent values which are satisfied with the relations of ($30 \leq x \leq 60$), ($5 \leq y \leq 70$) and ($0 \leq z \leq 65$), preferably ($35 \leq x \leq 55$), ($30 \leq y \leq 60$) and ($0 \leq z \leq 20$), and especially preferably ($40 \leq x \leq 55$), ($40 \leq y \leq 55$) and ($0 \leq z \leq 10$), respectively.

As a more preferred embodiment of the copolymer which is used in the invention, the following formula (7) is enumerated.

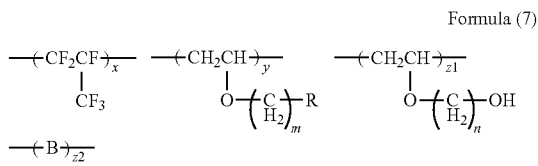

Formula (7)

In the formula (7), R represents an alkyl group having from 1 to 10 carbon atoms or may be an ethylenically unsaturated group (—C(=O)C(—X)=$CH_2$) as in the formula (6).

m represents an integer of ($1 \leq m \leq 10$), preferably ($1 \leq m \leq 6$), and especially preferably ($1 \leq m \leq 4$).

n represents an integer of ($2 \leq n \leq 10$), preferably ($2 \leq n \leq 6$), and especially preferably ($2 \leq n \leq 4$).

B represents a repeating unit which is derived from an arbitrary vinyl monomer and may be constituted of a single composition or plural compositions. Furthermore, B may contain a silicone site.

x, y, z1 and Z2 represent % by mole of the respective repeating units, respectively. x and y are preferably satisfied with ($30 \leq x \leq 60$) and ($0 \leq y \leq 70$), more preferably ($35 \leq x \leq 55$) and ($0 \leq y \leq 60$), and especially preferably ($40 \leq x \leq 55$) and ($0 \leq y \leq 55$), respectively. z1 and z2 are preferably satisfied with ($1 \leq z1 \leq 65$) and ($1 \leq z2 \leq 65$), more preferably ($1 \leq z1 \leq 40$) and ($1 \leq z2 \leq 10$), and especially preferably ($1 \leq z1 \leq 30$) and ($1 \leq z2 \leq 5$), respectively. However, (x+y+z1+z2) is 100.

It is also preferable that the fluorine-containing polymer of the invention contains a constitutional unit having the following polysiloxane structure for the purpose of imparting antifouling properties. As the fluorine-containing polymer having a polysiloxane structure which is useful in the invention, there are enumerated fluorine-containing polymers which contain at least one of each of (a) a fluorine-containing vinyl monomer polymerization unit, (b) a hydroxyl group-containing vinyl monomer polymerization unit, and (c) a polymerization unit containing a graft site containing a polysiloxane repeating unit represented by the following formula (1) in a side chain thereof and in which a principal chain thereof is composed of only a carbon atom.

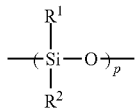

Formula (1)

In the formula (1), $R^1$ and $R^2$ may be the same or different and each represents an alkyl group or an aryl group. The alkyl group preferably has from 1 to 4 carbon atoms, and examples thereof include a methyl group, a trifluoromethyl group, and an ethyl group. The aryl group preferably has from 6 to 20 carbon atoms, and examples thereof include a phenyl group and a naphthyl group. Of these, a methyl group and a phenyl group are preferable; and a methyl group is especially preferable. p represents an integer of from 2 to 500, preferably from 5 to 350, and especially preferably from 8 to 250.

The polymer having a polysiloxane structure represented by the formula (1) in a side chain thereof can be synthesized by a method in which with respect to a polymer containing a reactive group (for example, an epoxy group, a hydroxyl group, a carboxyl group, and an acid anhydride group), a polysiloxane containing a corresponding reactive group (for example, an amino group, a mercapto group, a carboxyl group, and a hydroxyl group with respect to the epoxy group or acid anhydride group) at one terminal thereof [for example, SILAPLANE Series (manufactured by Chisso Corporation)] is introduced by a polymerization reaction as described in, for example, *J. Appl. Polym. Sci.*, 78, 1955 (2000) and JP-A-56-28219; or a method of polymerizing a poly-siloxane-containing silicon macromer; and the both methods can be preferably employed. In the invention, a method for achieving the introduction of a polysiloxane structure by polymerizing a silicon macromer is more preferable.

As the silicon macromer, any silicon macromer containing a polymerizable group which is able to undergo copolymerization with a fluorine-containing olefin is useful. Structures represented by any one of the following formulae (2) to (5) are preferable.

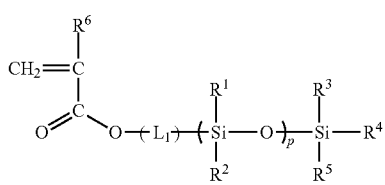

Formula (2)

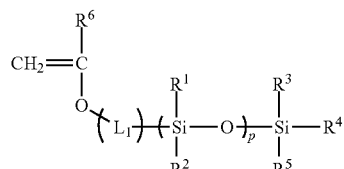

Formula (3)

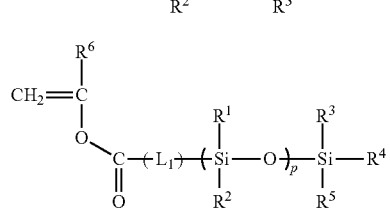

Formula (4)

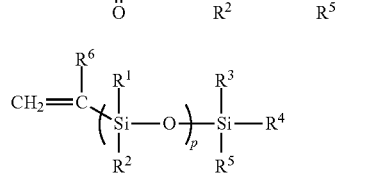

Formula (5)

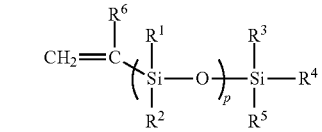

In the formulae (2) to (5), $R^1$, $R^2$ and p have the same meanings as in the formula (1); and preferred ranges thereof are also the same. $R^3$ to $R^5$ each independently represents a substituted or unsubstituted monovalent organic group or a hydrogen atom. Above all, an alkyl group having from 1 to 10 carbon atoms (for example, a methyl group, an ethyl group, and an octyl group), an alkoxy group having from 1 to 10 carbon atoms (for example, a methoxy group, an ethoxy group, and a propyloxy group), and an aryl group having from 6 to 20 carbon atoms (for example, a phenyl group and a naphthyl group) are preferable; and an alkyl group having from 1 to 5 carbon atoms is especially preferable. $R^6$ represents a hydrogen atom or a methyl group. $L_1$ represents an arbitrary connecting group having from 1 to 20 carbon atoms; and examples thereof include a substituted or unsubstituted, linear, branched or alicyclic alkylene group and a substituted or unsubstituted arylene group. Above all, an unsubstituted linear alkylene group having from 1 to 20 carbon atoms is preferable; and an ethylene group and a propylene group are especially preferable. These compounds can be synthesized by a method as described in, for example, JP-A-6-322053.

All of the compounds represented by the formulae (2) to (5) can be preferably used in the invention. Above all, compounds having a structure represented by the formula (2), (3) or (4) are especially preferable from the viewpoint of copolymerizability with a fluorine-containing olefin. The foregoing polysiloxane site preferably accounts for from 0.01 to 20% by weight, more preferably from 0.05 to 15% by weight, and especially preferably from 0.5 to 10% by weight in the graft copolymer.

Preferred examples of the polymerization unit of the polymer graft site containing a polysiloxane site in a side chain thereof which is useful in the invention will be given below, but it should not be construed that the invention is limited thereto.

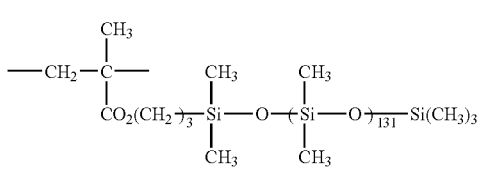

S-(1)

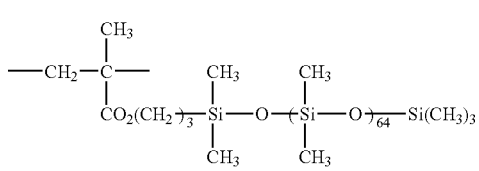

S-(2)

-continued
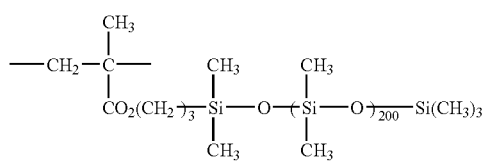 S-(3)
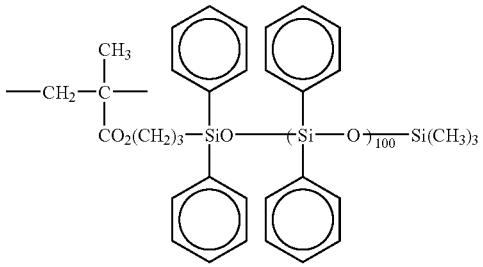 S-(4)
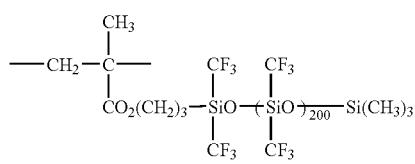 S-(5)
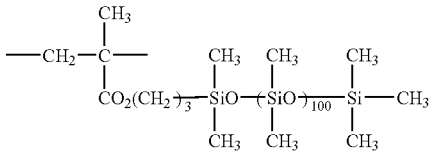 S-(6)
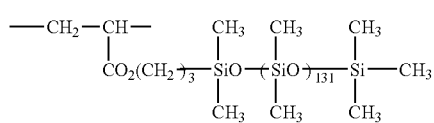 S-(7)
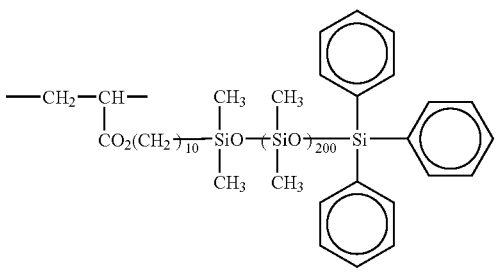 S-(8)
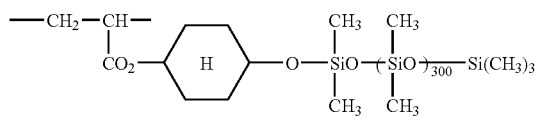 S-(9)
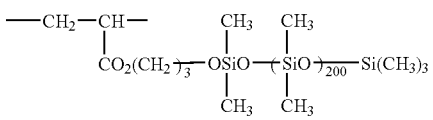 S-(10)
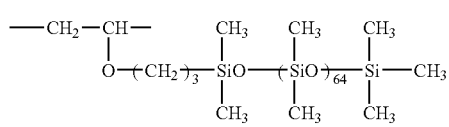 S-(11)
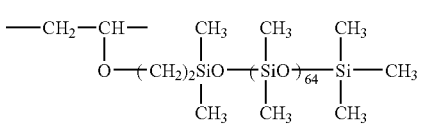 S-(12)
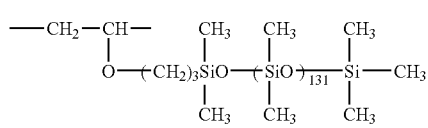 S-(13)
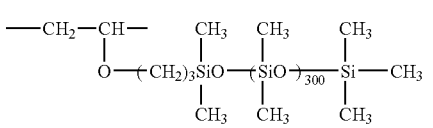 S-(14)
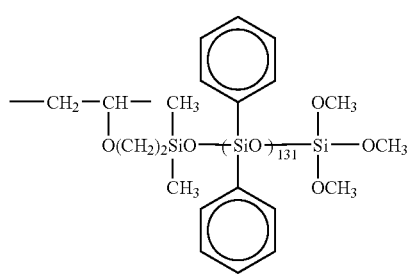 S-(15)
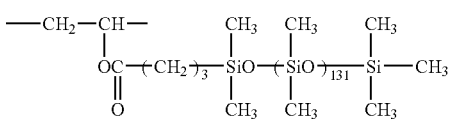 S-(16)
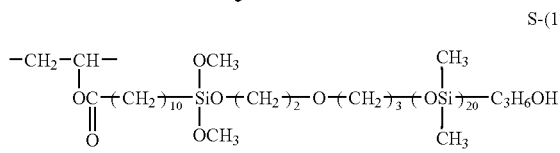 S-(17)
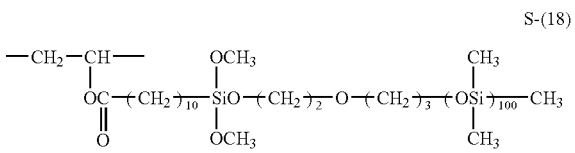 S-(18)
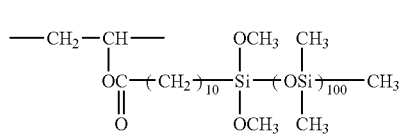 S-(19)
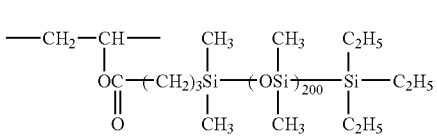 S-(20)

-continued
S-(21)
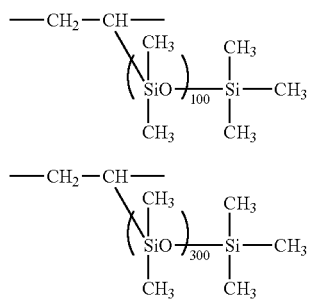
S-(22)
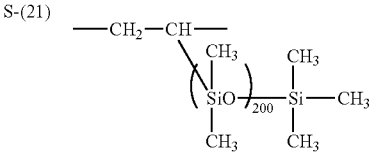
S-(23)
S-(24)
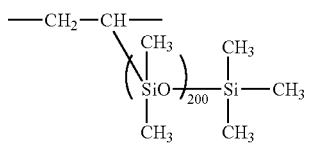
S-(25)
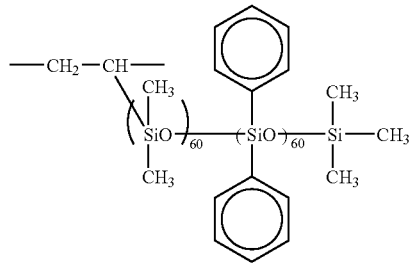
S-(26)
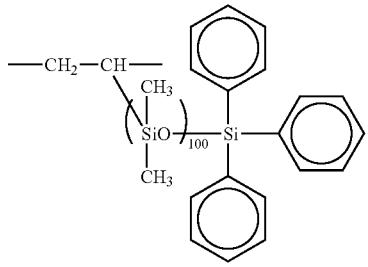
S-(27)
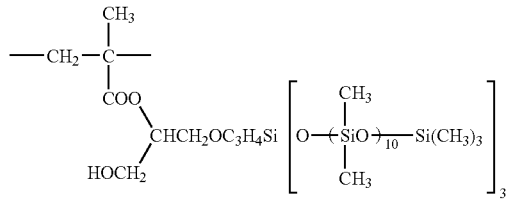
S-(28)
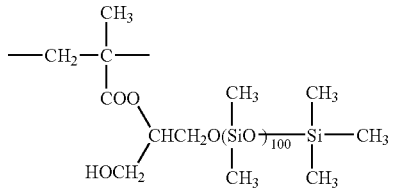
S-(29)
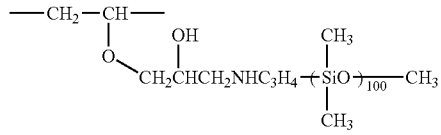
S-(30)
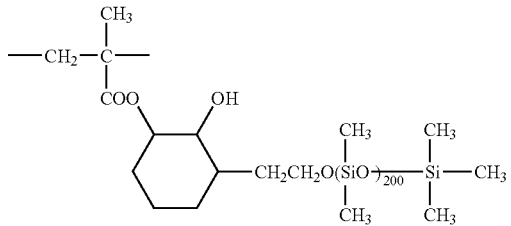
S-(31)
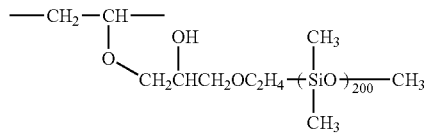
S-(32)
S-(33)
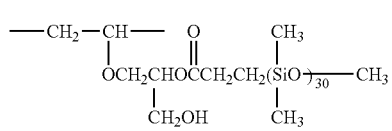
S-(34)
S-(35)
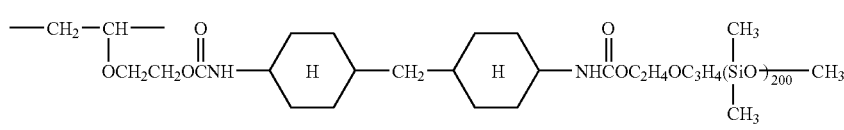

SILAPLANE FM-0711 (manufactured by Chisso Corporation) S-(36)

SILAPLANE FM-0721 (manufactured by Chisso Corporation) S-(37)

SILAPLANE FM-0725 (manufactured by Chisso Corporation) S-(38)

By introducing the subject polysiloxane structure, not only antifouling properties and dustproof properties are imparted to the film, but also slipperiness is imparted to the film surface. Also, such is advantageous with respect to the scar resistance.

(Hardening Agent)

By blending the fluorine-containing polymer with a crosslinking compound as a hardening agent, it is possible to further impart more hardening properties. For example, in the case where a hydroxyl group is contained in the polymer main body, the compound which can be used as the hardening agent is not particularly limited so far as it is a hardening agent containing two or more functional groups which are reactive with the hydroxyl group in one molecule thereof. Examples thereof include polyisocyanates, partial condensates or polymers of an isocyanate compound, adducts with, a polyhydric alcohol, a low molecular weight polyester film, etc., block polyisocyanate compounds having an isocyanate group blocked by a blocking agent such as phenol, aminoplasts, and polybasic acids or anhydrides thereof. In using such a hardening agent, the content of the hydroxyl group-containing monomer unit is preferably 1% or more and not more than 65%, and more preferably 1% or more and not more than 50%.

Above all, in the invention, aminoplasts capable of causing a crosslinking reaction with a hydroxyl group-containing compound under an acidic condition are preferable from the viewpoint of making stability at the time of storage and activity of the crosslinking reaction compatible with each other and the viewpoint of strength of the formed film. The aminoplasts are a compound containing an amino group capable of reacting with a hydroxyl group present in a fluorine-containing polymer, namely, a hydroxyalkylamino group or an alkoxyalkylamino group, or a carbon atom adjacent to a nitrogen atom and substituted with an alkoxy group. Specific examples thereof include melamine based compounds, urea based compounds, and benzoguanamine based compounds.

The foregoing melamine based compounds are generally known as a compound having a skeleton in which a nitrogen atom is bound to a triazine ring, and specific examples thereof include melamine, alkylated melamines, methylolated melamine, and alkoxylated methylmelamines. Above all, methylolated melamine obtained by reacting melamine with formaldehyde under a basic condition, alkoxylated methylmelamines, and derivatives thereof are preferable; and alkoxylated methylmelamines are especially preferable in view of storage stability. Furthermore, with respect to the methylolated melamine and alkoxylated methylmelamines, there are no particular limitations, and for example, a variety of resins obtainable by a method as described in *Plastic Material Course [8]: Urea melamine Resins* (published by Nikkan Kogyo Shimbun Ltd.) can be used.

Furthermore, as the foregoing urea compounds, in addition to urea, polymethylolated ureas and alkoxylated methylureas as a derivative thereof, and compounds having a glycol uryl skeleton or 2-imidazolidinone skeleton as a cyclic urea structure are preferable. With respect to the amino compounds such as the foregoing urea derivatives, a variety of resins as described in the foregoing *Urea melamine Resins* reference, etc. can also be used.

In the invention, as a compound which is suitably used as the crosslinking agent, melamine compounds or glycol uryl compounds are especially preferable in view of compatibility with the fluorine-containing copolymer. Above all, it is preferable that the crosslinking agent is a compound containing a nitrogen atom in the molecule thereof and containing two or more carbon atoms adjacent to the subject nitrogen atom and substituted with an alkoxy group. Examples of especially preferred compounds include compounds having a structure represented by the following H-1 or H-2 and partial condensates thereof. In the following formulae, $R^{31}$ and $R^{32}$ each represents an alkyl group having from 1 to 6 carbon atoms or a hydroxyl group.

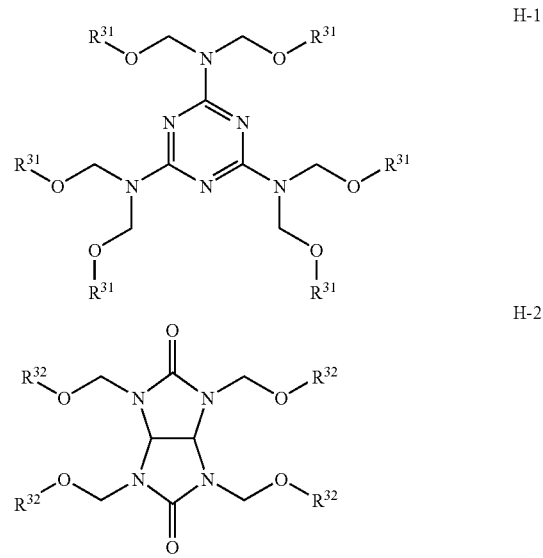

The amount of addition of the aminoplast to the fluorine-containing polymer is from 1 to 50 parts by weight, preferably from 3 to 40 parts by weight, and more preferably from 5 to 30 parts by weight based on 100 parts by weight of the copolymer. When the amount of addition of the aminoplast is 1 part by weight or more, it is possible to sufficiently exhibit durability as a thin film, whereas when it is not more than 50 parts by weight, in utilizing for optical applications, it is possible to keep a low refractive index of the low refractive index layer, and therefore, such is preferable. From the viewpoint of keeping a low refractive index even by adding the hardening agent, a hardening agent which even when added, is small with respect to an increase of the refractive index is preferable. According to this viewpoint, among the foregoing compounds, those having a skeleton represented by H-2 are more preferable.

(Hardening Catalyst)

In the antireflection film of the invention, in the case where the film is hardened by a crosslinking reaction of the hydroxyl group of the fluorine-containing polymer and the foregoing hardening agent while heating, since in this system, the hardening is accelerated by an acid, it is desired to add an acidic substance in the hardenable resin composition. However, when a usual acid is added, the crosslinking reaction also proceeds in the coating solution, resulting in causing a fault (for example, unevenness and cissing). Accordingly, in order to make the storage stability and the hardening activity compatible with each other in the heat hardening system, it is more preferred to add a compound capable of generating an acid by heating as a hardening catalyst.

It is preferable that the hardening catalyst is a salt made of an acid and an organic base. Examples of the acid include organic acids such as sulfonic acids, phosphonic acids, and carboxylic acids; and inorganic acids such as sulfuric acid and phosphoric acid. From the viewpoint of compatibility with the polymer, organic acids are more preferable; sulfonic acids and phosphonic acids are further preferable; and sulfonic acids are the most preferable. Preferred examples of the sulfonic acid include p-toluenesulfonic acid (PTS), benzenesulfonic acid (BS), p-dodecylbenzenesulfonic acid (DBS), p-chlorobenzenesulfonic acid (CBS), 1,4-naphthalenedisulfonic acid (NDS), methanesulfonic acid (MsOH), and nonafluorobutane-1-sulfonic acid (NFBS). All of these compounds can be preferably used. (Each of the expressions in the parentheses is an abbreviation.)

The hardening catalyst largely varies depending upon the basicity and boiling point of the organic base which is combined with the acid. The hardening catalyst which is preferably used in the invention will be described below from the respective viewpoints.

An organic base having a low basicity is high in acid generation efficiency at the time of heating and is preferable from the viewpoint of hardening activity. However, when the basicity is too low, the storage stability becomes insufficient. Accordingly, it is preferred to use an organic base having a proper basicity. When the basicity is expressed in terms of a pKa of a conjugated acid as an index thereof, the pKa of the organic base which is used in the invention is required to be from 5.0 to 10.5, more preferably from 6.0 to 10.0, and further preferably from 6.5 to 10.0. With respect to the pKa value of the organic base, since values in aqueous solution are described in *The Chemical Handbook Basic Edition* (Revised Version, 5th Edition, edited by The Chemical Society of Japan and published by Maruzen Co., Ltd.), Vol. 2, II, pages 334 to 340, it is possible to select an organic base having a proper pKa among them. Furthermore, it is possible to preferably use a compound having a proper pKa in view of the structure even when it is not described in the subject reference. Compounds having a proper pKa as described in the subject reference will be given in the following Table 1, but it should not be construed that the invention is limited thereto.

TABLE 1

| | Organic base | |
|---|---|---|
| No. | Chemical name | pKa |
| b-1 | N,N-Dimethylaniline | 5.1 |
| b-2 | Benzimidazole | 5.5 |
| b-3 | Pyridine | 5.7 |
| b-4 | 3-Methylpyridine | 5.8 |
| b-5 | 2,9-Dimethyl-1,10-phenanthroline | 5.9 |
| b-6 | 4,7-Dimethyl-1,10-phenanthroline | 5.9 |
| b-7 | 2-Methylpyridine | 6.1 |
| b-8 | 4-Methylpyridine | 6.1 |
| b-9 | 3-(N,N-Dimethylamino)pyridine | 6.5 |
| b-10 | 2,6-Dimethylpyridine | 7.0 |
| b-11 | Imidazole | 7.0 |
| b-12 | 2-Methyl imidazole | 7.6 |
| b-13 | N-Ethylmorpholine | 7.7 |
| b-14 | N-Methylmorpholine | 7.8 |
| b-15 | Bis(2-methoxyethyl)amine | 8.9 |

TABLE 1-continued

| | Organic base | |
|---|---|---|
| No. | Chemical name | pKa |
| b-16 | 2,2'-Iminodiethanol | 9.1 |
| b-17 | N,N-Dimethyl-2-aminoethanol | 9.5 |
| b-18 | Trimethylamine | 9.9 |
| b-19 | Triethylamine | 10.7 |

An organic base having a low boiling point is high in acid generation efficiency at the time of heating and is preferable from the viewpoint of hardening activity. Accordingly, it is preferred to use an organic base having a proper boiling point. The boiling point of the base is preferably not higher than 120° C., more preferably not higher than 80° C., and further preferably not higher than 70° C.

Examples of compounds which can be preferably used as the organic base in the invention will be given below, but it should not be construed that the invention is not limited thereto. Each of the expressions in the parentheses shows a boiling point.

b-3: pyridine (115° C.), b-14: N-methylmorpholine (115° C.), b-20: diallylmethylamine (111° C.), b-19: triethylamine (88.8° C.), b-21: t-butylmethylamine (67 to 69° C.), b-22: dimethylisopropylamine (66° C.), b-23: diethylmethylamine (63 to 65° C.), b-24: dimethylethylamine (36 to 38° C.), b-18: trimethylamine (3 to 5° C.)

The boiling point of the organic base which can be preferably used in the invention is 35° C. or higher and not higher than 85° C. When the boiling point exceeds this temperature range, deterioration in the scar resistance is caused, whereas when it is lower than 35° C., the coating solution becomes instable. The boiling point is more preferably 45° C. or higher and not higher than 80° C., and most preferably 55° C. or higher and not higher than 75° C.

When used as the acid catalyst which is used in the invention, the foregoing salt made of an acid and an organic base may be isolated and provided for use. Alternatively, a solution obtained by mixing an acid and an organic base to form a salt in the solution may be used. Furthermore, only one kind of each of an acid and an organic base may be used, and plural kinds of each of an acid and an organic base may be mixed and used. When an acid and an organic base are mixed and used, it is preferred to mix the acid and the organic base such that an equivalent ratio is preferably from 1/0.9 to 1/1.5, more preferably from 1/0.95 to 1/1.3, and further preferably from 1/1.0 to 1/1.1.

A proportion of this acid catalyst to be used is preferably from 0.01 to 10 parts by weight, more preferably from 0.1 to 5 parts by weight, and further preferably from 0.2 to 3 parts by weight based on 100 parts by weight of the fluorine-containing polymer in the foregoing hardenable resin composition.

In the invention, in addition to the foregoing heat acid generator, a compound capable of generating an acid upon light irradiation, namely a photosensitive acid generator may be further added. Examples of the acid generator include known compounds such as photo initiators of photo cationic polymerization, photo decoloring agents of a dye, photo discoloring agents, and known acid generators which are used for microresists, or the like, and mixtures thereof. The photosensitive acid generator is a substance which imparts photosensitivity to a film of the subject hardenable resin composition and is able to undergo photo hardening of the subject coating film upon irradiation with radiations such as light.

As the photosensitive acid generator, (1) a variety of onium salts such as iodonium salts, sulfonium salts, phosphonium salts, diazonium salts, ammonium salts, iminium salts, pyridinium salts, arsonium salts, and selenonium salts (preferably diazonium salts, iodonium salts, sulfonium salts, and iminium salts); (2) sulfone compounds such as β-ketoesters, β-sulfonylsulfone, and α-diazo compounds thereof; (3) sulfonic acid esters such as alkylsulfonic acid esters, haloalkylsulfonic acid esters, arylsulfonic acid esters, and iminosulfonates; (4) sulfonimide compounds; (5) diazomethane compounds; (6) trihalomethyl triazines; and others can be enumerated and properly used. With respect to the foregoing onium salts (1), for example, compounds as described in paragraphs [0058] to [0059] of JP-A-2002-29162 are enumerated.

Besides, with respect to the specific compounds and use method, the contents as described in, for example, JP-A-2005-43876 and so on can be applied.

Such a photosensitive acid generator can be used singly or in combination of two or more kinds thereof. In addition, the photosensitive acid generator can also be used together with the foregoing heat acid generator. A proportion of the photosensitive acid generator to be used is preferably from 0 to 20 parts by weight, and more preferably from 0.1 to 10 parts by weight based on 100 parts by weight of the fluorine-containing polymer in the composition for forming a low refractive index layer. When the proportion of the photosensitive acid generator is not more than the foregoing upper limit value, the resulting hardened film has excellent strength and satisfactory transparency, and therefore, such is preferable.

Next, the ethylenically unsaturated group-containing hardenable compound (B) will be described.
[Ethylenically Unsaturated Group-Containing Hardenable Compound (B)]

Examples of the hardenable compound (B) include monomers containing two or more ethylenically saturated groups. As the subject monomer, various monomers as enumerated in the "(Binder polymer containing a saturated hydrocarbon chain as a principal chain thereof)" in the "[Binder polymer]" of the foregoing "[Hard coat layer]" can be properly selected and used. Though such a monomer is able to increase a density of the crosslinking group in the binder and to form a hardened film with a high hardness, the refractive index is not low as compared with that of the fluorine-containing polymer binder. However, by using an inorganic fine particle having a hollow structure jointly, a sufficiently effective refractive index as the low refractive index layer of the antireflection film of the invention can be obtained.
(Hydrolyzate of an Organosilane Compound and/or a Partial Condensate of the Hydrolyzate)

Furthermore, from the viewpoint the matter that it is intended to make the hardenable compound have surface free energy higher than a fluorine compound for the purpose of localizing it in a lower portion than the fluorine-containing binder, the hardenable compound is preferably a non-fluorine compound. Above all, a so-called sol component which is a hydrolyzate of an organosilane compound which contains an ethylenically unsaturated group and in which a hydroxyl group or a hydrolyzable group is directly bound to silicon and/or a partial condensate of the hydrolyzate is especially preferable.

The organosilane compound is preferably an organosilane compound represented by the following formula (b).

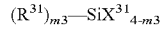
$(R^{31})_{m3}—SiX^{31}_{4-m3}$   Formula (b)

In the foregoing formula (b), $R^{31}$ represents a substituted or unsubstituted alkyl group or a substituted or unsubstituted aryl group. Examples of the alkyl group include methyl, ethyl, propyl, isopropyl, hexyl, decyl, and hexadecyl. The alkyl group preferably has from 1 to 30 carbon atoms, more preferably from 1 to 16 carbon atoms, and especially preferably from 1 to 6 carbon atoms. Examples of the aryl group include phenyl and naphthyl, with a phenyl group being preferable.

$X^{31}$ represents a hydroxyl group or a hydrolyzable group. Examples of the hydrolyzable group include an alkoxy group (preferably an alkoxy group having from 1 to 5 carbon atoms, for example, a methoxy group and an ethoxy group), a halogen atom (for example, Cl, Br, and I), and $R^{32}COO$ (wherein $R^{32}$ is preferably a hydrogen atom or an alkyl group having from 1 to 5 carbon atoms; and examples thereof include $CH_3COO$ and $C_2H_5COO$). Of these, an alkoxy group is preferable; and a methoxy group and an ethoxy group are especially preferable.

m3 represents an integer of from 0 to 3, and preferably 1 or 2.

When plural $R^{31}$s or $X^{31}$s are present, the plural $R^{31}$s or $X^{31}$s may be the same or different, respectively.

The substituent which is contained in $R^{31}$ is not particularly limited, and examples thereof include a halogen atom (for example, fluorine, chlorine, and bromine), a hydroxyl group, a mercapto group, a carboxyl group, an epoxy group, an alkyl group (for example, methyl, ethyl, isopropyl, propyl, and t-butyl), an aryl group (for example, phenyl and naphthyl), an aromatic heterocyclic group (for example, furyl, pyrazolyl, and pyridyl), an alkoxy group (for example, methoxy, ethoxy, isopropoxy, and hexyloxy), an aryloxy group (for example, phenoxy), an alkylthio group (for example, methylthio and ethylthio), an arylthio group (for example, phenylthio), an alkenyl group (for example, vinyl and 1-propenyl), an acyloxy group (for example, acetoxy, acryloyloxy, and methacryloyloxy), an alkoxycarbonyl group (for example, methoxycarbonyl and ethoxycarbonyl), an aryloxycarbonyl group (for example, phenoxycarbonyl), a carbamoyl group (for example, carbamoyl, N-methylcarbamoyl, N,N-dimethylcarbamoyl, and N-methyl-N-octylcarbamoyl), and an acylamino group (for example, acetylamino, benzoylamino, acrylamino, and methacrylamino). Such a substituent may be further substituted.

In the case where plural $R^{31}$s are present, it is preferable that at least one of them is a substituted alkyl group or a substituted aryl group.

The foregoing organosilane compound may be used singly or in combination to prepare a hydrolyzate and/or a partial condensate thereof.

The hydrolyzate of an organosilane compound and/or its partial condensate which is suitably used as the hardenable compound (B) contains an ethylenically unsaturated group. This can be prepared by using a compound represented by the foregoing formula (b) wherein $R^{31}$ represents an ethylenically unsaturated group as at least one organosilane compound which is used in preparing the sol component.

In order to obtain the effects of the invention, the content of the foregoing ethylenically unsaturated group-containing organosilane compound in the hydrolyzate of an organosilane compound and/or its partial hydrolyzate is preferably from 30% by weight to 100% by weight, more preferably from 50% by weight to 100% by weight, and further preferably from 70% by weight to 95% by weight. What the content of the foregoing ethylenically unsaturated group-containing organosilane compound is 30% by weight or more is preferable because there are not caused faults such as a matter that non-dissolved matters are formed; a matter that the liquid becomes turbid; a matter that the pot life is deteriorated; a matter that the control of the molecular weight (increase of the molecular weight) becomes difficult; and a matter that in the case of carrying out the polymerization treatment, an improvement of the performance (for example, scar resistance of the antireflection film) is hardly obtained due to a small content of the polymerizable group.

For the purpose of stabilizing the performance of a coated article, it is preferable that the volatility of at least one of the hydrolyzate of an organosilane and/or its partial condensate to be used in the invention is suppressed. Concretely, the amount of volatilization per hour at 105° C. is preferably not more than 5% by weight, more preferably not more than 3% by weight, and especially preferably not more than 1% by weight.

(Preparation Method of Organosilane Sol)

Next, the preparation method of an organosilane sol will be described.

The hydrolysis and/or condensation reaction of an organosilane compound is, for example, carried out by adding from 0.3 to 2.0 moles, and preferably from 0.5 to 1.0 mole of water per mole of the hydrolyzable group and stirring the mixture at from 25 to 100° C. in the presence of a metal chelate compound.

A weight average molecular weight of the obtained organosilane sol from which, however, components having a molecular weight of less than 300 are excluded is preferably from 450 to 20,000, more preferably from 500 to 10,000, further preferably from 550 to 5,000, especially preferably from 600 to 3,000, and most preferably from 1,000 to 2,000. Furthermore, among the components having a molecular weight of 300 or more in the organosilane sol, the content of components having a molecular weight exceeding 20,000 is preferably not more than 20% by weight, more preferably not more than 15% by weight, further preferably 10% by weight, still further preferably not more than 6% by weight, and especially preferably not more than 5% by weight. When the content of components having a molecular weight exceeding 20,000 is not more than 20% by weight, there is a possibility that a hardened film obtainable by hardening a composition containing a hydrolyzate of such an organosilane compound and/or its partial condensate is excellent in transparency or adhesion to a substrate, and therefore, such is preferable.

In addition, among the components having a molecular weight of 300 or more in the organosilane sol, it is preferable that the content of components having a molecular weight of from 450 to 20,000 is 80% by weight or more. When the content of components having a molecular weight of from 450 to 20,000 is the subject lower limit value or more, a hardened film obtainable by hardening the composition containing such an organosilane sol is excellent in transparency or adhesion to a substrate, and therefore, such is preferable.

Here, the weight average molecular weight and the number average molecular weight are a molecular weight as reduced into polystyrene, which is detected in tetrahydrofuran (THF) as a solvent by a differential refractometer by using a GPC analyzer with a column of "TSKgel GMHxL", "TSKgel G400HxL" or "TSKgel G2000HxL" (all of which are a trade name as manufactured by Tosoh Corporation). In the case where a peak area of components having a molecular weight of 300 or more is defined as 100%, the content means an area % of peaks of the foregoing molecular weight range.

A degree of dispersion [(weight average molecular weight)/(number average molecular weight)] is preferably from 3.0 to 1.1, more preferably from 2.5 to 1.1, further preferably from 2.0 to 1.1, and especially preferably from 1.5 to 1.1.

The hydrolysis and/or condensation reaction of the organosilane compound can be carried out in the absence or presence of a solvent. According to this reaction, a hardenable compound can be manufactured.

(Solvent)

In the case of using a solvent, it is possible to properly determine the concentration of the organosilane sol. For the purpose of uniformly mixing the components, it is preferred to use an organic solvent. Suitable examples of the organic solvent include alcohols, aromatic hydrocarbons, ethers, ketones, and esters. Furthermore, the solvent is preferably a solvent capable of dissolving the organosilane and the catalyst therein. From the process standpoint, it is preferred to use an organic solvent as a coating solution or a part of a coating solution. The solvent is preferably a solvent which when mixed with other raw materials such as the fluorine-containing polymer, does not impair solubility or dispersibility.

Of these, examples of the alcohol include monohydric alcohols and dihydric alcohols. As the monohydric alcohol, saturated aliphatic alcohols having from 1 to 8 carbon atoms are preferable. Specific examples of such an alcohol include methanol, ethanol, n-propyl alcohol, isopropyl alcohol, n-butyl alcohol, sec-butyl alcohol, tert-butyl alcohol, ethylene glycol, diethylene glycol, and triethylene glycol.

Furthermore, specific examples of the aromatic hydrocarbon include benzene, toluene and xylene; specific example of the ether include tetrahydrofuran, dioxane, and ethylene glycol monobutyl ether; specific examples of the ketone include acetone, methyl ethyl ketone, methyl isobutyl ketone, and diisobutyl ketone; and specific examples of the ester include ethyl acetate, propyl acetate, butyl acetate, propylene carbonate, and ethylene glycol monoethyl ether acetic acid ester.

Such an organic solvent may be used singly or in admixture of two or more kinds thereof. Though the concentration of the solid in the solvent in the subject reaction is not particularly limited, it is usually in the range of from 1% to 90%, and preferably in the range of from 20 to 70% by weight.

(Catalyst)

It is preferable that the hydrolysis of an organosilane compound and/or the condensation reaction is carried out in the presence of a catalyst. Examples of the catalyst include inorganic acids such as hydrochloric acid, sulfuric acid, and nitric acid; organic acids such as oxalic acid, acetic acid, formic acid, methanesulfonic acid, and toluenesulfonic acid; inorganic bases such as sodium hydroxide, potassium hydroxide, and ammonia; organic bases such as triethylamine and pyridine; and metal alkoxides such as triisopropoxy aluminum and tetrabutoxy zirconium. However, in view of the manufacturing stability of the sol solution and storage stability of the sol solution, an acid catalyst (for example, inorganic acids and organic acids) is used in the invention. Hydrochloric acid and sulfuric acid are preferable as the inorganic acid; and ones having an acid dissociation constant [pKa value (at 25° C.)] in water of not more than 4.5 are preferable as the organic acid. Hydrochloric acid, sulfuric acid, and an organic acid having an acid dissociation constant in water of not more than 3.0 are more preferable; hydrochloric acid, sulfuric acid, and an organic acid having an acid dissociation constant in water of not more than 2.5 are further preferable; and an organic acid having an acid dissociation constant in water of not more than 2.5 is especially preferable. Of these, methanesulfonic acid, oxalic acid, phthalic acid, and malonic acid are still further preferable, with oxalic acid being especially preferable.

The hydrolysis and/or condensation reaction is usually carried out by adding from 0.3 to 2 moles, and preferably from 0.5 to 1.0 mole of water per mole of the hydrolyzable group of the organosilane compound and stirring the mixture at from 25 to 100° C. in the presence or absence of the foregoing solvent and in the presence of an acid catalyst and a metal chelate compound.

In the case where the hydrolyzable group is an alkoxy group and the acid catalyst is an organic acid, since the carboxyl group or sulfo group of the organic acid supplies a proton, the addition amount of water can be reduced. The addition amount of water is from 0 to 2 moles, preferably from 0 to 1.5 moles, more preferably from 0 to 1 mole, and especially preferably from 0 to 0.5 moles per mole of the hydrolyzable group (for example, an alkoxy group) of the organosilane compound. In the case of using an alcohol as the solvent, the case where water is not substantially added is also suitable.

In the case where the acid catalyst is an inorganic acid, the use amount of the acid catalyst is from 0.01 to 10% by mole, and preferably from 0.1 to 5% by mole based on the hydrolyzable group. In the case where the acid catalyst is an organic acid, though the optimum amount of the acid catalyst varies depending upon the addition amount of water, when water is added, the use amount of the acid catalyst is from 0.01 to 10% by mole, and preferably from 0.1 to 5% by mole based on the hydrolyzable group; and when water is not substantially added, the use amount of the acid catalyst is from 1 to 500% by mole, preferably from 10 to 200% by mole, more preferably from 20 to 200% by mole, further preferably from 50 to 150% by mole, and especially preferably from 50 to 120% by mole based on the hydrolyzable group.

(Metal Chelate Compound)

As the metal chelate compound, ones containing, as a central metal, a metal selected from Zr, Ti and Al, in which an alcohol represented by the formula, $R^{41}OH$ (wherein $R^{41}$ represents an alkyl group having from 1 to 10 carbon atoms) and a compound represented by the formula, $R^{42}COCH_2COR^{43}$ (wherein $R^{42}$ represents an alkyl group having from 1 to 10 carbon atoms; and $R^{43}$ represents an alkyl group having from 1 to 10 carbon atoms or an alkoxy group having from 1 to 10 carbon atoms) function as ligands, can be suitably used without particular limitations. Two or more kinds of metal chelate compounds may be used together within this scope.

The metal chelate compound which is used in the invention is preferably selected from the group of compounds represented by the formulae, $Zr(OR^{41})_{p1}(R^{42}COCHCOR^{43})_{p2}$, $Ti(OR^{41})_{q1}(R^{42}COCHCOR^{43})_{q2}$ and $Al(OR^{41})_{r1}(R^{42}CO-CHCOR^{43})_{r2}$ and acts to accelerate a condensation reaction of the foregoing organosilane compound.

In the metal chelate compounds, $R^{41}$ and $R^{42}$ may be the same or different and each represents an alkyl group having from 1 to 10 carbon atoms (specific examples thereof include an ethyl group, an n-propyl group, an isopropyl group, an n-butyl group, a sec-butyl group, a t-butyl group, and an n-pentyl group) or a phenyl group. Furthermore, $R^{43}$ represents an alkyl group having from 1 to 10 carbon atoms the same as in the foregoing or an alkoxy group having from 1 to 10 carbon atoms such as a methoxy group, an ethoxy group, an n-propoxy group, an isopropoxy group, an n-butoxy group, a sec-butoxy group, and a t-butoxy group. Moreover, in the metal chelate compounds, p1, p2, q1, q2, r1 and r2 each represents an integer which is determined such that the compound becomes tetradentate or hexadentate.

Specific examples of such a metal chelate compound include zirconium chelate compounds such as zirconium tri-n-butoxyethylacetoacetate, zirconium di-n-butoxybis(ethylacetoacetate), zirconium n-butoxytris(ethylacetoacetate), zirconium tetrakis(n-propylacetoacetate), zirconium tetrakis(acetylacetoacetate), and zirconium tetrakis(ethylacetoacetate); titanium chelate compounds such as titanium diisopropoxy•bis(ethylacetoacetate), titanium diisopropoxy•bis(acetylacetate), and titanium diisopropoxy•bis(acetylacetonate); and aluminum chelate compounds such as aluminum diisopropoxyethylacetoacetate, aluminum diisopropoxyacetylacetonate, aluminum isopropoxybis(ethylacetoacetate), aluminum isopropoxybis(acetylacetonate), aluminum tris(ethylacetoacetate), aluminum tris(acetylacetonate), and aluminum monoacetylacetonato•bis(ethylacetoacetate).

Of these metal chelate compounds, zirconium tri-n-butoxyethylacetoacetate, titanium diisopropoxy•bis(acetylacetonate), aluminum diisopropoxyethylacetoacetate, and aluminum tris(ethylacetoacetate) are preferable. Such a metal chelate compound can be used singly or in admixture of two or more kinds thereof. Furthermore, a partial hydrolyzate of such a metal chelate compound can also be used.

The metal chelate compound is preferably used in a proportion of from 0.01 to 50% by weight, more preferably from 0.1 to 50% by weight, and further preferably from 0.5 to 10% by weight based on the organosilane compound represented by the foregoing formula (b). When the metal chelate compound is used in a proportion of the subject lower limit value or more, the condensation reaction of the organosilane compound favorably proceeds, and the durability of the resulting coating film is excellent. On the other hand, when the metal chelate compound is used in a proportion of not more than the subject upper limit value, there is free from a problem that the storage stability of a composition containing the subject organosilane compound and the metal chelate compound component is lowered, and therefore, such is preferable.

Though the hydrolysis and/or condensation reaction of an organosilane compound is carried out by stirring at from 25 to 100° C., it is preferable that the hydrolysis and/or condensation reaction is adjusted depending upon the reactivity of the individual organosilane compound to be used.

The addition amount of the organosilane sol in the low refractive index layer is preferably from 0.1 to 50% by weight, more preferably from 0.5 to 20% by weight, and especially preferably from 1 to 10% by weight of the whole of solids of the low refractive index layer.

Incidentally, the organosilane sol can also be added in other layer than the low refractive index layer. In that case, the addition amount of the organosilane sol is preferably from 0.001 to 50% by weight, more preferably from 0.01 to 20% by weight, further preferably from 0.05 to 10% by weight, and especially preferably from 0.1 to % by weight of the whole of solids of the layer in which the organosilane sol is added.

The use amount (ratio) of the organosilane sol is, for example, preferably from 5 to 100% by weight, more preferably from 5 to 40% by weight, further preferably from 8 to 35% by weight, and especially preferably from 8 to 35% by weight based on the fluorine-containing polymer in the low refractive index. When the use amount of the organosilane sol is the subject lower limit value or more, the effects of the invention are sufficiently exhibited. On the other hand, when the use amount of the organosilane sol is not more than the subject upper limit value, there are not caused faults such as a matter that the refractive index increases and a matter that the shape and surface properties of the film are deteriorated, and therefore, such is preferable.

As described previously, it is preferable that the polymerization initiator (C) which is contained in the composition for forming a low refractive index layer is a thermally decomposable and/or photodecomposable initiator. The polymerization initiator (C) can be used without particular limitations so far as it is a usually used polymerization initiator. It is preferable that an SP value of each of the polymerization initiator (C) and the ethylenically unsaturated group-containing hardenable compound (B) is higher than that of the binder polymer (A) which is used together therewith. The matter that the at least one polymerization initiator (C) and the ethylenically unsaturated group-containing hardenable compound (B) which are added are localized in a lower part of the low refractive index layer due to this difference of SP value can be confirmed by a method as enumerated below.

A low refractive index layer as formed by coating and hardening by using a fluorine-containing binder polymer, a vinyl polymerizable substituent-containing organosilane sol compound and an initiator (IC-1) as described later is prepared. A surface resulting from cutting this sample at an angle of 0.2° against the sample surface by using a microtome was measured by TOF-SIMS, an image was drawn by the mass number inherent to the raw material, and the distribution within a film was evaluated. For the TOF-SIMS measurement, TOF-SIMS IV as manufactured by ION-TOF GmbH was used. $Bi_3^+$ with an accelerating voltage of 25 keV was irradiated on the sample in a pulse width of 2 nsec, thereby detecting secondary ions at an m/z of up to 1,000 by a time-of-flight mass spectrophotometer. In order to inhibit the electrification of the sample during the measurement, a low-speed electron of 20 eV was irradiated.

As also described in the working examples as described later, according to the foregoing measurement, $SiO_3H$ as derived from the organosilane, Cl as derived from the initiator (IC-1) and $C_3F_5$ as derived from the fluorine-containing binder polymer were detected at an m/z of 76.974, 34.969 and 130.992, respectively. It became clear from a profile of these three signals that the organosilane sol and the initiator (IC-1) are localized in a lower part of the subject low refractive index layer, whereas the fluorine-containing binder polymer is localized in an upper part of the low refractive index layer.

Furthermore, it was understood from TEM (transmission electron microscopy) of a section of the subject sample that the subject low refractive index layer is of a two-layered configuration. From the matter that the thickness of the lower layer of the low refractive index layer increases due to an increase of the amount of the organosilane sol compound, it became clear that the fluorine-containing binder polymer is localized in an upper part of the low refractive index layer, whereas the organosilane sol compound and the polymerization initiator of the invention are localized in a lower part of the low refractive index layer.

(SP Value)

The "SP value of compound" as referred to herein means a solubility parameter and digitalizes how a compound is soluble in a solvent or the like. The SP value is synonymous with a polarity which is often employed in an organic compound. The larger this SP value, the larger the polarity is. The binder polymer of the low refractive index layer which is used in the invention is preferably a thermally hardenable and/or ionizing radiation hardenable fluorine-containing compound, and its SP value as measured by an Fedor's estimation method is, for example, not more than 20. An SP value of the organosilane sol as described in the preceding section can be calculated in the same manner, and an organosilane sol value a sol solution (b-1) to be used in the invention in the working examples as described later is 22.4. The "SP value" as referred to herein is, for example, a value as calculated by an Fedor's estimation method (*Foundation and Application of SP Values and Calculation Method*, page 66, written by Hideki Yamamoto and published by Johokiko Co., Ltd. (issued on Mar. 31, 2005)).

[Polymerization Initiator]

The polymerization initiator which is localized in a lower part of the low refractive index layer in the invention may also be either a thermally decomposable polymerization initiator or a photodecomposable polymerization initiator so far as it is an initiator preferably having an SP value large than that of the binder polymer, and especially the fluorine-containing binder polymer. Furthermore, the polymerization initiator may be one having any one of the following polymerization initiator skeletons. In addition, it is thought that when the SP value of the polymerization initiator is larger than that of the fluorine-containing binder polymer, the fluorine-containing binder polymer is localized in an upper part of the low refractive index layer, whereas the polymerization initiator is liable to be localized in a lower part of the low refractive index layer, whereby the polymerization of the hardenable compound as localized in a lower part of the low refractive index layer is efficiently advanced in the same manner.

In a compound in which such an initiator and the hardenable compound are intramolecularly connected and bound to each other, if the SP value of such a connected and bound compound is larger than that of the binder polymer, there is brought the same effect. The hardenable compound is a compound having an ethylenically unsaturated group, and it is connected and bound to the polymerization initiator.

(Photo Radical Polymerization Initiator Skeleton)

The photo radical polymerization initiator skeleton may be any skeleton so far as it is an initiator which is the same compound as the photo radical polymerization initiator as enumerated in the foregoing section of the binder polymer for the purpose of forming a hard coat layer and has an SP value larger than that of the binder polymer for forming a low refractive index layer, and especially the fluorine-containing binder polymer.

(Heat Radical Initiator Skeleton)

The heat radical polymerization initiator skeleton may be any skeleton so far as it is an initiator which is the same compound as the heat radical polymerization initiator as enumerated in the foregoing section of the binder polymer for the purpose of forming a hard coat layer and has an SP value larger than that of the binder polymer for forming a low refractive index layer, and especially the fluorine-containing binder polymer.

Such an initiator may be used singly or in admixture.

Initiators which can be preferably used in the invention and SP values thereof (as calculated by a Fedor's estimation method) will be given below, but it should not be construed that the invention is limited thereto.

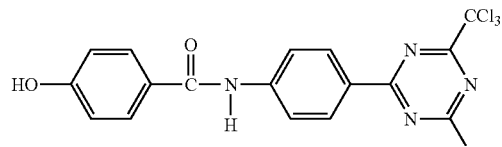

(IC-1)

(SP value: 29.1)

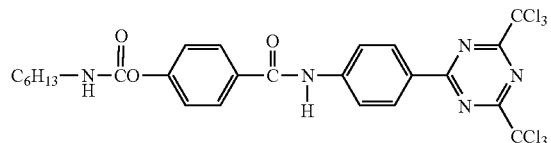

(IC-2)

(SP value: 25.4)

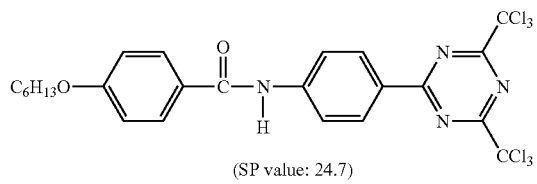
(IC-3)
(SP value: 24.7)

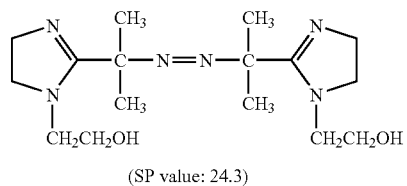
(IC-4)
(SP value: 24.3)

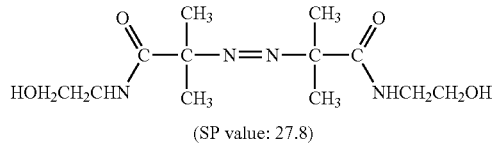
(IC-5)
(SP value: 27.8)

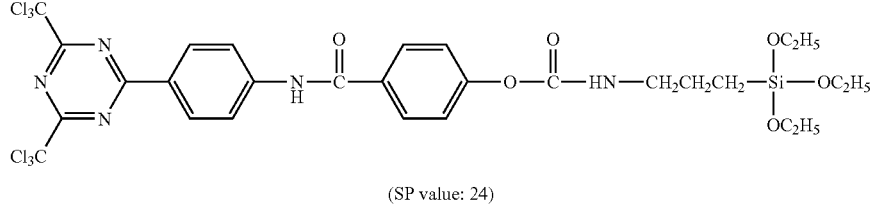
(IC-6)
(SP value: 24)

Organosilane compound bound to an initiator

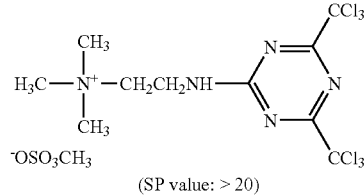
(IC-7)
(SP value: > 20)

Water-soluble initiator

Furthermore, a self-polymerization initiating hardenable compound in which an ethylenically unsaturated group-containing hardenable compound and a polymerization initiator are intramolecularly connected and bound to each other will be enumerated below.

(IC-8) (SP value: 25.7): Compound in which (IC-1) and an ethylenically unsaturated group-containing hardenable compound are connected to each other

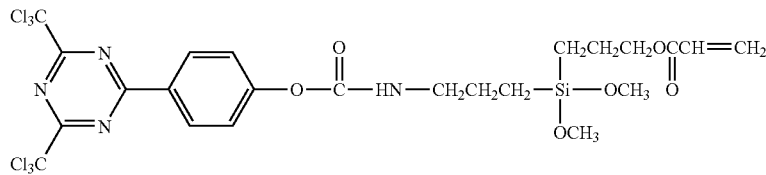

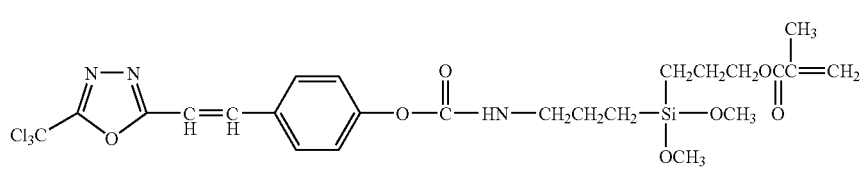
(IC-9)
(SP value: 21.7)

In addition, specific compounds of the initiator which can be used in the invention will be given below.

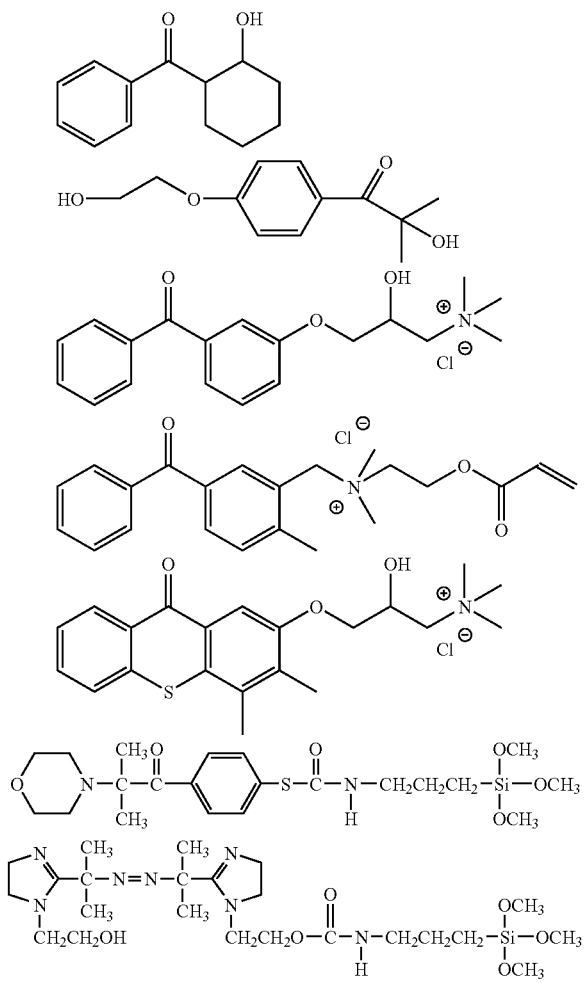

Though the use amount of such a polymerization initiator is not particularly limited, the polymerization initiator is preferably used in an amount in the range of from 0.1 to 20 parts by weight, and more preferably from 1 to 10 parts by weight based on 100 parts by weight of the hardenable compound to be used jointly.

Furthermore, the polymerization initiator compound may be used singly or in combination of plural kinds thereof and may be used jointly with other photosensitizer. Specific examples of the photosensitizer include n-butylamine, tri-ethylamine, tri-n-butyl phosphine, Michler's ketone, and thioxanthone. In addition, at least one auxiliary agent such as azide compounds, thiourea compounds, and mercapto compounds may be combined and used.

[Antifouling Agent]

In the antireflection film of the invention, in particular the low refractive index layer which is the uppermost layer thereof, for the purpose of imparting characteristics such as antifouling properties, water-proof properties, chemical resistance, and slipperiness, it is preferable that antifouling agents or slipping agents of a known compound having a polysiloxane structure or a fluorine based compound and the like are properly added.

(Compound Having a Polysiloxane Structure)

By adding the foregoing compound having a polysiloxane structure in the low refractive index layer, it is possible to design to impart slipperiness, thereby improving scar resistance and antifouling properties. The structure of the compound is not particularly limited, and examples thereof include a structure containing plural dimethylsilyloxy units as a repeating unit and containing a substituent in a terminal and/or a side chain of the chemical chain thereof. Furthermore, a structural unit other than dimethylsilyloxy may be contained in the chemical chain containing dimethylsilyloxy as a repeating unit.

Though the molecular weight of the compound having a polysiloxane structure is not particularly limited, it is preferably not more than 100,000, especially preferably not more than 50,000, and most preferably from 3,000 to 30,000.

In general, in the antireflection film, for the purpose of protecting a surface thereof, a protective film is stuck and wound up via an adhesive layer to complete a product. Accordingly, the compound having a polysiloxane structure which is contained in the low refractive index layer is liable to transfer into the adhesive layer or the protective film. Also, the subject compound is liable to move into a layer beneath the low refractive index layer, for example, a high refractive index layer and a hard coat layer. From the viewpoint of preventing such transfer or movement from occurring, it is preferable that a hydroxyl group or a functional group capable of reacting with a hydroxyl group to form binding is contained in the subject compound.

It is preferable that this binding forming reaction rapidly proceeds under a heating condition and/or in the presence of a catalyst. Examples of such a substituent include an epoxy group and a carboxyl group. Preferred examples of the compound having a polysiloxane structure will be given below, but it should not be construed that the invention is limited thereto.

(Compound Containing a Hydroxyl Group)

"X-22-160AS", "KF-6001", "KF-6002", "KF-6003", "X-22-170DX", "X-22-176DX", "X-22-176D", and "X-22-176F" (all of which are manufactured by Shin-Etsu Chemical Co., Ltd.); "FM-4411", "FM-4421", "FM-4425", "FM-0411", "FM-0421", "FM-0425", "FM-DA11", "FM-DA21", and "FM-DA25" (all of which are manufactured by Chisso Corporation); and "CMS-626" and "CMS-222" (all of which are manufactured by Gelest, Inc.)

(Compound Containing a Functional Group Capable of Reacting with a Hydroxyl Group)

"X-22-162C" and "KF-105" (all of which are manufactured by Shin-Etsu Chemical Co., Ltd.); and "FM-5511", "FM-5521", "FM-5525", "FM-6611", "FM-6621", and "FM-6625" (all of which are manufactured by Chisso Corporation)

In addition to the foregoing polysiloxane based compound, other polysiloxane based compound can be further used together. Preferred examples thereof include compounds containing plural dimethylsilyloxy units as a repeating unit and containing a substituent in a terminal and/or a side chain of the chemical chain thereof. A structural unit other than dimethylsilyloxy may also be contained in the chemical chain containing dimethylsilyloxy as a repeating unit. The substituent may be the same or different, and it is preferable that plural substituents are contained. Preferred examples of the substituent include groups containing, for example, an acryloyl group, a methacryloyl group, a vinyl group, an aryl group, a cinnamoyl group, an oxetanyl group, a fluoroalkyl group, a polyoxyalkylene group, a carboxyl group, or an amino group.

Though the molecular weight of this polysiloxane based compound is not particularly limited, it is preferably not more than 100,000, more preferably not more than 50,000, especially preferably from 3,000 to 30,000, and most preferably from 10,000 to 20,000.

Though the content of a silicon atom of the silicone based compound is not particularly limited, it is preferably 18.0% by weight or more, especially preferably from 25.0 to 37.0% by weight, and most preferably from 30.0 to 37.0% by weight.

(Fluorine Based Compound)

As the fluorine based compound which is used as an antifouling agent, compounds containing a fluoroalkyl group are preferable. The subject fluoroalkyl group preferably has from 1 to 20 carbon atoms, and more preferably from 1 to 10 carbon atoms. The fluoroalkyl group may be of a linear structure [for example, $-CF_2CF_3$, $-CH_2(CF_2)_4H$, $-CH_2(CF_2)_8CF_3$, and $-CH_2CH_2(CF_2)_4H$], a branched structure [for example, $CH(CF_3)_2$, $CH_2CF(CF_3)_2$, $CH(CH_3)CF_2CF_3$, and $CH(CH_3)(CF_2)_5CF_2H$], or an alicyclic structure (preferably a 5-membered ring or a 6-membered ring; for example, a perfluorocyclohexyl group, a perfluorocyclopentyl group, and an alkyl group substituted with the preceding group); and may contain an ether bond (for example, $CH_2OCH_2CF_2CF_3$, $CH_2CH_2OCH_2C_4F_8H$, $CH_2CH_2OCH_2CH_2C_8F_{17}$, and $CH_2CH_2OCF_2CF_2OCF_2CF_2H$). A plural number of the subject fluoroalkyl group may be contained in the same molecule.

It is preferable that such a fluorine based compound further contains a substituent which contributes to the formation of binding to a low refractive index layer film or compatibility therewith. The subject substituent may be the same or different, and it is preferable that plural substituents are contained. Preferred examples of the substituent include an acryloyl group, a methacryloyl group, a vinyl group, an aryl group, a cinnamoyl group, an epoxy group, an oxetanyl group, a hydroxyl group, a polyoxyalkylene group, a carboxyl group, and an amino group.

The fluorine based compound may be a polymer or oligomer with a fluorine atom-free compound. Its molecular weight is not particularly limited. Though the content of a fluorine atom of the fluorine based compound is not particularly limited, it is preferably 20% by weight or more, especially preferably from 30 to 70% by weight, and most preferably from 40 to 70% by weight.

Preferred examples of the fluorine based compound include "R-2020", "M-2020", "R-3833", and "M-3833" (all of which are a trade name of Daikin Industries, Ltd.); and "MEGAFAC F-171", "MEGAFAC F-172", "MEGAFAC F-179A", and "DEFENSA MCF-300" (all of which are a trade name of Dainippon Ink and Chemical, Incorporated). However, it should not be construed that the invention is limited thereto.

In the case where such an antifouling agent is added, it is preferably added in an amount ranging from 0.01 to 20% by weight, more preferably from 0.05 to 10% by weight, and especially preferably from 0.1 to 5% by weight of the whole of solids of the low refractive index layer.

[Dustproof Agent, Antistatic Agent, Etc.]

For the purpose of imparting characteristics such as dustproof properties and antistatic properties, dustproof agents or antistatic agents such as known cationic surfactants and polyoxyalkylene based compounds can also be properly added. With respect to such a dustproof agent or antistatic agent, its structural unit may be contained as a part of the function in the foregoing silicone based compound or fluorine based compound.

When such a dustproof agent or antistatic agent is added as an additive, it is preferably added in an amount ranging from 0.01 to 20% by weight, more preferably from 0.05 to 10% by weight, and especially preferably from 0.1 to 5% by weight of the whole of solids of the low refractive index layer. Preferred examples of the dustproof agent or antistatic agent include "MEGAFAC F-150" (a trade name of Dainippon Ink and Chemicals, Incorporated) and "SH-3748" (a trade name of Dow Corning Toray Co., Ltd.). However, it should not be construed that the invention is limited thereto.

[Inorganic Filler]

As an inorganic filler which is used in the low refractive index layer, inorganic fillers having a low refractive index are preferably used. The inorganic filler is preferably a silica particle or a hollow silica particle, with a hollow silica particle being especially preferable. An average particle size of the subject inorganic filler is preferably from 0.001 to 0.2 μm, and more preferably from 0.001 to 0.05 μm. It is preferable that the particle size of the filler is uniform (monodispersed) as far as possible.

(Silica Particle)

The average particle size of the silica particle is preferably 30% or more and not more than 150%, more preferably 35% or more and not more than 80%, and further preferably 40% or more and not more than 60% of the thickness of the low refractive index layer. That is, when the thickness of the low refractive index layer is 100 nm, the particle size of the silica particle is preferably 30 nm or more and not more than 150 nm, more preferably 35 nm or more and not more than 80 nm, and further preferably 40 nm or more and not more than 60 nm. When the particle size of the silica particle is the foregoing lower limit value or more, an effect for improving the scar resistance is exhibited, whereas when the particle size of the silica fine particle is not more than the upper limit value, there is not caused such a fault that fine irregularities are formed on the surface of the low refractive index layer so that the appearance including firmness of black color and the integrated reflectance are deteriorated, and therefore, such is preferable.

The silica particle may be either crystalline or amorphous; it may be a monodispersed particle; and so far as a prescribed particle size is met, it may be a coagulated particle. Though the shape of the silica particle is most preferably spherical, even when it is amorphous, there is no problem. Here, the average particle size of the inorganic fine particle is measured by a Coulter counter.

(Hollow Silica Particle)

For the purpose of lowering the refractive index of the low refractive index layer, it is preferred to use a hollow silica particle. The subject hollow silica particle preferably has a refractive index of from 1.15 to 1.40, more preferably from 1.17 to 1.35, and most preferably from 1.17 to 1.30. The refractive index as referred to herein expresses a refractive index as the whole of the particle but does not express a refractive index of only silica as an outer shell which forms the hollow silica particle. At this time, when a radius of a void within the particle is defined as "$r_i$" and a radius of the outer shell of the particle is defined as "$r_o$", a porosity x is expressed by the following numerical expression (2). The porosity x of the hollow silica particle is preferably from 10 to 60%, more preferably from 20 to 60%, and most preferably from 30 to 60%.

$$x=(4\pi r_i^3/3)/(4\pi r_o^3/3)\times 100 \qquad \text{Numerical Expression (2)}$$

From the viewpoint of scar resistance, a particle having a refractive index of 1.15 or more is preferable because the thickness of the outer shell is thoroughly thick so that the strength as the particle becomes strong.

A method for producing a hollow silica particle is described in, for example, JP-A-2001-233611 and JP-A-2002-79616. A particle having a void inside the shell, in which pores of the shell are plugged, is especially preferable. Incidentally, the refractive index of such a hollow silica particle can be calculated by a method as described in JP-A-2002-79616.

The application amount of the hollow silica is preferably from 1 mg/m$^2$ to 100 mg/m$^2$, more preferably from 5 mg/m$^2$ to 80 mg/m$^2$, and further preferably from 10 mg/m$^2$ to 60 mg/m$^2$. When the application amount of the hollow silica is the subject lower limit value or more, an effect for realizing a low refractive index and an effect for improving the scar resistance are exhibited, whereas when it is not more than the subject upper limit value, there is not caused such a fault that fine irregularities are formed on the surface of the low refractive index layer so that the appearance including firmness of black color and the integrated reflectance are deteriorated, and therefore, such is preferable.

The average particle size of the hollow silica particle is preferably 30% or more and not more than 150%, more preferably 35% or more and not more than 80%, and further preferably 40% or more and not more than 60% of the thickness of the low refractive index layer. That is, when the thickness of the low refractive index layer is 100 nm, the particle size of the hollow silica is preferably 30 nm or more and not more than 150 nm, more preferably 35 nm or more and not more than 100 nm, and further preferably 40 nm or more and not more than 65 nm. When the particle size of the silica fine particle is the subject lower limit value or more, a proportion of voids does not become excessively small so that an effect for lowering the refractive index is exhibited, whereas when it is not more than the subject upper limit value, there is not caused such a fault that fine irregularities are formed on the surface of the low refractive index layer so that the appearance including firmness of black color and the integrated reflectance are deteriorated, and therefore, such is preferable.

The hollow silica particle may be either crystalline or amorphous and is preferably a monodispersed particle. Though the shape of the silica fine particle is most preferably spherical, even when it is amorphous, there is no problem.

Furthermore, with respect to the hollow silica, two or more kinds of hollow silica having a different average particle size from each other can be used together. Here, the average particle size of the hollow silica can be determined from an electron microscopic photograph.

In the invention, the hollow silica particle preferably has a specific surface area of from 20 to 300 m$^2$/g, more preferably from 30 to 120 m$^2$/g, and most preferably 40 to 90 m$^2$/g. The surface area can be determined by a BET method using nitrogen.

In the invention, it is possible to use a void-free silica particle together with the hollow silica particle. The void-free silica preferably has a particle size of 30 nm or more and not more than 150 nm, more preferably 35 nm or more and not more than 100 nm, and most preferably 40 nm or more and not more than 80 nm.

Furthermore, it is also possible to use at least one silica particle having an average particle size of less than 25% of the thickness of the low refractive index layer (referred to as "small particle-sized silica particle") together with the silica particle having the foregoing particle size (referred to as "large particle-sized silica fine particle").

Since the small particle-sized silica particle can exist in a gap between the large particle-sized silica particles, it can contribute as a holding agent of the large particle-sized silica particle.

The average particle size of the small particle-sized silica particle is preferably 1 nm or more and not more than 20 nm, more preferably 5 nm or more and not more than 15 nm, and especially preferably 10 nm or more and not more than 15 nm. The use of such a silica particle is preferable from the standpoints of raw material costs and an effect of the holding agent.

(Surface Treatment)

In order to design to achieve dispersion stability in the dispersion or coating solution or to enhance the compatibility and binding properties with the binder component, the silica particle or the hollow silica particle may be subjected to a physical surface treatment such as a plasma discharge treatment and a corona discharge treatment or a chemical surface treatment with a surfactant, a coupling agent, or the like. Such a surface treating agent is preferably added for the treatment in an amount of from 0.1% by weight to 100% by weight, more preferably from 1.0% by weight to 50% by weight, and especially further preferably from 5.0% by weight to 35% by weight based on the inorganic filler.

Alkoxy metal compounds (for example, titanium coupling agents and silane coupling agents) are preferably used as the coupling agent. Above all, it is preferable that at least one of the foregoing inorganic fine particle and hollow silica particle is subjected to a surface treatment with an organosilane compound represented by the following formula (a).

$$(R^{11})_{m1}\text{—SiX}^{11}{}_{4-m1} \quad \text{Formula (a)}$$

In the foregoing formula (a), $R^{11}$ represents a substituted or unsubstituted alkyl group or a substituted or unsubstituted aryl group. Examples of the alkyl group include methyl, ethyl, propyl, isopropyl, hexyl, decyl, and hexadecyl. The alkyl group preferably has from 1 to 30 carbon atoms, more preferably from 1 to 16 carbon atoms, and especially preferably from 1 to 6 carbon atoms. Examples of the aryl group include phenyl and naphthyl, with a phenyl group being preferable.

$X^{11}$ represents a hydroxyl group or a hydrolyzable group. Examples of the hydrolyzable group include an alkoxy group (preferably an alkoxy group having from 1 to 5 carbon atoms, for example, a methoxy group and an ethoxy group), a halogen atom (for example, Cl, Br, and I), and $R^{12}$COO (wherein $R^{12}$ is preferably a hydrogen atom or an alkyl group having from 1 to 5 carbon atoms; and examples thereof include $CH_3COO$ and $C_2H_5COO$). Of these, an alkoxy group is preferable; and a methoxy group and an ethoxy group are especially preferable.

m1 represents an integer of from 1 to 3, and preferably from 1 to 2.

When plural $R^{11}$s or $X^{11}$s are present, the plural $R^{11}$s or $X^{11}$s may be the same or different, respectively.

The substituent which is contained in $R^{11}$ is not particularly limited, and examples thereof include a halogen atom (for example, fluorine, chlorine, and bromine), a hydroxyl group, a mercapto group, a carboxyl group, an epoxy group, an alkyl group (for example, methyl, ethyl, isopropyl, propyl, and t-butyl), an aryl group (for example, phenyl and naphthyl), an aromatic heterocyclic group (for example, furyl, pyrazolyl, and pyridyl), an alkoxy group (for example, methoxy, ethoxy, isopropoxy, and hexyloxy), an aryloxy group (for example, phenoxy), an alkylthio group (for example, methylthio and ethylthio), an arylthio group (for example, phenylthio), an alkenyl group (for example, vinyl and 1-propenyl), an acyloxy group (for example, acetoxy, acryloyloxy, and methacryloyloxy), an alkoxycarbonyl group (for example, methoxycarbonyl and ethoxycarbonyl), an aryloxycarbonyl group (for example, phenoxycarbonyl), a carbamoyl group (for example, carbamoyl, N-methylcarbamoyl, N,N-dimethylcarbamoyl, and N-methyl-N-octylcarbamoyl), and an acylamino group (for example, acetylamino, benzoylamino, acrylamino, and methacrylamino). Such a substituent may be further substituted.

In the case where plural $R^{11}$s are present, at least one of them is preferably a substituted alkyl group or a substituted aryl group.

In the invention, the organosilane compound which can be especially preferably used is an organosilane compound represented by the foregoing formula (a) and containing a vinyl polymerizable substituent. Above all, it is especially preferable that $R^{11}$ in the formula (a) is a (meth)acryloyl group-containing group, that is, the substituent which is contained in $R^{11}$ is a (meth)acryloyloxy group.

Furthermore, an organosilane compound represented by the formula (a) in which $R^{11}$ is an epoxy group-containing group, that is, the substituent which is contained in $R^{11}$ is an epoxy group can be especially preferably used in the same way.

For the purpose of reducing a load of the surface treatment, it is preferable that the silica particle is dispersed in advance in a medium prior to the surface treatment. Specific examples of compounds of the surface treating agent and the catalyst which can be preferably used in the invention include organosilane compounds and catalysts as described in, for example, WO 04/017105.

With respect to the inorganic filler which is used in the low refractive index layer, two kinds of fillers having a different particle size from each other may be used jointly. In particular, by jointly using an inorganic filler having a particle size of from 0.02 to 0.08 μm and an inorganic filler having a particle size of less than 0.02 μm, it is possible to make both reflectance and scar resistance compatible with each other. A proportion of the addition amount of each of two kinds of inorganic fillers having a different particle size from each other can be freely varied between 0 and 1 due to balance between desired reflectance and scar resistance. In the case where it is intended to reduce the reflectance, it is preferable that the inorganic filler having a small particle size accounts for the majority; and in the case where it is intended to strengthen the scar resistance, it is preferable that the proportion of the organic filler having a large particle size is increased.

The addition amount of the inorganic filler is preferably from 5 to 90% by weight, more preferably from 10 to 70% by weight, and especially preferably from 10 to 50% by weight of the whole weight of the low refractive index layer.

[Dispersion Stabilizer]

In the invention, for the purpose of inhibiting coagulation or sedimentation of the inorganic filler in the low refractive index layer, it is also preferable that a dispersion stabilizer is used jointly. With respect to the dispersion stabilizer as referred to herein, the same dispersion stabilizer as used in the foregoing hard coat layer can be used in the same method. A preferred addition amount thereof and the like are also the same.

[Solvent of Coating Solution for Forming Each Layer]

A solvent composition of a coating solution for forming each of the hard coat layer and the low refractive index layer according to the invention may be single or in admixture. In the case of a mixed solvent, a proportion of a solvent having a boiling point of not higher than 100° C. is preferably from 50 to 100% by weight, more preferably from 80 to 100% by weight, further preferably from 90 to 100% by weight, and still further preferably 100% by weight in the whole solvent. What a proportion of the solvent having a boiling point of not higher than 100° C. is the subject lower limit value or more is preferable because the drying speed does not become excessively slow; the coating surface properties are not deteriorated; unevenness in coating film thickness is not generated; and problems such as deterioration of optical characteristics including reflectance are not caused. In the invention, by using a coating solution containing a large amount of a solvent having a boiling point of not higher than 100° C., these problems can be solved.

Examples of the solvent having a boiling point of not higher than 100° C. include hydrocarbons such as hexane (boiling point: 68.7° C.; "° C." will be hereinafter omitted), heptane (98.4), cyclohexane (80.7), and benzene (80.1); halogenated hydrocarbons such as dichloromethane (39.8), chloroform (61.2), carbon tetrachloride (76.8), 1,2-dichloroethane (83.5), and trichloroethylene (87.2); ethers such as diethyl ether (34.6), diisopropyl ether (68.5), dipropyl ether (90.5), and tetrahydrofuran (66); esters such as ethyl formate (54.2), methyl acetate (57.8), ethyl acetate (77.1), and isopropyl acetate (89); ketones such as acetone (56.1) and 2-butanone (methyl ethyl ketone=MEK, 79.6); alcohols such as methanol (64.5), ethanol (78.3), 2-propnaol (82.4), and 1-propanol (97.2); cyano compounds such as acetonitrile (81.6) and propionitrile (97.4); and carbon disulfide (46.2). Of these, ketones and esters are preferable; and ketones are especially preferable. Among the ketones, 2-butanone is especially preferable.

Examples of the solvent having a boiling point of higher than 100° C. include octane (125.7), toluene (110.6), xylene (138), tetrachloroethylene (121.2), chlorobenzene (131.7), dioxane (101.3), dibutyl ether (142.4), isobutyl acetate (118), cyclohexanone (155.7), 2-methyl-4-pentanone (methyl isobutyl ketone=MIBK, 115.9), 1-butanol (117.7), N,N-dimethylformamide (153), N,N-dimethylacetamide (166), and dimethyl sulfoxide (189). Of these, cyclohexanone and 2-methyl-4-pentanone are preferable.

By diluting the components of each of the hard coat layer and the low refractive index layer with a solvent having the foregoing composition, a coating solution for forming each of the layers is prepared. Though a concentration of the coating solution is preferably adjusted while taking into consideration a viscosity of the coating solution, a specific gravity of the raw material of the layer, and the like, it is preferably from 0.1 to 20% by weight, and more preferably from 1 to 10% by weight.

[Transparent Support]

As the transparent support of the antireflection film of the invention, it is preferred to use a plastic film. Examples of a polymer capable of forming a plastic film include cellulose esters [for example, triacetyl cellulose, diacetyl cellulose, and representatively "TAC-TD80U" (a trade name, manufactured by Fuji Photo Film Co., Ltd.)], polyamides, polycarbonates, polyesters (for example, polyethylene terephthalate and polyethylene naphthalate), polystyrene, polyolefins, norbornene based resins [for example, "ARTON" (a trade name) as manufactured by JSR Corporation], and amorphous polyolefins [for example, "ZEONEX" (a trade name) as manufactured by Zeon Corporation]. Of these, triacetyl cellulose, polyethylene terephthalate, and polyethylene naphthalate are preferable; and triacetyl cellulose is especially preferable.

Though a thickness of the support which can be used is usually from about 25 μm to 1,000 μm, it is preferably from 25 μm to 250 μm, and more preferably from 30 μm to 90 μm.

Though a width of the support which can be used is arbitrary, it is usually from 100 to 5,000 mm, preferably from 800 to 3,000 mm, and more preferably from 1,000 to 2,800 mm from the standpoints of handling, yield and productivity.

It is preferable that the surface of the support is smooth. Its average roughness (Ra) value is preferably not more than 1 µm, more preferably from 0.0001 to 0.5 µm, and further preferably from 0.001 to 0.1 µm.

The triacetyl cellulose film is made of a single layer or plural layers. The triacetyl cellulose film made of a single layer is prepared by drum casting or band casting or other means as disclosed in JP-A-7-11055; and the latter triacetyl cellulose film made of plural layers is prepared by a so-called co-casting method as disclosed in JP-A-61-94725 and JP-B-62-43846.

That is, this method is a method in which in casting a solution (referred to as "dope") prepared by dissolving a raw material flake in a solvent such as halogenated hydrocarbons (for example, dichloromethane), alcohols (for example, methanol, ethanol, and butanol), esters (for example, methyl formate and methyl acetate), and ethers (for example, dioxane, dioxolan, and diethyl ether) and optionally adding thereto a variety of additives such as a plasticizer, an ultraviolet ray absorber, an anti-deterioration agent, a slipping agent, and a peeling accelerator on a support composed of a horizontal endless metal belt or a rotatory drum by a dope feed measure (referred to as "die"), a single dope is subjected to single layer casting in the case of a single layer, or a low-concentration dope is subjected to co-casting on the both sides of a high-concentration cellulose ester dope in the case of plural layers; the dope is dried on the support to some extent, thereby separating a film to which rigidity has been imparted from the support; and the film is then passed through a drying section by a conveyance measure of every kind, thereby removing the solvent.

As the solvent for dissolving the foregoing triacetyl cellulose, dichloromethane is representative. However, from the viewpoint of the global environment or working environment, it is preferable that the solvent does not substantially contain a halogenated hydrocarbon such as dichloromethane. It is meant by the terms "does not substantially contain" that a proportion of the halogenated hydrocarbon in the organic solvent is less than 5% by weight (preferably less than 2% by weight). In the case of preparing a dope of triacetyl cellulose using a solvent which does not substantially contain dichloromethane or the like, the following special dissolution method is essential.

A first dissolution method is called a cooling dissolution method and will be described below.

First of all, triacetyl cellulose is gradually added in the solvent with stirring at a temperature in the vicinity of room temperature (from −10 to 40° C.). Next, the mixture is cooled to a temperature of from −100 to −10° C. (preferably from −80 to −10° C., more preferably from −50 to −20° C., and most preferably from −50 to −30° C.). The cooling can be carried out in, for example, a dry ice•methanol bath (−75° C.) or a cooled diethylene glycol solution (from −30 to −20° C.). By cooling in this way, the mixture of triacetyl cellulose and the solvent is solidified. In addition, when the resulting mixture is heated to a temperature of from 0 to 200° C. (preferably from 0 to 150° C., more preferably from 0 to 120° C., and most preferably from 0 to 50° C.), a solution in which the triacetyl cellulose is fluidized in the solvent is formed. The temperature elevation may be achieved by merely allowing the mixture to stand at room temperature or by heating in a warm bath.

A second method is called a high-temperature dissolution method and will be described below.

First of all, triacetyl cellulose is gradually added in the solvent with stirring at a temperature in the vicinity of room temperature (from −10 to 40° C.). With respect to the triacetyl cellulose solution which is used in the invention, it is preferable that triacetyl cellulose is swollen in advance by adding it in a mixed solvent containing various solvents. In this method, though a dissolution concentration of triacetyl cellulose is preferably not more than 30% by weight, it is preferable in view of drying efficiency at the time of film formation that the dissolution concentration is high as far as possible. Next, the organic solvent mixed solution is heated under a pressure of from 0.2 MPa to 30 MPa at a temperature of from 70 to 240° C. (preferably from 80 to 220° C., more preferably from 100 to 200° C., and most preferably from 100 to 190° C.). Next, since such a heated solution cannot be coated as it is, it is necessary to cool it at a temperature of not higher than the lowest boiling point among those of the used solvents. In that case, it is general that after cooling to a temperature of from −10 to 50° C., the system is returned to normal pressure. The cooling may be achieved by merely allowing a high-pressure high-temperature container having the triacetyl cellulose solution accommodated therein to stand at room temperature. More preferably, the cooling may be achieved by cooling the subject device by using a coolant such cooling water.

A cellulose acetate film which is substantially free from a halogenated hydrocarbon such as dichloromethane and a manufacturing method thereof are described in a *Journal of Technical Disclosure* document issued by the Japan Institute of Invention and Innovation (No. 200-1745, issued Mar. 15, 2001, hereinafter referred to as "*Journal of Technical Disclosure* No. 2001-1745").

[Formation of Antireflection Film]

Though each of the layers of the antireflection film having a multilayered configuration can be formed by coating by a dip coating method, an air knife coating method, a curtain coating method, a roll coating method, a die coating method, a wire bar coating method, a gravure coating method, or an extrusion coating method (as described in U.S. Pat. No. 2,681,294), it is preferably coated by a die coating method. More preferably, the coating is achieved by using a novel die coater as described later. Two or more layers may be coated simultaneously. A method of simultaneous coating is described in U.S. Pat. Nos. 2,761,791, 2,941,898, 3,508,947 and 3,526,528 and Yuji Harazaki, *Coating Engineering*, page 253 [Asakura Publishing Co., Ltd. (1973)].

For the purpose of continuously producing the antireflection film of the invention, for example, a step for continuously winding out a substrate film (transparent support) in a rolled state; a step for coating and drying a coating solution; a step for hardening a coating film; and a step for winding up the substrate film having a hardened layer are carried out.

Concretely, the manufacturing process can be carried out in the following way.

A substrate support is continuously wound out from the substrate film in a rolled state into a clean chamber; static electricity as charged on the substrate film is destaticized by a destaticization unit within the clean chamber; and a foreign substance as attached on the substrate film is subsequently removed by a dustproof unit. Subsequently, the coating solution is coated on the substrate film in a coating part as placed within the clean chamber, and the coated substrate film is sent into a drying chamber and dried.

The substrate film having a dried coating layer is delivered from the drying chamber into a heat hardening part, hardened upon heating and then sent out into a radiation hardening chamber, and a monomer as contained in the coating layer is polymerized and hardened upon irradiation with radiations. According to circumstances, the substrate film having a dried coating layer is directly sent out into a radiation hardening chamber and irradiated with radiations, thereby polymerizing a monomer as contained in the coating layer to complete hardening; and the substrate film having a completely hardened layer is wound up and becomes in a rolled state.

In the invention, a die coating method is preferably employed as the coating method from the viewpoint of higher production speed. The die coating method is preferably employed because it is possible to make both productivity and coating unevenness-free surface properties compatible with each other in a high level. As the production process of the antireflection film of the invention, the following coating method employing such a die coating method is preferable.

That is, this coating method is a production process including a coating step in which a land of a tip lip of a slot die is made closed to a surface of a web which is supported by a backup roll and continuously runs and a coating solution is coated from a slot of the tip lip. In the invention, it is preferable that coating is carried out by using a coating device having a slot die having a land length of a tip lip in the side of a web advancing direction of the slot die in the web running direction of 30 μm or more and not more than 100 μm, in which when the slot die is set up in a coating position, the tip lip in the opposite side to the advancing direction of the web and the web are placed such that a gap therebetween is 30 μm or more and not more than 120 μm larger than a gap the tip lip in the advancing direction of the web and the web (hereinafter, this numerical value limitation will be referred to as "overbyte length").

In particular, a die coater which can be preferably used in the production process of the invention will be hereunder described with reference to the accompanying drawings. The subject die coater can be used in the case where a wet coating amount is small (not more than 20 cc/m²) and is preferable.

Figure 6:
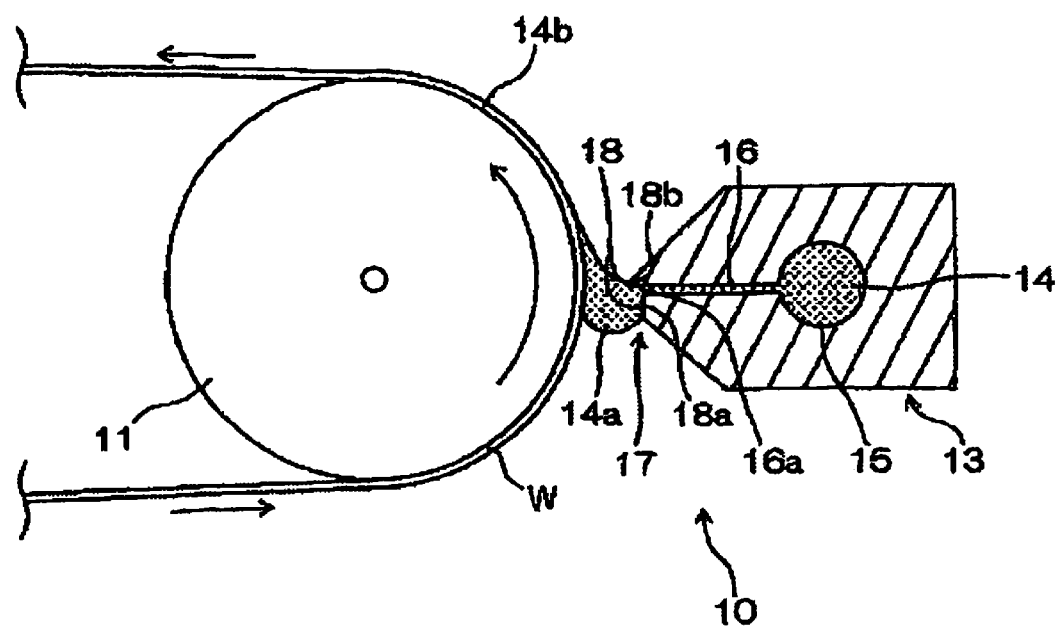
FIG. 6 is a sectional view of a coater 10 using a slot die 13 which is used in carrying out the invention.

FIG. 6 is a sectional view of one example of a coater (coating device) using a slot die capable of suitably carrying out the invention.

A coater 10 is composed of a backup roll 11 and a slot die 13, and when a coating solution 14 is discharged in a form of a bead 14a from the slot die 13 and coated on a web W which is supported by the backup roll 11 and continuously runs, a coating film 14b is formed on the web W.

A pocket 15 and a slot 16 are formed inside the slot die 13. In the pocket 15, though its section is constructed of a curved line and a straight line, it may be substantially circular or semicircular. In the pocket 15, in general, a space for collecting a coating solution as extended while having its sectional shape in a width direction of the slot die 13 (the width direction of the slot die 13 as referred to herein means a direction in the near side or a direction in the far side towards the drawing as illustrated in FIG. 6) is formed such that an effective extended length thereof is equal to or slightly longer than a coating width. Feed of the coating solution 14 into the pocket 15 is carried out from the side face of the slot die 13 or from the center of the face in the opposite side to a slot opening 16a. Furthermore, the pocket 15 is provided with a plug (not illustrated) for preventing the leakage of the coating solution 14 from occurring.

The slot 16 is a passage of the coating solution 14 from the pocket 15 to the web W and has its sectional shape in the width direction of the slot die 13 likewise the pocket 15; and the opening 16a positioned in the web side is generally adjusted so as to have a width substantially equal to the coating width by using a non-illustrated width regulating plate. In the slot tip of this slot 16, an angle of the backup roll 11 in the running direction of the web W to the tangential line is preferably 30° or more and not more than 90°.

A tip lip 17 of the slot die 13 at which the opening 16a of the slot 16 is positioned is formed in a tapered form, and its tip forms a flat part 18 called a land. In this land 18, an upstream side in the advancing direction of the web W against the slot 16 (a reverse side to the advancing direction, namely the arrow direction in the drawing) is named as an upstream side lip land 18a, and a downstream side thereof (a side of the advancing direction) is named as a downstream side lip land 18b.

Figure 7A:
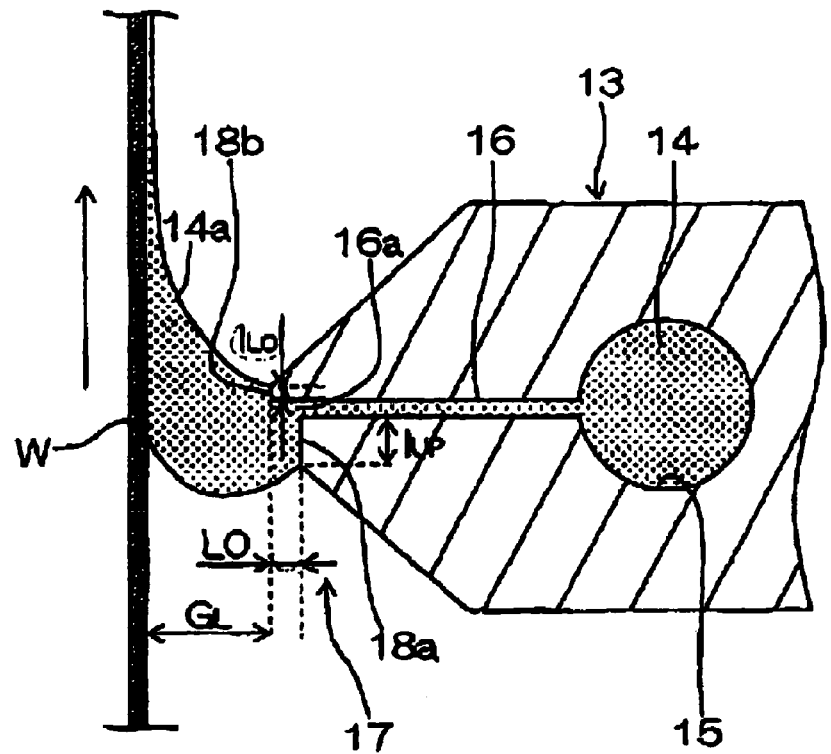
FIG. 7A shows a sectional shape of a slot die 13 which is used in carrying out the invention.
Figure 7B:
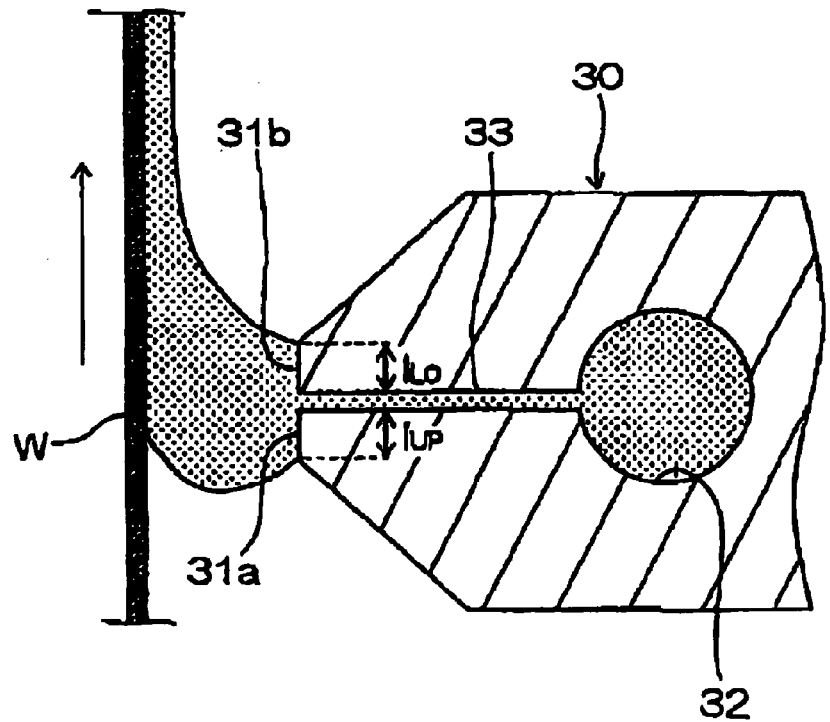
FIG. 7B is a sectional shape of a conventional slot die 30.

FIGS. 7A and 7B show the comparison in a sectional shape between the slot die 13 and a conventional slot die, in which FIG. 7A shows the slot die 13 which is suitably used in the invention, and FIG. 7B shows a conventional slot die 30. In the conventional slot die 30, a distance between an upstream side lip land 31a and a web W is equal to that between a downstream side lip land 31b and the web W. Incidentally, a symbol 32 shows a pocket, and a symbol 33 shows a slot. On the other hand, in the slot die 13 which is suitable in the invention, a land length $I_{LO}$ of a downstream side lip land 18b is made short, whereby coating with a wet film thickness of not more than 20 μm can be carried out with good accuracy.

Though a land length $I_{UP}$ of the upstream side lip land 18a is not particularly limited, it is preferably in the range of from 500 μm to 1 mm. The land length $I_{LO}$ of the downstream side lip land 18b is 30 μm or more and not more than 100 μm, preferably 30 μm or more and not more than 80 μm, and more preferably 30 μm or more and not more than 60 μm. When the land length $I_{LO}$ of the downstream side lip land 18b is shorter than 30 μm, an edge or a land of the tip lip is liable to be broken and a stripe is liable to be generated in the coating film, resulting in making it impossible to perform coating. Furthermore, it becomes difficult to set up the position of a wet line in the downstream side so that a problem that the coating solution is likely spread in the downstream side is caused. It has hitherto been known that this wet spreading of the coating solution in the downstream side means heterogeneity of the wet line, leading to a problem that a defective shape such as a stripe on the coating surface is brought. On the other hand, when the land length $I_{LO}$ of the downstream side lip land 18b is longer than 100 μm, since a bead itself cannot be formed, it is impossible to perform thin layer coating.

In addition, since the downstream side lip land 18b is in an overbyte shape close to the web W as compared with the upstream side lip land 18a, a degree of vacuum can be increased so that it becomes possible to form a bead suitable for thin film coating. A difference in distance between the downstream side lip land 18b and the upstream side lip land 18a from the web W (hereinafter referred to as "overbyte length LO") is preferably 30 μm or more and not more than 120 μm, more preferably 30 μm or more and not more than 100 μm, and most preferably 30 μm or more and not more than 80 μm. When the slot die 13 is in an overbyte shape, a gap $G_L$ between the tip lip 17 and the web W shows a gap between the downstream side lip land 18b and the web W.

Figure 8:
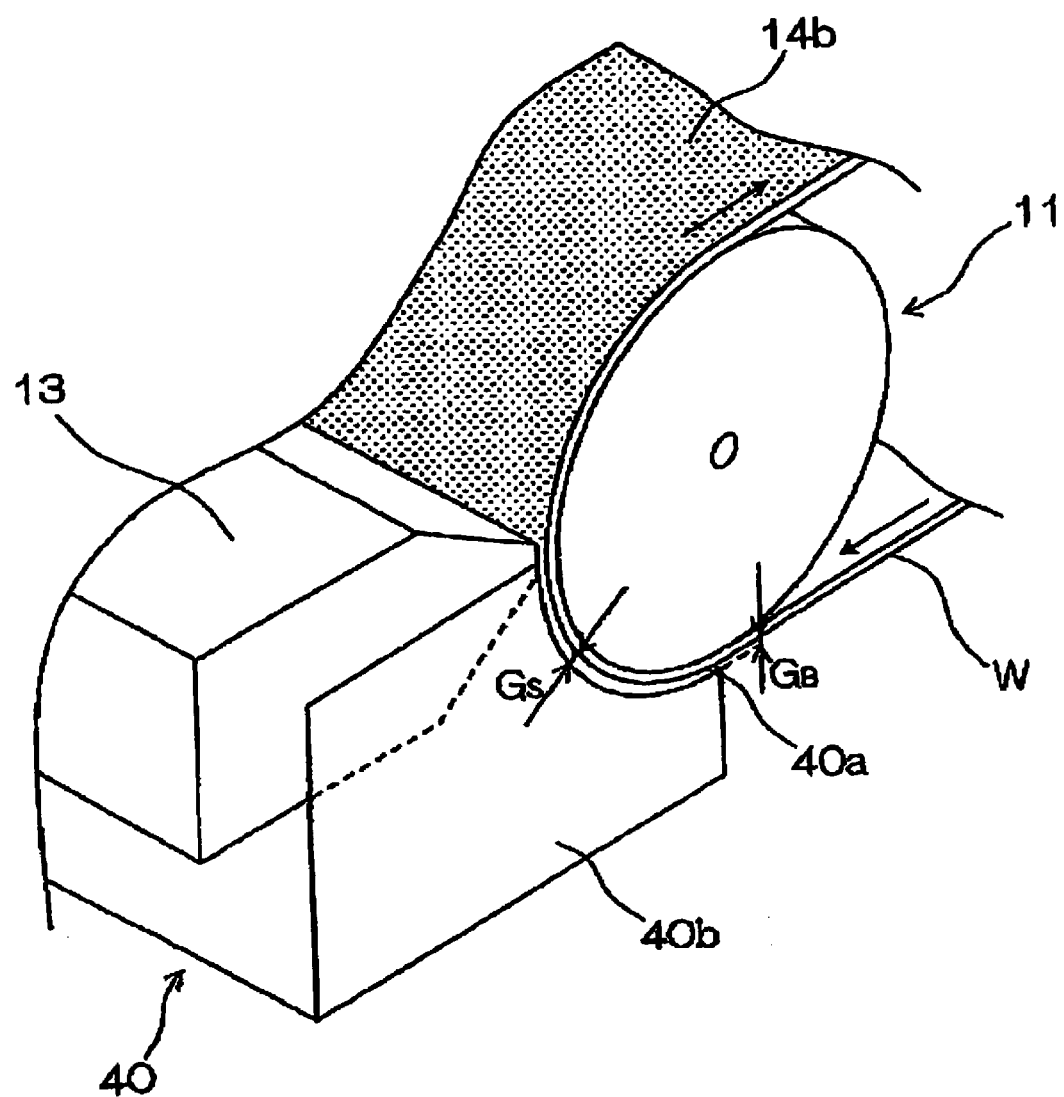
FIG. 8 is an oblique view to show a slot die 13 in a coating step which is employed in carrying out the invention and its surroundings.

FIG. 8 is an oblique view to show a slot die in the coating step which is suitable in the invention and its surroundings. In an opposite side to the side of the advancing direction of the web W, a vacuum chamber 40 is placed at a position not coming into contact with the web W such that the vacuum adjustment can be thoroughly achieved against the bead 14a. The vacuum chamber 40 is provided with a back plate 40a and a side plate 40b for keeping its working efficiency; and gaps $G_B$ and $G_S$ are present between the back plate 40a and the web W and between the side plate 40b and the web W, respectively.

Figure 9:
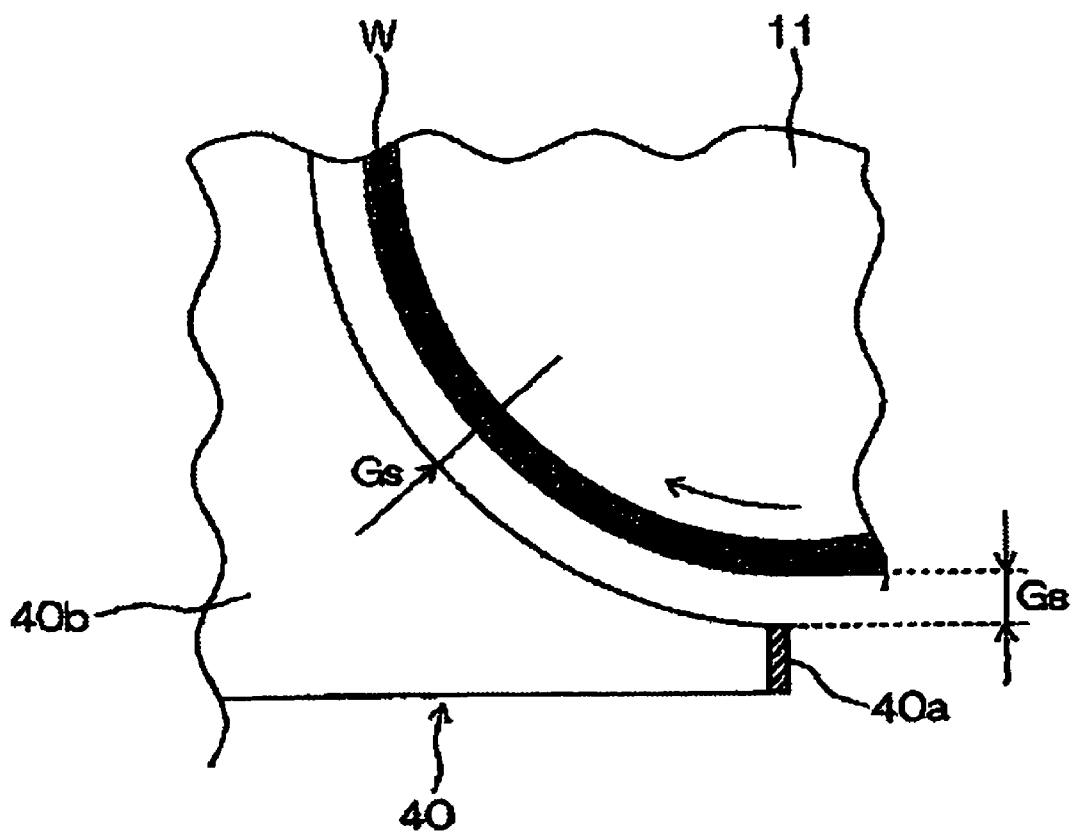
FIG. 9 is a sectional view to show a vacuum chamber 40 and a web W adjacent to each other (a back plate 40a is integrated with a main body of the chamber 40).
Figure 10:
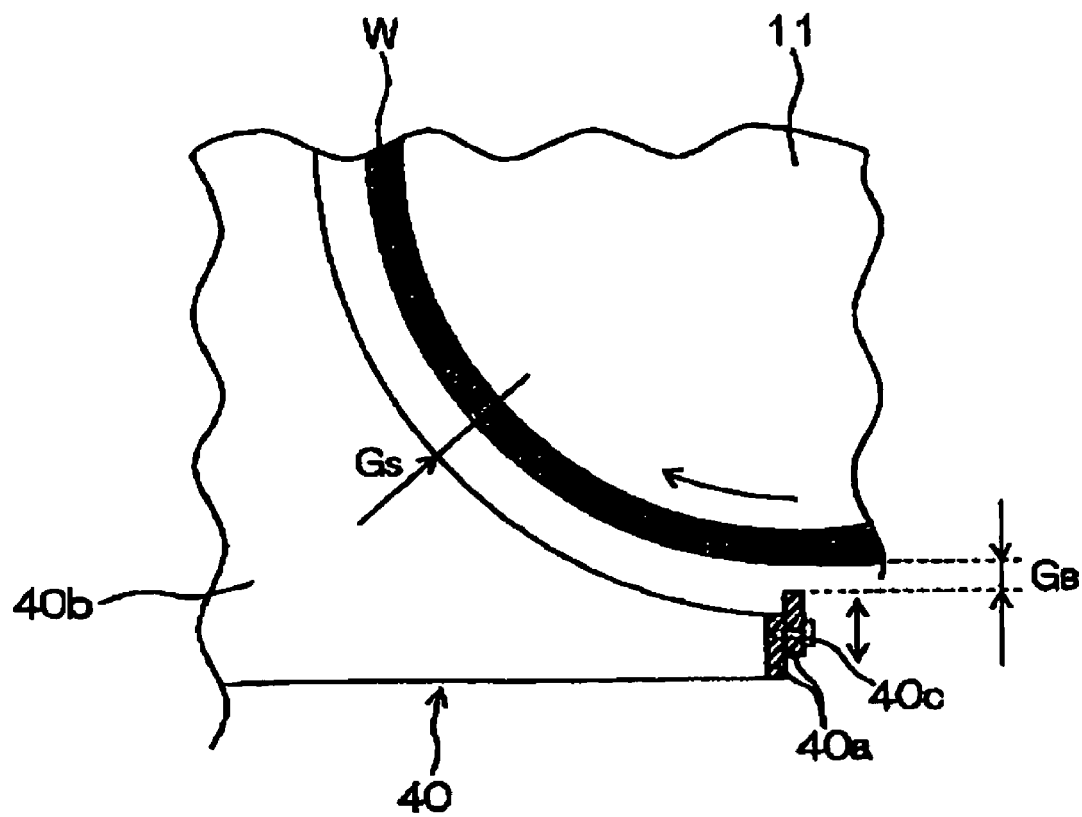
FIG. 10 is a sectional view to show other embodiment of a vacuum chamber 40 and a web W adjacent to each other (a back plate 40a is engaged with the chamber 40 by a screw 40c).

FIGS. 9 and 10 are each a sectional view to show the vacuum chamber 40 and the web W adjacent to each other. The side plate and the back plate may be integrated with the chamber main body as illustrated in FIG. 9, or may have a structure in which the side plate and the back plate are engaged with the chamber by a screw or the like so as to properly change the gap as illustrated in FIG. 10. In all of these structures, actually opened portions between the back plate 40a and the web W and between the side plate 40b and the web W are defined as gap $G_B$ and $G_S$, respectively. In the case where the vacuum chamber 40 is placed beneath the web W and the slot die 13 as illustrated in FIG. 8, the gap $G_B$ between the back plate 40a of the vacuum chamber 40 and the web W exhibits a gap from the uppermost end of the back plate 40a to the web W.

It is preferable that the gap $G_B$ between the back plate 40a and the web W is made larger than the gap $G_L$ between the tip lip 17 of the slot die 13 and the web W. In this way, it is possible to suppress a change of vacuum degree in the vicinity of the bead as caused due to eccentricity of the backup roll 11. For example, when the gap $G_L$ between the tip lip 17 of the slot die 13 and the web W is 30 μm or more and not more than 100 μm, the gap $G_B$ between the backup plate 40a and the web W is preferably from 100 μm or more and not more than 500 μm.

[Hardening Method of Film]

In the invention, the hardening may be achieved by directly irradiating ionizing radiations after drying or by heat hardening after drying and then irradiating ionizing radiations. In all of the cases, in achieving hardening upon irradiation with ionizing radiations, it is preferred to achieve hardening by a step for irradiating ionizing radiations in an atmosphere having an oxygen concentration of not more than 3% by volume and keeping the atmosphere having an oxygen concentration of not more than 3% by volume for a period of time of 0.5 seconds or more after starting the irradiation with ionizing radiations. By feeding an inert gas into an ionizing radiation irradiation chamber and setting up a condition so as to slightly blow out the inert gas into a web inlet side of the reaction chamber, not only it is possible to exclude entrained air following the conveyance and to effectively decrease an oxygen concentration of the reaction chamber, but also it is possible to effectively decrease a substantial oxygen concentration on the polar surface having large hardening hindrance due to oxygen. The direction of the inert gas flow in the web inlet side of the irradiation chamber can be controlled by adjusting a balance between air supply and exhaustion of the irradiation chamber.

With respect to a method for excluding the entrained air, it is preferably employed to blow the inert gas directly on the web surface. In particular, it is preferable that the low refractive index layer which is the outermost layer and which is thin in thickness is hardened by this method.

Furthermore, by providing a front chamber before the foregoing reaction chamber to exclude oxygen on the web surface in advance, it is possible to make the hardening proceed more efficiently. Moreover, for the purpose of efficiently using the inert gas, a gap between the side face constructing the web inlet side of the ionizing radiation reaction chamber or front chamber and the web surface is preferably from 0.2 to 15 mm, more preferably from 0.2 to 10 mm, and most preferably from 0.2 to 5 mm.

However, in order to continuously produce a web, it is necessary to join and connect the web. For joining, there is widely used a method of sticking it with a joining tape, etc. For that reason, when the gap between the inlet face of the ionizing radiation reaction chamber or front chamber and the web is excessively narrow, there is caused a problem such that a joining member such as a joining tape is stuck. For that reason, in order to make the gap narrow, it is preferable that at least a part of the inlet face of the ionizing radiation reaction chamber or front chamber is made movable such that when a joining part enters, the gap is widened in a proportion corresponding to the joining thickness. In order to realize this, there are employable a method in which the inlet face of the ionizing radiation reaction chamber or front chamber is made movable back and forth in the direction of movement and when the joining part passes therethrough, moves back and forth, thereby widening the gap; and a method in which the inlet face of the ionizing radiation reaction chamber or front chamber is made movable in a direction vertical to the web surface and when the joining part passes therethrough, moves up and down, thereby widening the gap.

At the time of irradiating ionizing radiations, the oxygen concentration of the atmosphere is not more than 3% by volume, preferably not more than 1% by volume, and further preferably not more than 0.5% by volume. In order to reduce the oxygen concentration, a large amount of an inert gas such as nitrogen is required. Accordingly, from the viewpoint of production costs, it is preferable that the oxygen concentration is not lowered to more than the necessity. As a measure for lowering the oxygen concentration, it is preferred to substitute the air (nitrogen concentration: about 79% by volume, oxygen concentration: about 21% by volume) with other gas. It is especially preferred to substitute (purge) the air with nitrogen.

In the invention, it is preferable that at least one layer as stacked on the transparent substrate is irradiated with ionizing radiations in an atmosphere having an oxygen concentration of 3% by volume or more and kept at the atmosphere having an oxygen concentration of not more than 3% by volume for a period of time of 0.5 seconds or more after starting the irradiation with ionizing radiations. The time for keeping the low oxygen concentration atmosphere is preferably 0.7 seconds or more and not more than 60 seconds, and more preferably 0.7 seconds or more and not more than 10 seconds. When the time for keeping the low oxygen concentration atmosphere is 0.5 seconds or more, the hardening reaction sufficiently proceeds so that hardening can be thoroughly achieved, and therefore, such is preferable. Furthermore, when the low oxygen condition is kept for a long period of time, the equipment becomes large in size, and a large amount of an inert gas is required. Thus, the subject time is preferably not more than 60 seconds.

In the invention, at least one layer as stacked on the transparent substrate can be hardened upon irradiation with ionizing radiations plural times. In this case, it is preferable that at least two times of the irradiation with ionizing radiations is carried out in continuous reaction chambers where the oxygen concentration does not exceed 20% by volume. By carrying out plural times of the irradiation with ionizing radiations in reaction chambers having the same low oxygen concentration, it is possible to effectively ensure a reaction time necessary for hardening. In particular, in the case where the production speed is increased for the purpose of realizing high productivity, in order to ensure energy of ionizing radiations necessary for the hardening reaction, it is preferred to carry out the irradiation with ionizing radiations plural times. When insurance of a reaction time necessary for the hardening reaction is also taken into consideration, the foregoing embodiment is effective.

In the invention, the species of the ionizing radiations is not particularly limited and can be properly selected among ultraviolet rays, electron beams, near ultraviolet rays, visible light, near infrared rays, infrared rays, and X-rays depending upon the kind of the hardenable composition from which a film is formed. However, in the invention, irradiation with ultraviolet rays is preferable. The irradiation with ultraviolet rays is preferable because the polymerization speed is fast, the equipment can be made compact, the species of compounds which can be selected is abundant, and the costs are low.

In the case of irradiation with ultraviolet rays, an extra-high pressure mercury vapor lamp, a high pressure mercury vapor lamp, a low pressure mercury vapor lamp, a carbon arc lamp, a xenon arc lamp, a metal halide lamp, and so on can be utilized. Furthermore, in the case of irradiation with electron beams, electron beams having energy of from 50 to 1,000 keV which are emitted from a variety of electron beam accelerators such as a Cockcroft-Walton type electron beam accelerator, a van de Graaff type electron beam accelerator, a resonant transformation type electron beam accelerator, an insulating core transformer type electron beam accelerator, a linear type electron beam accelerator, a dynamitron type electron beam accelerator, and a high frequency type electron beam accelerator are used.

[Utilization of Antireflection Film]

In the case where the antireflection film of the invention is used in a display device, for example, a liquid crystal display device, it can be arranged on the outermost surface of the display device by providing an adhesive layer on one surface thereof or other means. Furthermore, a triacetyl cellulose film is often used as a protective film for protecting a polarizing film of a polarizing plate. In the case where the transparent support of the antireflection film of the invention is a triacetyl cellulose film, it is preferable in view of costs to use the subject antireflection film as a protective film as it stands.

[Saponification Treatment]

In the case where the antireflection film of the invention is arranged on the outermost surface of a display device by providing an adhesive layer on one surface thereof or other means or is used as a protective film for polarizing plate as it is, for the purpose of sufficiently achieving the adhesion, it is preferred to carry out a saponification treatment after forming an outermost layer on the transparent support.

The saponification treatment is carried out by a known measure, for example, dipping the antireflection film in an alkaline solution for a proper period of time. After dipping in the alkaline solution, it is preferable that the antireflection film is thoroughly washed with water or that the antireflection film is dipped in a dilute acid, thereby neutralizing an alkaline component such that the alkaline component does not remain in the subject film. By the saponification treatment, the surface of the transparent support in the opposite side to the side having the outermost layer is hydrophilized.

The hydrophilized surface is especially effective for improving the adhesion properties to a polarizing film containing polyvinyl alcohol as a major component. Furthermore, in the hydrophilized surface, since dusts in air hardly attach thereto, the dusts hardly come into a space between the polarizing film and the antireflection film during adhering to the polarizing film. Thus, the hydrophilized surface is effective for preventing a point defect due to the dusts.

The saponification treatment is preferably carried out such that a contact angle of the surface of the transparent support in the opposite side having the outermost layer is preferably not more than 40°, more preferably not more than 30°, and especially preferably not more than 20°.

A concrete measure of the alkaline saponification treatment can be selected among the following two measures. The measure (1) is superior in view of the point that it can be carried out in the same step as in a general-purpose triacetyl cellulose film. However, since even the surface of the antireflection layer is also subjected to a saponification treatment, there may be caused problems that the surface is subjected to alkaline hydrolysis, thereby deteriorating the layer and that when a saponification treatment solution remains, it becomes a stain. In that case, the measure (2) is superior even when a special step is required.

(1) After forming an antireflection layer on a transparent support, a back surface of the subject film is subjected to a saponification treatment by dipping in an alkaline solution at least one time.

(2) Before or after forming an antireflection layer on a transparent support, an alkaline solution is coated on a surface in an opposite side to a surface of the subject antireflection film in a side on which the antireflection layer is formed, heated, washed with water and/or neutralized, thereby subjecting only the back surface of the subject film to a saponification treatment.

<Applications of Antireflection Film>

[Polarizing Plate]

A polarizing plate is configured mainly of two protective films sandwiching a polarizing film from the both surfaces thereof. It is preferable that the antireflection film of the invention is used for at least one of the two protective films sandwiching a polarizing film from the both surfaces thereof. When the antireflection film of the invention also functions as a protective film, the manufacturing costs of the polarizing plate can be reduced. Furthermore, by using the antireflection film of the invention is used as the outermost surface layer, it is possible to form a polarizing plate which is prevented from reflection of external light or the like and which is excellent in scar resistance, antifouling properties, etc.

[Polarizing Film]

As a polarizing film, a known polarizing film can be used. Furthermore, a polarizing film which is cut out from a longitudinal polarizing film, an absorption axis of which is neither parallel nor vertical to the longitudinal direction, can also be used. A longitudinal polarizing film, an absorption axis of which is neither parallel nor vertical to the longitudinal direction, can be prepared by the following measure.

That is, such a longitudinal polarizing film can be manufactured by a stretching method in which a polarizing film as prepared by stretching a continuously fed polymer film by imparting a tension while holding both ends thereof by a holding measure is stretched 1.1 to 20.0 times at least in a width direction of the film and bent in a state of holding the both ends of the film in an advancing direction of the film such that a difference in advancing rate in a longitudinal direction of a unit for holding the both ends of the film is within 3% and that an angle formed by the advancing direction of the film in an outlet of the step for holding the both ends of the film and a substantial stretching direction of the film is inclined at from 20 to 70°.

The stretching method of a polymer film is described in detail in paragraphs [0020] to [0030] of JP-A-2002-86554.

It is also preferable that of two protective films of a polarizing film, a film other than the antireflection film is an optical compensating film containing an optically anisotropic layer. The optical compensating film (retardation film) is able to improve a viewing angle characteristic of a liquid crystal display screen. Known optical compensating films can be used as the optical compensating film. An optical compensating film as described in JP-A-2001-100042 is preferable from the standpoint of widening a viewing angle.

[Display Device]

The antireflection film of the invention is used for display devices such as a liquid crystal display device (LCD), a plasma display panel (PDP), an electroluminescence display device (ELD), and a cathode ray tube display device (CRT).
[Liquid Crystal Display Device]

The antireflection film of the invention and the polarizing plate using the same can be advantageously used for display devices such as a liquid crystal display device. It is preferred to use the antireflection film of the invention or the polarizing plate using the same in the outermost surface layer of a display.

The liquid crystal display device has a liquid crystal cell and two polarizing plates as disposed in the both sides thereof, and the liquid crystal cell supports a liquid crystal between two electrode substrates. In addition, one optically anisotropic layer may be disposed between the liquid crystal cell and one of the polarizing plates, or two optically anisotropic layers may be disposed between the liquid crystal cell and each of the both polarizing plates.

It is preferred to use a TN mode, a VA mode, an OCB mode, an IPS mode, or an ECB mode as the liquid crystal cell.
(TN Mode)

In a liquid crystal cell of a TN mode, a rod-like liquid crystalline molecule is substantially horizontally aligned and further aligned in a twisted state at from 60° to 120° at the time of applying no voltage.

The liquid crystal cell of a TN mode is most frequently utilized as a color TFT liquid crystal display device and described in many references.
(VA Mode)

In a liquid crystal cell of a VA mode, a rod-like liquid crystalline molecule is substantially vertically aligned at the time of applying no voltage.

The liquid crystal cell of a VA mode includes, in addition to (1) a liquid crystal cell of a VA mode in a narrow sense in which a rod-like liquid crystalline molecule is substantially vertically aligned at the time of applying no voltage, whereas it is substantially horizontally aligned at the time of applying a voltage (as described in JP-A-2-176625), (2) a liquid crystal cell of a multi-domained VA mode (MVA mode) for enlarging a viewing angle (as described in *SID 97, Digest of Tech. Papers*, 28 (1997), page 845), (3) a liquid crystal cell of a mode (n-ASM mode) in which a rod-like liquid crystalline molecule is substantially vertically aligned at the time of applying no voltage and is subjected to twisted multi-domain alignment at the time of applying a voltage (as described in *Preprints of Forum on Liquid Crystal*, pages 58 to 59 (1998), and (4) a liquid crystal cell of a SURVIVAL mode (as announced in *LCD International* 98).
(OCB Mode)

A liquid crystal cell of an OCB mode is a liquid crystal cell of a bend alignment mode in which a rod-like liquid crystalline molecule is aligned in a substantially reverse direction (in a symmetric manner) in the upper and lower parts of a liquid crystal cell and is disclosed in U.S. Pat. Nos. 4,583,825 and 5,410,422. Since the rod-like liquid crystalline molecule is symmetrically aligned in the upper and lower parts of a liquid crystal cell, the liquid crystal cell of a bend alignment mode has a self optical compensating ability. For that reason, this liquid crystal mode is named as an OCB (optically compensatory bend) liquid crystal mode. A liquid crystal display device of a bend alignment mode involves an advantage such that the response speed is fast.
(IPS Mode)

A liquid crystal cell of an IPS mode is of a system of switching by applying a lateral electric field to a nematic liquid crystal and is described in detail in *Proc. IDRC (Asia Display '95)*, pages 577 to 580 and pages 707 to 710.

(ECB Mode)

In a liquid crystal cell of an ECB mode, a rod-like liquid crystalline molecule is substantially horizontally aligned at the time of applying no voltage. The ECB mode is one of liquid crystal display modes having the simplest structure and is described in detail in, for example, JP-A-5-203946.
[Displays Other than Liquid Crystal Display Device]
(PDP)

A plasma display panel (PDP) is in general constituted of a gas, a glass substrate, an electrode, an electrode lead material, a thick film printing material, and a fluorescent material. The glass substrate is constituted of two sheets of a front glass substrate and a rear glass substrate. In each of the two glass substrates, an electrode and an insulating layer are formed. In the rear glass substrate, a fluorescent material layer is further formed. The two glass substrates are assembled, and a gas is sealed therebetween.

The plasma display panel (PDP) is already marketed. The plasma display panel is described in JP-A-5-205643 and JP-A-9-306366.

There may be the case where a front plate is disposed in front of the plasma display panel. It is preferable that the front plate has a sufficient strength for protecting the plasma display panel. The front plate can be used at an interval from the plasma display panel or can be used by sticking directly on the plasma display panel main body.

In image display devices such as a plasma display panel, an optical film can be stuck directly on the display surface. Furthermore, in the case where a front plate is provided in front of the display, it is also possible to stick an optical film in the front side (external side) or rear side (display side) of the front plate.
(Touch Panel)

The antireflection film of the invention can be applied to touch panels as described in JP-A-5-127822 and JP-A-2002-48913, and so on.
(Organic EL Element)

The antireflection film of the invention can be used as a protective film of an organic EL element and so on.

In the case where the antireflection film of the invention is used in an organic EL element or the like, the contents as described in JP-A-11-335661, JP-A-11-335368, JP-A-2001-192651, JP-A-2001-192652, JP-A-2001-192653, JP-A-2001-335776, JP-A-2001-247859, JP-A-2001-181616, JP-A-2001-181617, JP-A-2002-181816, JP-A-2002-181617, and JP-A-2002-056976 can be applied. Furthermore, it is preferred to use the contents as described in JP-A-2001-148291, JP-A-2001-221916, and JP-A-2001-231443 in combination.
[Various Characteristic Values]

A variety of measurement methods and preferred characteristic values regarding the antireflection film of the invention will be shown below.
[Reflectance]

With respect to the measurement of mirror reflectance and color taste, by using a spectrophotometer "V-550" (manufactured by JASCO Corporation) having an adaptor "ARV-474" installed therein, a mirror reflectance at each of an incident angle of 50 and an outgoing angle of −5° is measured in a wavelength region of from 380 to 780 nm, and an average reflectance at from 450 to 650 nm is calculated, thereby evaluating anti-reflection properties.
[Color Taste]

With respect to a polarizing plate using the antireflection film of the invention as its protective film, it is possible to evaluate a color taste of regular reflected light against incident light at an incident angle of 5° in a region of a CIE stand light source $D_{65}$ having a wavelength of from 380 nm to 780 nm, namely a color taste by determining L*, a* and b* values of a CIE1976 L*, a* and b* color space.

It is preferable that the L*, a* and b* values are satisfied with the relationships of ($3 \leq L^* \leq 20$), ($-7 \leq a^* \leq 7$), and ($-10 \leq b^* \leq 10$), respectively. By making these values fall within the foregoing ranges, the color taste of reflected light of reddish violet color to bluish violet color, an aspect of which has hitherto been considered problematic, is reduced. In addition, when the L*, a* and b* values are satisfied with the relationships of ($3 \leq L^* \leq 10$), ($0 \leq a^* \leq 5$), and ($-7 \leq b^* \leq 0$), respectively, the foregoing conventional problem is largely reduced so that in the case where the polarizing plate is applied to a liquid crystal display device, even when external light having high luminance such as light emitted from a fluorescent lamp in a room is slightly reflected, a color taste is neutral so that it is not noticeable. In detail, in the case of ($a^* \leq 7$), a red taste does not become excessively strong, whereas in the case of ($a^* \geq 7$), a cyan taste does not excessively strong, and therefore, such is preferable. Furthermore, in the case of ($b^* \geq 7$), a blue taste does not become excessively strong, whereas in the case of ($b^* \leq 0$), a yellow taste does not become excessively strong, and therefore, such is preferable.

In addition, the color taste uniformity of reflected light can be obtained from a* and b* on an L*a*b* chromaticity diagram as determined from reflection spectra of reflected light at from 380 nm to 680 nm in terms of a conversion of color taste according to the following numerical expression (3).

[Conversion of color taste of $(a^*)$] = [$(a^*_{max} - a^*_{min})$/$a^*_{av}$]×100

[Conversion of color taste of $(b^*)$] = [$(b^*_{max} - b^*_{min})$/$b^*_{av}$]×100    Numerical Expression (3)

Here, $a^*_{max}$ and $a^*_{min}$ represent a maximum value and a minimum value of the a* value, respectively; $b^*_{max}$ and $b^*_{min}$ represent a maximum value and a minimum value of the b* value, respectively; and $a^*_{av}$ and $b^*_{av}$ represent an average value of the a* value and an average value of the b* value, respectively. The conversions of color are each preferably not more than 30%, more preferably not more than 20%, and most preferably not more than 8%.

Furthermore, the antireflection film of the invention preferably has a $\Delta E_w$ which is a change of color taste before and after the weather resistance test of not more than 15, more preferably not more than 10, and most preferably not more than 5. When the $\Delta E_w$ falls within this range, it is possible to achieve both low reflection and a reduction of the color taste of reflected light. Accordingly, for example, in the case where the film of the invention is applied to the outermost layer of an image display device, even when external light having high luminance such as light emitted from a fluorescent lamp in a room is slightly reflected, a color taste is neutral and the quality of a display image becomes good, and therefore, such is preferable.

The foregoing $\Delta E_w$ which is a change of color taste can be determined according to the following numerical expression (4).

$$\Delta E_w = [(\Delta L_w)^2 + (\Delta a_w)^2 + (\Delta b_w)^2]^{1/2}$$    Numerical Expression (4)

Here, $\Delta L_w$, $\Delta a_w$ and $\Delta b_w$ represent a change amount of the L* value, a change amount of the a* value and a change amount of the b* value before and after the weather resistance test, respectively.

[Transmitted Image Sharpness]

Transmitted image sharpness can be measured by an image sharpness meter (MICM-2D Model) as manufactured by Suga Test Instruments Co., Ltd. by using an optical comb with a slit width of 0.5 mm according to JIS K7105.

The antireflection film of the invention preferably has a transmitted image sharpness of 60% or more. The transmitted image sharpness is in general an index to show a blurring state of an image which is transmitted through the film and projected. The larger this value, the better the sharpness of the image as seen through the film is. The transmitted image sharpness is preferably 70% or more, and more preferably 80% or more.

[Surface Roughness]

The measurement of central line mean roughness (Ra) in the antireflection film of the invention can be carried out according to JIS B0601.

[Haze]

As haze of the antireflection film of the invention, a haze value as automatically measured as "haze=[(scattered light)/(whole transmitted light)]×100 (%)" using a turbidimeter "NDH-1001DP" as manufactured by Nippon Denshoku Industries Co., Ltd. was used.

The haze of the antireflection film of the invention is preferably not more than 1.5%, more preferably not more than 1.2%, and most preferably not more than 1.0%.

[Goniophotometer Scattering Intensity Ratio]

By using "GoniophotoMeter: GP-5 Model" (manufactured by Murakami color Research Laboratory), an antireflection film was disposed vertical to the incident light, and a scattered light profile was measured in every direction. The Goniophotometer scattering intensity ratio can be determined from a scattered light intensity at an outgoing angle of 30° against a light intensity at an outgoing angle of 0°.

[Scar Resistance]

(Evaluation of Scar Resistance by Steel Wool)

By carrying out a rubbing test under the following condition by using a "rubbing tester", it is possible to provide an index for scar resistance.

Evaluation circumstance condition: 25° C., 60% RH

Rubbing material: steel wool (manufactured by Nippon Steel Wool Co., Ltd., Grade No. 0000). The steel wool is wound around a tip part (1 cm×1 cm) of the tester coming into contact with a sample and fixed by a band.

Movement distance (one way): 13 cm

Rubbing rate: 13 cm/sec

Load: 500 g/cm² and 200 g/cm²

Contact area of tip part: 1 cm×1 cm

Number of rubbing: 10 reciprocations

An oily black ink is applied in the rear side of the rubbed sample, and a scar of the rubbed portion is evaluated by visual observation by reflected light or by a difference in quantity of reflected light from that in other portion than the rubbed portion.

(Evaluation of Scar Resistance by Eraser Rubbing)

By carrying out a rubbing test under the following condition by using a "rubbing tester", it is possible to provide an index for scar resistance.

Evaluation circumstance condition: 25° C., 60% RH

Rubbing material: plastic eraser (MONO, manufactured by Tombow Pencil Co., Ltd.). The plastic eraser is fixed in a tip part (1 cm×1 cm) of the tester coming into contact with a sample.

Movement distance (one way): 4 cm

Rubbing rate: 2 cm/sec

Load: 500 g/cm²

Contact area of tip part: 1 cm×1 cm

Number of rubbing: 100 reciprocations

An oily black ink is applied in the rear side of the rubbed sample, and a scar of the rubbed portion is evaluated by visual observation by reflected light or by a difference in quantity of reflected light from that in other portion than the rubbed portion.

(Taber Test)

Scar resistance can be evaluated from an abrasion amount of a specimen before and after the test by a taber test according to JIS K5600-5-8. It is preferable that this abrasion amount is low as far as possible.

[Hardness]

(Pencil Hardness)

Hardness of the antireflection film of the invention can be evaluated by a pencil hardness test according to JIS K5600-5-8. The pencil hardness is preferably H or more, more preferably 2H or more, and most preferably 3H or more.

(Surface Elastic Modulus)

Surface elastic modulus in the antireflection film of the invention is a value as determined by using a micro-surface hardness tester (Fischer Scope H100VP-HCU, manufactured by Fischer Instruments K.K.). Concretely, the surface elastic modulus is an elastic modulus as determined from changes a load and displacement at the time of eliminating a load by using a diamond-made quadrangular pyramid indentator (tip facing angle: 136°) and measuring an indentation depth under a proper test load within the range where the indentation depth does not exceed 1 µm.

(Universal Hardness)

Furthermore, the surface hardness can be determined, too as a universal hardness by using the foregoing micro-surface hardness tester. The universal hardness is a value obtained by measuring an indentation depth under a test load of a quadrangular pyramid indentator and dividing the test load by a surface area of an impression as generated under the foregoing test load which is calculated from a geometrical shape of that impression. It is known that there is a positive correlation between the foregoing surface elastic modulus and the universal hardness.

[Antifouling Properties Test]

(Marker Ink Wiping Properties)

An antireflection film is fixed on a glass surface by an adhesive; a circle of a diameter of 5 mm is written in three times by a pen tip (fine) of a black marking pen "McKee Ultra-fine (a trade name of Zebra Co., Ltd.)" under a condition at 25° C. and 60 RH %; and after 5 seconds, wiping is carried out 20 reciprocations by a bundle often-ply folded BEMCOT (a trade name of Asahi Kasei Corporation) under a load to an extent that the BEMCOT bundle is indented. By repeating the foregoing writing and wiping under the foregoing condition until the marker ink mark does not disappear by wiping, it is possible to evaluate antifouling properties in terms of the number of wiping at which wiping is possible.

The number of wiping until the marker ink mark does not disappear is preferably 5 or more, and more preferably 10 or more.

With respect to a black marker ink, a circle having a diameter of 1 cm is drawn and painted over on a sample by using MAGIC INK No. 700 (M700-T1 Black) Ultra-fine and after standing for 24 hours, is rubbed by BEMCOT. Then, the wiping properties can be evaluated by whether or not the marker ink is wiped off.

[Surface Tension]

In the invention, a surface tension of a coating solution for forming a functional layer such as a low refractive index layer can be measured under an environment at a temperature of 25° C. by using a surface tension meter (KYOWA CBVP SURFACE TENSIONMETER A3, manufactured by Kyowa Interface Science Co., Ltd.).

[Contact Angle]

Using a contact angle meter ("CA-X" type contact angle meter, manufactured by Kyowa Interface Science Co., Ltd.), a droplet having a diameter of 1.0 mm was prepared in a needle tip in a dry state (at 20° C. and 65% RH) by using pure water as a liquid, which was then brought into contact with the surface of an antireflection film to prepare a droplet on the subject antireflection film. At a point at which the antireflection film and the liquid come into contact with each other, an angle formed between the tangential line to the liquid surface and the film surface and in a side containing the liquid is defined as a contact angle.

[Surface Free Energy]

Surface energy can be determined by a contact angle method, a method for measuring heat of wetting, or an adsorption method as described in *Foundation and Application of Wetting*, published by Realize Advanced Technology Limited, Dec. 10, 1989. In the case of the film of the invention, it is preferred to employ a contact angle method. Concretely, two kinds of solvents having known surface energy are dropped on a cellulose acylate film; an angle of the droplet-containing side is defined by an angle formed between the tangential line drawn against the droplet and the film surface in a point of intersection of the droplet surface with the film surface; and the surface energy of the film can be computed by calculation.

The surface free energy ($\gamma s^v$: unit, mN/m) of the film of the invention as referred to herein means a surface tension of the antireflection film as defined by a value $\gamma s^v$ ($=\gamma s^d + \gamma s^h$) which is expressed by the total sum of $\gamma s^d$ and $\gamma s^h$ as determined by the following simultaneous equations (a) and (b) from contact angles $\theta_{H2O}$ and $\theta_{CH2I2}$ of pure water $H_2O$ and methylene iodide $CH_2I_2$, respectively on the antireflection film as experimentally determined while referring to D. K. Owens, *J. Appl. Polym. Sci.*, 13, 1974 (1969). When this $\gamma s^v$ is small and the surface free energy is low, the film is high in surface repellency and generally excellent in antifouling properties.

$$1 + \cos \theta_{H2O} = 2\sqrt{\gamma s^d}(\sqrt{\gamma_{H2O}^d/\gamma_{H2O}^v}) + 2\sqrt{\gamma s^h}(\sqrt{\gamma_{H2O}^h/\gamma_{H2O}^v}) \quad \text{Equation (a)}$$

$$1 + \cos \theta_{CH2I2} = 2\sqrt{\gamma s^d}(\sqrt{\gamma_{CH2I2}^d/\gamma_{CH2I2}^v}) + 2\sqrt{\gamma s^h}(\sqrt{\gamma_{CH2I2}^h/\gamma_{CH2I2}^v}) \quad \text{Equation (b)}$$

$\gamma_{H2O}^d = 21.8$, $\gamma_{H2O}^h = 51.0$, $\gamma_{H2O}^v = 72.8$
$\gamma_{CH2I2}^d = 49.5$, $\gamma_{CH2I2}^h = 1.3$, $\gamma_{CH2I2}^v = 50.8$ The contact angle measurement was carried out by subjecting the antireflection film to humidity control for one hour or more under a condition at 25° C. and 60%, dropping 2 µL of a droplet on the film by using an automatic contact angle meter "CA-V150 Model", manufactured by Kyowa Interface Science Co., Ltd. and after 30 seconds, determining a contact angle.

The surface free energy of the antireflection film of the invention is preferably not more than 25 mN/m, and especially preferably not more than 20 mN/m.

[Curl]

The measurement of curl is carried out by using a template for measuring the curl of Method A in the "Determination of the curl of photographic film" of JIS K7619-1988.

The measurement is carried out under a condition at 25° C. and at a relative humidity of 60% for a humidity control time of 10 hours.

In the antireflection film of the invention, the curl preferably has a value as expressed by the following numerical expression (6) in the range of from −15 to +15, more preferably in the range of from −12 to +12, and further preferably in the range of from −10 to +10. At this time, in the case of coating in a web state, the measurement direction of the curl within a sample is a conveyance direction of the substrate.

Curl=1/R    Numerical Expression (6)

R represents a radius of curvature (m).

This is an important characteristic for preventing cracking or film separation from occurring in manufacturing, processing and handling in markets of the film. It is preferable that the curl value falls within the foregoing range and is small. Here, what the curl is a plus value means that the coating side of the film is curved inwardly, whereas what the curl is a minus value means that the coating side of the film is curved outwardly.

Furthermore, in the film of the invention, when only the relative humidity is changed to 80% and 10%, respectively on the basis of the foregoing curl measurement method, an absolute value of a difference in the curl value therebetween is preferably from 24 to 0, more preferably from 15 to 0, and most preferably from 8 to 0. This is a characteristic which is related to handling properties, separation and cracking when the film is stuck under a variety of humidity.

[Evaluation of Adhesion]

The adhesion between the layers or between the support and the coating layer in the antireflection film can be evaluated by the following method.

The surface of the film in a side at which the coating layer is present is subjected to cross-cutting with 11 lines in length and 11 lines in width at intervals of 1 mm by using a cutter knife, thereby providing 100 squares in total; a polyester pressure sensitive adhesive tape (No. 31B) manufactured by Nitto Denko Corporation is brought into press contact therewith; and after standing for 24 hours, a peeling test is repeated three times in the same place, thereby visually observing the presence or absence of peeling. It is preferable that peeling is observed within ten in the hundred squares; and it is more preferable that peeling is observed within two in the hundred squares.

[Brittleness Test (Cracking Resistance)]

Cracking resistance is an important characteristic for preventing cracking defects in handling such as coating, processing and cutting of the antireflection film, coating of an adhesive, and sticking to a variety of substances from occurring.

Surface cracking can be evaluated by cutting an antireflection film sample into a size of 35 mm×140 mm, allowing it to stand for 2 hours under a condition at a temperature of 25° C. and a relative humidity of 60%, and rolling up it in a cylindrical shape, thereby measuring a diameter of curvature at which cracking starts to occur.

With respect to the cracking resistance of the film of the invention, when the film is rolled up such that the coating layer side is positioned outwardly, the diameter of curvature at which the cracking occurs is preferably not more than 50 mm, more preferably not more than 40 mm, and most preferably not more than 30 mm. With respect to cracking in an edge part, it is preferable that no cracking occurs or a length of cracking is less than 1 mm in average.

[Surface Resistivity]

A surface resistivity of the film of the invention was measured under a condition at 25° C. and 60% RH by using a megger/micro ammeter "TR8601" (manufactured by Advantest Corporation). A common logarithm of surface resistivity ($\Omega/\square$) is taken, from which is then calculated a value of log SR.

[Dust Removal Properties]

Dust removal properties can be evaluated by sticking the antireflection film of the invention to a monitor, sprinkling a dust (for example, flocks of futon or fiber) onto the monitor surface and wiping the dust by a cleaning cloth.

It is preferable that the dust can be completely removed by wiping of six times; and it is more preferable that the dust can be completely removed by wiping within three times.

[Drawing Performance of Liquid Crystal Display Device]

Evaluation methods of characteristics and preferred states at the time of using the antireflection film of the invention on a display device will be described below.

A polarizing plate in the viewing side as provided in a liquid crystal display device using a TN type liquid crystal cell "TH-15TA2" (manufactured by Matsushita Electric Industrial Co., Ltd.) is peeled off, and instead thereof, the antireflection film or polarizing plate of the invention is stuck via an adhesive such that the coating surface is present in the viewing side and that the transmission axis of the polarizing plate is coincident with the polarizing plate stuck on the product. A variety of the following characteristics can be visually evaluated from various viewing angles in a bright room at 500 Lx while black displaying the liquid crystal display device.

(Drawing Image Unevenness and Color Taste)

By using an analyzer ("EZ-Contrast 160D", manufactured by ELDIM), unevenness and change in color taste at the time of black display (L1) are visually evaluated by plural observers.

When ten observers make the evaluation, it is preferred that not more than three observers are able to recognize unevenness, change in color taste left and right, change in color taste by the temperature and humidity, and white blurring; and it is more preferable that nobody is able to recognize them.

Furthermore, with respect to the reflection of external light, change of the reflection can be visually relatively evaluated by using a fluorescent lamp.

(Light Leakage of Black Display)

A rate of light leakage of black display at an azimuth direction of 45° from the front of the liquid crystal display device and a polar angle direction of 70° is measured. The rate of light leakage is preferably not more than 0.4%, and more preferably not more than 0.1%.

(Contrast and Viewing Angle)

With respect to contrast and viewing angle, a contrast ratio and a viewing angle (extent of an angle range in which the contrast ratio is 10 or more) in the left and right direction (orthogonal direction to the rubbing direction of cell) can be examined by using an analyzer "EZ-Contrast 160D" (manufactured by ELDIM).

EXAMPLES

The invention will be described below in more detail on the basis of the following Examples, but it should not be construed that the invention is limited thereto.

<Preparation of Antireflection Film>

[Preparation of Coating Solution for Forming Each Layer]

(Synthesis of Illustrative Compound IC-6)

5.27 g of the following compound A and 2.97 g of 3-isocyanatopropyl triethoxysilane were dissolved in 25 cm³ of 2-butanone, to which was then added 25 mg of di-n-butyltin diacetate, and the mixture was heated with stirring at 50° C. for 10 hours. Thereafter, the reaction mixture was cooled to room temperature and after filtration, added dropwise in 300 cm³ of hexane. A deposited crystal was filtered in vacuo, washed with hexane and then dried in vacuo, thereby obtaining 3.90 g of a silane coupling group-containing photo radical polymerization initiator (Compound No.: IC-6) which is an organosilane compound.

$^1$H-NMR (DMSO-d$_6$): 0.60 (m, 2H), 1.17 (t, J=9.4 Hz, 9H), 1.55 (m, 2H), 3.07 (m, 2H), 3.77 (q, J=9.4 Hz, 6H), 7.29 (d, J=11.2 Hz, 2H), 7.92 (t, J=7.5 Hz, 1H), 8.03 (d, J=11.6 Hz, 2H), 8.13 (d, J=11.6 Hz, 2H), 8.58 (d, J=12.0 Hz, 2H), 10.76 (s, 1H).

Melting point: 177.2 to 180.0° C.

Compound A

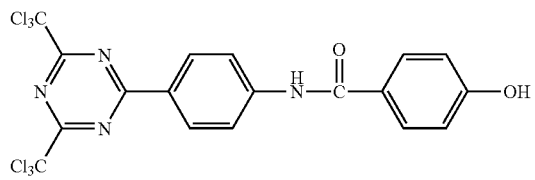

Compound IC-6

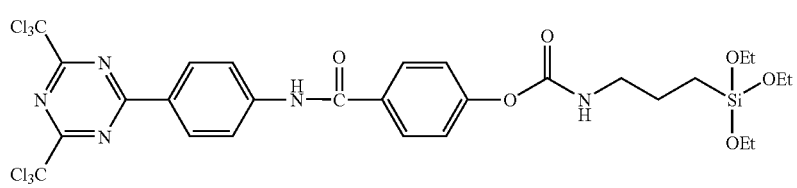

[Preparation of Sol Solution (a-1)]

A 1,000-mL reactor equipped with a thermometer, a nitrogen introducing tube and a dropping funnel was charged with 187 g (0.80 moles) of 3-acryloyloxypropyl trimethoxysilane, 27.2 g (0.20 moles) of methyl trimethoxysilane, 320 g (10 moles) of methanol and 0.06 g (0.001 moles) of potassium fluoride, and 15.1 g (0.86 moles) of water was gradually added dropwise with stirring at room temperature. After completion of the dropwise addition, the mixture was stirred for 3 hours and then stirred by heating for 2 hours under refluxing with methanol. Thereafter, a low boiling component was distilled off in vacuo, and the residue was filtered to obtain 120 g of a sol solution (a-1).

The thus obtained substance was measured by GPC. As a result, the substance had a weight average molecular weight of 1,500, and among components including oligomer or polymer components, components having a molecular weight of from 1,000 to 20,000 accounted for 30% by weight. Furthermore, it was revealed from a measurement result by 1H-NMR that the resulting substance had a structure represented by the following formula.

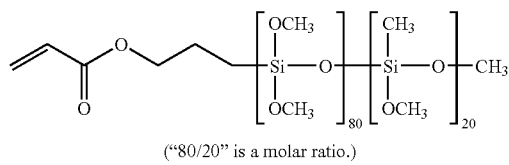

("80/20" is a molar ratio.)

In addition, a condensation rate α by the $^{29}$Si—NMR measurement was 0.56. It was understood from this analysis result that in the present silane coupling agent sol, a linear structure part accounted for the majority. Furthermore, the gas chromatographic analysis revealed that a residual rate of the starting acryloyloxypropyl trimethoxysilane was not more than 5% by weight.

[Preparation of Sol Solution (b-1)]

In a reactor equipped with a stirrer and a reflux condenser, 119 parts by weight of methyl ethyl ketone, 101 parts by weight of 3-acryloyloxypropyl trimethoxysilane "KBM-5103" (manufactured by Shin-Etsu Chemical Co., Ltd.) and 3 parts by weight of diisopropoxyaluminum ethyl acetoacetate were added and mixed. After adding 30 parts of ion exchanged water, the mixture was allowed to react at 60° C. for 4 hours, followed by cooling to room temperature, thereby obtaining a sol solution (b-1).

The sol solution (b-1) had a weight average molecular weight of 1,600, and among components including oligomer or polymer components, components having a molecular weight of from 1,000 to 20,000 accounted for 100% by weight. Furthermore, the gas chromatographic analysis revealed that the starting acryloyloxypropyl trimethoxysilane did not remain at all. This sol solution (b-1) had an SP value of 22.4.

| [Preparation of coating solution (HC-1) for forming a hard coat layer] | |
|---|---|
| "DPHA" | 150.0 g |
| Methyl ethyl ketone/cyclohexanone (50/50) | 206.0 g |
| "MEK-ST" (silica particle) | 333.0 g |
| "IRGACURE 184" | 7.5 g |
| Methyl ethyl ketone (MEK) | 49.0 g |

The foregoing mixed solution was filtered through a polypropylene-made filter having a pore size of 30 μm, thereby preparing a coating solution (HC-1) for forming a hard coat layer.

| [Preparation of coating solution (HC-2) for forming a hard coat layer] | |
|---|---|
| "DeSolite Z7526" | 347.0 g |
| MEK/cyclohexanone (50/50) | 403.0 g |

The foregoing mixed solution was filtered through a polypropylene-made filter having a pore size of 30 μm, thereby preparing a coating solution (HC-2) for forming a hard coat layer.

| [Preparation of coating solution (HC-3) for forming a hard coat layer] | |
|---|---|
| "DPHA" | 135.0 g |
| MEK/cyclohexanone (50/50) | 196.0 g |
| "MEK-ST" (silica particle) | 300.0 g |
| Sol solution (a-1) | 25.0 g |
| MEK | 82.0 g |

The foregoing mixed solution was filtered through a polypropylene-made filter having a pore size of 30 µm, thereby preparing a coating solution (HC-3) for forming a hard coat layer.

[Preparation of coating solution (HC-4) for forming a hard coat layer]

| | |
|---|---|
| "PETA" | 50.0 g |
| "IRGACURE 184" | 2.0 g |
| "SX-350" (30% by weight) | 1.7 g |
| Crosslinked acryl-styrene particle (30% by weight) | 13.3 g |
| "FP-132" | 0.75 g |
| "KBM-5103" | 10.0 g |
| Toluene | 38.5 g |

The foregoing mixed solution was filtered through a polypropylene-made filter having a pore size of 30 µm, thereby preparing a coating solution (HC-4) for forming a hard coat layer.

[Preparation of coating solution (HC-5) for forming a hard coat layer]

| | |
|---|---|
| "PETA" | 50.0 g |
| "IRGACURE 184" | 2.0 g |
| "SX-350" (30% by weight) | 1.7 g |
| Crosslinked acryl-styrene particle (30% by weight) | 13.3 g |
| "FP-132" | 0.75 g |
| Toluene | 38.5 g |

The foregoing mixed solution was filtered through a polypropylene-made filter having a pore size of 30 µm, thereby preparing a coating solution (HC-5) for forming a hard coat layer.

[Preparation of coating solution (HC-6) for forming a hard coat layer]

| | |
|---|---|
| "DeSolite Z7401" | 195.0 g |
| "DPHA" | 82.0 g |
| Sol solution (a-1) | 25.8 g |
| "SX-350" (30% by weight) | 1.7 g |
| MEK/cyclohexanone (50/50) | 368.0 g |

The foregoing mixed solution was filtered through a polypropylene-made filter having a pore size of 30 µm, thereby preparing a coating solution (HC-6) for forming a hard coat layer.

[Preparation of coating solution (HC-7) for forming a hard coat layer]

| | |
|---|---|
| PETA | 285.0 g |
| "IRGACURE 184" | 15.0 g |
| Sol solution (a-1) | 25.8 g |
| Coagulating silica (secondary particle system, 1.0 µm: 30% by weight) | 1.7 g |
| Fluorine based leveling agent R-30 | 0.5 g |
| Methyl isobutyl ketone | 175.0 g |

The foregoing mixed solution was filtered through a polypropylene-made filter having a pore size of 30 µm, thereby preparing a coating solution (HC-7) for forming a hard coat layer.

[Preparation of coating solution (HC-8) for forming a hard coat layer]

| | |
|---|---|
| PETA | 285.0 g |
| "IRGACURE 184" | 15.0 g |
| Coagulating silica (secondary particle system: 1.0 µm, 30% by weight) | 1.7 g |
| Fluorine based leveling agent R-30 | 0.5 g |
| Methyl isobutyl ketone | 175.0 g |

The foregoing mixed solution was filtered through a polypropylene-made filter having a pore size of 30 µm, thereby preparing a coating solution (HC-8) for forming a hard coat layer.

[Preparation of Coating Solution (HC-9) for Forming a Hard Coat Layer]

The following composition was charged in a mixing tank and stirred to prepare a coating solution for hard coat layer.

To 750.0 parts by weight of trimethylolpropane triacrylate ("VISCOAT #295", manufactured by Osaka Organic Chemical Industry Ltd.), 270.0 parts by weight of polyglycidyl methacrylate having a weight average molecular weight of 15,000, 730,0 parts by weight of methyl ethyl ketone, 500.0 parts by weight of cyclohexanone, and 50.0 parts by weight of a photopolymerization initiator ("IRGACURE 184", manufactured by Ciba Speciality Chemicals), and the mixture was stirred. The resulting mixture was filtered through a polypropylene-made filter having a pore size of 0.4 µm, thereby preparing a coating solution for hard coat layer. The polyglycidyl methacrylate was obtained by dissolving glycidyl methacrylate in methyl ethyl ketone (MEK), reacting at 80° C. for 2 hours while adding dropwise a heat polymerization initiator ("V-65", manufactured by Wako Pure Chemical Industries, Ltd.), adding dropwise the resulting reaction solution in hexane and then drying a precipitate in vacuo.

The respective compounds as used are as follows.

"PETA": Mixture of pentaerythritol triacrylate and pentaerythritol tetraacrylate, manufactured by Nippon Kayaku Co., Ltd.

"DPHA": Mixture of dipentaerythritol pentaacrylate and dipentaerythritol hexaacrylate, manufactured by Nippon Kayaku Co., Ltd.

"DeSolite Z7526": Commercially available silica-containing UV hardenable hard coat solution having a solids concentration of 72% by weight, a silica content of 38% by weight and an average particle size of 20 nm, manufactured by JSR Corporation "DeSolite Z7401": Commercially available silica-containing UV hardenable hard coat solution having a solids concentration of 70.1% by weight, a silica content of 35% by weight and an average particle size of 22 nm, manufactured by JSR Corporation Coagulating silica (secondary particle system: 1.0 µm), manufactured by Nippon Silica Industrial Co., Ltd.

Fluorine based leveling agent R-30: Commercially available product, manufactured by Dainippon Ink and Chemical, Incorporated "MEK-ST": A silica sol having an average particle size of 15 nm and a solids concentration of 30% by weight, manufactured by Nissan Chemical Industries, Ltd.

"IRGACURE 184": Photopolymerization initiator, manufactured by Ciba Specialty Chemicals "SX-350": Crosslinked polystyrene particle having an average particle size of 3.5 µm (refractive index: 1.60) as a 30% toluene dispersion, manufactured by Soken Chemical & Engineering Co., Ltd.; as used after dispersing by a Polytron dispersing machine at 10,000 rpm for 20 minutes Crosslinked acryl-styrene particle: Average particle size: 3.5 μm (refractive index: 1.55) as a 30% toluene dispersion, manufactured by Soken Chemical & Engineering Co., Ltd.

"KBM-5103": Silane coupling agent, 3-acryloyloxypropyl trimethoxysilane, manufactured by Shin-Etsu Chemical Co., Ltd.

"FP-132": Fluorine based surface modifier having the following structural formula

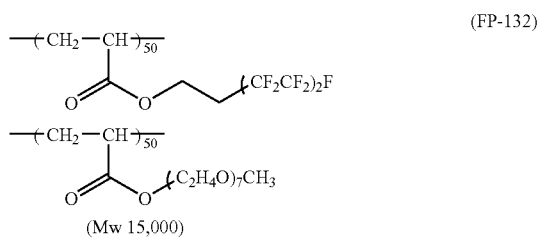

(FP-132)
(Mw 15,000)

| [Preparation of coating solution (LL-1) for forming a low refractive index layer] | |
| --- | --- |
| "Fluorine-containing heat hardening binder: H-1" | 177.0 g |
| "MEK-ST" (silica particle, 30.0% by weight) | 15.2 g |
| MEK | 116.0 g |
| Cyclohexanone | 9.0 g |

The foregoing mixed solution was filtered through a polypropylene-made filter having a pore size of 1 μm, thereby preparing a coating solution (LL-1) for forming a low refractive index layer.

| [Preparation of coating solution (LL-2) for forming a low refractive index layer] | |
| --- | --- |
| "Fluorine-containing heat hardening binder: H-1" | 177.0 g |
| "MEK-ST" (silica particle, 30.0% by weight) | 15.2 g |
| Sol solution (b-1) | 7.3 g |
| MEK | 90.0 g |
| Cyclohexanone | 9.0 g |

The foregoing mixed solution was filtered through a polypropylene-made filter having a pore size of 1 μm, thereby preparing a coating solution (LL-2) for forming a low refractive index layer.

| [Preparation of coating solution (LL-3) for forming a low refractive index layer] | |
| --- | --- |
| "Fluorine-containing heat hardening binder: H-1" | 177.0 g |
| "MEK-ST" (silica particle, 30.0% by weight) | 15.2 g |
| Sol solution (b-1) | 7.3 g |
| Initiator compound (IC-1) | 0.4 g |
| MEK | 90.0 g |
| Cyclohexanone | 9.0 g |

The foregoing mixed solution was filtered through a polypropylene-made filter having a pore size of 1 μm, thereby preparing a coating solution (LL-3) for forming a low refractive index layer.

| [Preparation of coating solution (LL-4) for forming a low refractive index layer] | |
| --- | --- |
| "Fluorine-containing heat hardening binder: H-1" | 177.0 g |
| "MEK-ST" (silica particle, 30.0% by weight) | 15.2 g |
| Sol solution (b-1) | 7.3 g |
| Initiator compound (IC-6) | 0.4 g |
| MEK | 90.0 g |
| Cyclohexanone | 9.0 g |

The foregoing mixed solution was filtered through a polypropylene-made filter having a pore size of 1 μm, thereby preparing a coating solution (LL-4) for forming a low refractive index layer.

| [Preparation of coating solution (LL-5) for forming a low refractive index layer] | |
| --- | --- |
| "Fluorine-containing heat hardening binder: H-1" | 177.0 g |
| "MEK-ST" (silica particle, 30.0% by weight) | 15.2 g |
| Sol solution (b-1) | 7.3 g |
| Initiator compound (IC-7) | 0.4 g |
| MEK | 90.0 g |
| Cyclohexanone | 9.0 g |

The foregoing mixed solution was filtered through a polypropylene-made filter having a pore size of 1 μm, thereby preparing a coating solution (LL-5) for forming a low refractive index layer.

| [Preparation of coating solution (LL-6) for forming a low refractive index layer] | |
| --- | --- |
| "Fluorine-containing heat hardening binder: H-1" | 177.0 g |
| "MEK-ST" (silica particle, 30.0% by weight) | 15.2 g |
| Sol solution (b-1) | 7.3 g |
| Initiator compound (IC-1) | 0.4 g |
| MEK | 90.0 g |
| Cyclohexanone | 9.0 g |

The foregoing mixed solution was filtered through a polypropylene-made filter having a pore size of 1 μm, thereby preparing a coating solution (LL-6) for forming a low refractive index layer.

| [Preparation of coating solution (LL-7) for forming a low refractive index layer] | |
| --- | --- |
| "Fluorine-containing heat hardening binder: H-1" | 177.0 g |
| "MEK-ST" (silica particle, 30.0% by weight) | 15.2 g |
| Sol solution (b-1) | 7.3 g |
| Initiator compound (IC-4) | 0.4 g |
| MEK | 90.0 g |
| Cyclohexanone | 9.0 g |

The foregoing mixed solution was filtered through a polypropylene-made filter having a pore size of 1 μm, thereby preparing a coating solution (LL-7) for forming a low refractive index layer.

[Preparation of coating solution (LL-8) for forming
a low refractive index layer]

| | |
|---|---|
| Photocrosslinking fluorine-containing polymer "P-3" | 9.0 g |
| "RMS-033" | 3.3 g |
| "MEK-ST" (silica particle, 30.0% by weight) | 7.34 g |
| "MP-TRIAZINE" | 0.11 g |
| Sol solution (b-1) | 1.14 g |
| Initiator compound (IC-1) | 0.06 g |
| MEK | 90.0 g |
| Cyclohexanone | 9.0 g |

The foregoing mixed solution was filtered through a polypropylene-made filter having a pore size of 1 μm, thereby preparing a coating solution (LL-8) for forming a low refractive index layer.

[Preparation of coating solution (LL-9) for
forming a low refractive index layer]

| | |
|---|---|
| Photocrosslinking fluorine-containing polymer "P-3" | 9.0 g |
| "RMS-033" | 3.3 g |
| Hollow silica dispersion (18.0% by weight) | 12.2 g |
| "MP-TRIAZINE" | 0.11 g |
| Sol solution (b-1) | 1.14 g |
| MEK | 85.0 g |
| Cyclohexanone | 5.5 g |

The foregoing mixed solution was filtered through a polypropylene-made filter having a pore size of 1 μm, thereby preparing a coating solution (LL-9) for forming a low refractive index layer.

[Preparation of coating solution (LL-10) for forming
a low refractive index layer]

| | |
|---|---|
| Photocrosslinking fluorine-containing polymer "P-3" | 9.0 g |
| "RMS-033" | 3.3 g |
| Hollow silica dispersion (18.0% by weight) | 12.2 g |
| "MP-TRIAZINE" | 0.11 g |
| Sol solution (b-1) | 1.14 g |
| Initiator compound (IC-1) | 0.04 g |
| MEK | 85.0 g |
| Cyclohexanone | 5.5 g |

The foregoing mixed solution was filtered through a polypropylene-made filter having a pore size of 1 μm, thereby preparing a coating solution (LL-10) for forming a low refractive index layer.

[Preparation of coating solution (LL-11) for forming
a low refractive index layer]

| | |
|---|---|
| Photocrosslinking fluorine-containing polymer "P-3" | 9.0 g |
| "RMS-033" | 3.3 g |
| Hollow silica dispersion (18.0% by weight) | 12.2 g |
| "MP-TRIAZINE" | 0.11 g |
| Sol solution (b-1) | 1.14 g |
| Initiator compound (IC-4) | 0.04 g |
| MEK | 85.0 g |
| Cyclohexanone | 5.5 g |

The foregoing mixed solution was filtered through a polypropylene-made filter having a pore size of 1 μm, thereby preparing a coating solution (LL-11) for forming a low refractive index layer.

(Preparation of Titanium Dioxide Fine Particle Dispersion)

A titanium dioxide fine particle containing cobalt and having been subjected to a surface treatment with aluminum hydroxide and zirconium hydroxide (MPT-129C, manufactured by Ishihara Sangyo Kaisha, Ltd., $TiO_2/CO_3O_4/Al_2O_3/ZrO_3=90.5/3.0/4.0/0.5$ (weight ratio)) was used as the titanium dioxide fine particle.

To 257.1 parts by weight of this titanium dioxide fine particle, 41.1 parts by weight of the following dispersant and 701.8 parts by weight of cyclohexanone were added, and the mixture was dispersed by a Dyno-Mill, thereby preparing a titanium dioxide dispersion having a weight average particle size of 70 nm.

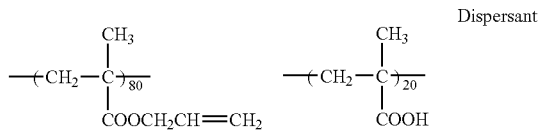

Dispersant (Preparation of Coating Solution (ML-1) for Middle Refractive Index Layer)

To 99.1 parts by weight of the foregoing titanium dioxide dispersion, 68.0 parts by weight of a mixture (DPHA) of dipentaerythritol pentaacrylate and dipentaerythritol hexaacrylate, 3.6 parts by weight of a photopolymerization initiator (IRGACURE 907), 1.2 parts by weight of a photosensitizer (KAYACURE DETX, manufactured by Nippon Kayaku Co., Ltd.), 279.6 parts by weight of methyl ethyl ketone, and 1,049.0 parts by weight of cyclohexanone were added and stirred. After thoroughly stirring, the mixture was filtered through a polypropylene-made filter having a pore size of 0.4 μm, thereby preparing a coating solution for middle refractive index layer.

(Preparation of Coating Solution (HL-1) for High Refractive Index Layer)

To 469.8 parts by weight of the foregoing titanium dioxide dispersion, 40.0 parts by weight of a mixture (DPHA) of dipentaerythritol pentaacrylate and dipentaerythritol hexaacrylate, 3.3 parts by weight of a photopolymerization initiator (IRGACURE 907, manufactured by Ciba Speciality Chemicals), 1.1 parts by weight of a photosensitizer (KAYACURE DETX, manufactured by Nippon Kayaku Co., Ltd.), 526.2 parts by weight of methyl ethyl ketone, and 459.6 parts by weight of cyclohexanone were added and stirred. The mixture was filtered through a polypropylene-made filter having a pore size of 0.4 μm, thereby preparing a coating solution for high refractive index layer.

The respective compounds as used are as follows.

"Fluorine-containing heat hardening binder H-1": Fluorine-containing heat hardening binder obtainable by dissolving 80 g of a fluorine-containing heat hardening polymer as described in Example 1 of JP-A-11-189621, 20 g of CYMEL 303 (manufactured by Nihon Cytec Industries Inc.) as a hardening agent and 2.0 g of CATALYST 4050 (manufactured by Nihon Cytec Industries Inc.) as a hardening catalyst in MEK to a concentration of 6% and having an SP value of 18.9

"P-3": Fluorine-containing copolymer (P-3) as described in JP-A-2004-45462 and having a weight average molecular weight of about 50,000 and a solids concentration of 23.8% by weight in MEK and having an SP value of 19.2

"MEK-ST-L": Silica sol having a different silica particle size from "MEK-ST" and having an average particle size of 45 nm and a solids concentration of 30% by weight, manufactured by Nissan Chemical Industries, Ltd.

Hollow silica dispersion: Hollow particle dispersion resulting from subjecting CS-60 IPA (manufactured by Catalysts & Chemicals Ind. Co., Ltd) having a refractive index: 1.31, an average particle size: 60 nm, a shell thickness 10 nm and a solids concentration of 18.2% to surface modification with "KBM-5103" (surface modification rate: 30% by weight with respect to the hollow silica)

"RMS-033": Reactive silicone resin, manufactured by Gelest, Inc.

"MP-TRIAZINE": Photopolymerization initiator, manufactured by Sanwa Chemical Co., Ltd.

[Preparation of Antireflection Film]

Examples 1-1 to 1-21 and Comparative Examples 1-1 to 1-4

Each of hard coat layers (HC-1) to (HC-8) and each of low refractive index layers (LL-1) to (LL-11) were applied in the following manner, thereby preparing antireflection film samples. A major composition and a combination of each of the layers are shown in Table 2; and a hardening condition of each of the layers is shown in Table 3.

Furthermore, a hard coat layer (HC-9), a middle refractive index layer (ML-1), a high refractive index layer (HL-1), and each of low refractive index layers (LL-9) to (LL-11) were applied in the following manner, thereby preparing antireflection film samples. A major composition and a combination of each of the layers are shown in Table 4; and a hardening condition of each of the layers is shown in Table 5.

[Application of Hard Coat Layer]

An 80 μm-thick triacetyl cellulose film "TAC-TD80U" (a trade name, manufactured by Fuji Photo Film Co., Ltd.) was wound out in a rolled state; any one of the foregoing coating solutions (HC-1) to (HC-6) for forming a hard coat layer was coated by using a microgravure roll with a gravure pattern having 180 lines per inch and a depth of 40 μm and having a diameter of 50 mm and a doctor blade under a condition at a revolution number of the gravure roll of 30 rpm and at a conveyance rate of 10 m/min; and after drying at 120° C. for 2 minutes, the coating layer was further hardened upon irradiation with ultraviolet rays having a radiation illuminance of 400 mW/cm$^2$ and an irradiation dose of 110 mJ/cm$^2$ by using an "air-cooled metal halide lamp" (manufactured by Eyegraphics Co., Ltd.) of 160 W/cm under purging with nitrogen, thereby forming hard coat layers each having a thickness of 6.0 μm, followed by winding up.

[Application (1) of Low Refractive Index Layer (Thermally Hardenable and Ionizing Radiation Hardening System)]

The foregoing triacetyl cellulose film having each hard coat layer applied thereon was again wound out; the foregoing coating solution for low refractive index layer was coated by using a microgravure roll with a gravure pattern having 180 lines per inch and a depth of 40 μm and having a diameter of 50 mm and a doctor blade under a condition at a revolution number of the gravure roll of 30 rpm and at a conveyance rate of 10 m/min; and after drying at 80° C. for 2 minutes, the coating layer was heat hardened at 110° C. for 10 minutes and further irradiated with ultraviolet rays having an irradiation dose of 300 mJ/cm$^2$ by using an "air-cooled metal halide lamp" (manufactured by Eyegraphics Co., Ltd.) of 240 W/cm under purging with nitrogen (oxygen concentration: not more than 0.5%), thereby forming a low refractive index layer having a thickness of 95 nm, followed by winding up.

[Application (2) of Low Refractive Index Layer (Ionizing Radiation Hardening System)]

The foregoing triacetyl cellulose film having each hard coat layer applied thereon was again wound out; and the foregoing coating solution for low refractive index layer was coated by using a die coater at a coating rate of 25 m/min. After drying at 120° C. for 70 seconds, the coating layer was further irradiated with ultraviolet rays having an irradiation dose of 400 mJ/cm$^2$ by using an "air-cooled metal halide lamp" (manufactured by Eyegraphics Co., Ltd.) of 240 W/cm under purging with nitrogen (oxygen concentration: not more than 0.5%), thereby forming a low refractive index layer having a thickness of 95 nm, followed by winding up.

The coating solution for middle refractive index layer, the coating solution for high refractive index layer and the coating solution for low refractive index layer were continuously coated on the hard coat layer by using a slot die coater having three coating stations.

With respect to the drying condition of the middle refractive index layer, drying was carried out at 90° C. for 30 seconds; and with respect to the ultraviolet ray hardening condition, ultraviolet rays were irradiated at a radiation illuminance of 400 mW/cm$^2$ and an irradiation dose of 400 mJ/cm$^2$ by using an air-cooled metal halide lamp (manufactured by Eyegraphics Co., Ltd.) of 180 W/cm under purging with nitrogen in an atmosphere having an oxygen concentration of not more than 1.0% by volume.

The middle refractive index layer after hardening had a refractive index of 1.630 and a thickness of 67 nm.

With respect to the drying condition of the high refractive index layer, drying was carried out at 90° C. for 30 seconds; and with respect to the ultraviolet ray hardening condition, ultraviolet rays were irradiated at a radiation illuminance of 600 mW/cm$^2$ and an irradiation dose of 400 mJ/cm$^2$ by using an air-cooled metal halide lamp (manufactured by Eyegraphics Co., Ltd.) of 240 W/cm under purging with nitrogen in an atmosphere having an oxygen concentration of not more than 1.0% by volume.

The high refractive index layer after hardening had a refractive index of 1.905 and a thickness of 107 nm.

With respect to the drying condition of the low refractive index layer, drying was carried out at 90° C. for 30 seconds; and with respect to the ultraviolet ray hardening condition, ultraviolet rays were irradiated at a radiation illuminance of 600 mW/cm$^2$ and an irradiation dose of 600 mJ/cm$^2$ by using an air-cooled metal halide lamp (manufactured by Eyegraphics Co., Ltd.) of 240 W/cm under purging with nitrogen in an atmosphere having an oxygen concentration of not more than 0.1% by volume.

The low refractive index layer after hardening had a refractive index of 1.380 and a thickness of 85 nm.

[Evaluation of Antireflection Film Sample]

Each of the thus obtained antireflection film samples was evaluated with respect to the following items. The results are shown in Tables 3 and 5.

(Mirror Reflectance)

With respect to the measurement of mirror reflectance, by using a spectrophotometer "V-550" (manufactured by JASCO Corporation) having an adaptor "ARV-474" installed therein, a mirror reflectance at each of an incident angle of 5° and an outgoing angle of −5° is measured in a wavelength region of from 380 to 780 nm, and an average reflectance at from 450 to 650 nm is calculated, thereby evaluating antireflection properties.

(Pencil Hardness)

Pencil hardness was evaluated according to JIS K5600-5-8.

After humidity control at temperature of 25° C. and at 60% RH for 2 hours, the antireflection film was evaluated under a load of 500 g according to the following criteria by using pencils for test of from H to 5H as defined in JIS S-6006. The highest hardness at which the evaluation is "OK" was defined as an evaluation value.

OK: No scar or one scar is found in the evaluation of n=5.
NG: Three or more scars are found in the evaluation of n=5.
(Rubbing Resistance by Steel Wool)

The antireflection film was rubbed by a #0000 steel wool by ten reciprocations while applying a load of 200 g/cm$^2$, and the state of scar was observed, thereby evaluating it according to the following criteria.

A: No scar is formed at all.

B: Scars which are not substantially visible are slightly formed.

C: Scars which are distinctly visible are formed.

D: Scars which are distinctly visible are remarkably formed.

DD: Peeling of the time is generated.

TABLE 2

| | | Antireflection film Coating solution for forming each layer | | | | |
|---|---|---|---|---|---|---|
| | | Hard coat layer | | | Low refractive index layer | |
| | | Hardenable compound | | | | |
| | Sample No. | No. | Photohardenable compound | Sol component | No. | Binder polymer |
| Comparative Example 1-1 | 101 | HC-3 | DPHA | a-1 | LL-1 | H-1 |
| Comparative Example 1-2 | 102 | HC-3 | DPHA | a-1 | LL-2 | H-1 |
| Example 1-1 | 103 | HC-3 | DPHA | a-1 | LL-3 | H-1 |
| Example 1-2 | 104 | HC-3 | DPHA | a-1 | LL-4 | H-1 |
| Example 1-3 | 105 | HC-3 | DPHA | a-1 | LL-5 | H-1 |
| Example 1-4 | 106 | HC-3 | DPHA | a-1 | LL-6 | H-1 |
| Example 1-5 | 107 | HC-3 | DPHA | a-1 | LL-7 | H-1 |
| Example 1-6 | 201 | HC-1 | DPHA | — | LL-6 | H-1 |
| Example 1-7 | 202 | HC-2 | Z7526 | — | LL-6 | H-1 |
| Example 1-8 | 203 | HC-4 | PETA | — | LL-6 | H-1 |
| Example 1-9 | 204 | HC-5 | PETA | — | LL-6 | H-1 |
| Example 1-10 | 205 | HC-6 | Z7401/DPHA | a-1 | LL-6 | H-1 |

| | Antireflection film Coating solution for forming each layer Low refractive index layer | | | | | |
|---|---|---|---|---|---|---|
| | Hardenable compound | | | | | |
| | Sol component | | | Polymerization initiator | | |
| | Kind | SP value | Others | Kind | SP value | Others |
| Comparative Example 1-1 | — | — | — | — | — | — |
| Comparative Example 1-2 | b-1 | 22.4 | — | — | — | — |
| Example 1-1 | b-1 | 22.4 | — | IC-1 | 29.1 | — |
| Example 1-2 | b-1 | 22.4 | — | IC-6 | 24 | — |
| Example 1-3 | b-1 | 22.4 | — | IC-7 | >20 | — |
| Example 1-4 | b-1 | 22.4 | — | IC-8 | 29.1 | — |
| Example 1-5 | b-1 | 22.4 | — | IC-4 | 24.3 | — |
| Example 1-6 | b-1 | 22.4 | — | IC-1 | 29.1 | — |
| Example 1-7 | b-1 | 22.4 | — | IC-1 | 29.1 | — |
| Example 1-8 | b-1 | 22.4 | — | IC-1 | 29.1 | — |
| Example 1-9 | b-1 | 22.4 | — | IC-1 | 29.1 | — |
| Example 1-10 | b-1 | 22.4 | — | IC-1 | 29.1 | — |

| | | Antireflection film Coating solution for forming each layer | | | | |
|---|---|---|---|---|---|---|
| | | Hard coat layer | | | Low refractive index layer | |
| | | Hardenable compound | | | | |
| | Sample No. | No. | Photohardenable compound | Sol component | No. | Binder polymer |
| Example 1-11 | 301 | HC-3 | DPHA | a-1 | LL-8 | P-3 |
| Comparative Example 1-3 | 302 | HC-3 | DPHA | a-1 | LL-9 | P-3 |
| Example 1-12 | 303 | HC-3 | DPHA | a-1 | LL-10 | P-3 |
| Example 1-13 | 401 | HC-1 | DPHA | — | LL-10 | P-3 |
| Example 1-14 | 402 | HC-2 | Z7526 | — | LL-10 | P-3 |
| Example 1-15 | 403 | HC-4 | PETA | — | LL-10 | P-3 |

TABLE 2-continued

| | | | | | | | |
|---|---|---|---|---|---|---|---|
| Example 1-16 | 404 | HC-5 | PETA | — | LL-10 | P-3 | |
| Example 1-17 | 405 | HC-1 | PETA | — | LL-11 | P-3 | |
| Example 1-18 | 406 | HC-7 | PETA | a-1 | LL-6 | H-1 | |
| Example 1-19 | 407 | HC-8 | PETA | — | LL-6 | H-1 | |

| | Antireflection film Coating solution for forming each layer Low refractive index layer | | | | | |
|---|---|---|---|---|---|---|
| | Hardenable compound | | | | | |
| | Sol component | | | Polymerization initiator | | |
| | Kind | SP value | Others | Kind | SP value | Others |
| Example 1-11 | b-1 | 22.4 | PMS | IC-1 | 29.1 | MPTZ |
| Comparative Example 1-3 | b-1 | 22.4 | PMS | — | — | MPTZ |
| Example 1-12 | b-1 | 22.4 | PMS | IC-1 | 29.1 | MPTZ |
| Example 1-13 | b-1 | 22.4 | PMS | IC-1 | 29.1 | MPTZ |
| Example 1-14 | b-1 | 22.4 | PMS | IC-1 | 29.1 | MPTZ |
| Example 1-15 | b-1 | 22.4 | PMS | IC-1 | 29.1 | MPTZ |
| Example 1-16 | b-1 | 22.4 | PMS | IC-1 | 29.1 | MPTZ |
| Example 1-17 | b-1 | 22.4 | PMS | IC-4 | 24.3 | MPTZ |
| Example 1-18 | b-1 | 22.4 | PMS | IC-1 | 29.1 | — |
| Example 1-19 | b-1 | 22.4 | PMS | IC-1 | 29.1 | — |

TABLE 3

| | Application condition of each layer | | | | |
|---|---|---|---|---|---|
| | | Hard coat layer | | Low refractive index layer | |
| | Sample No. | No. | Irradiation dose of ultraviolet rays (mJ/cm$^2$) | No. | Application method |
| Comparative Example 1-1 | 101 | HC-3 | 110 | LL-1 | 1 |
| Comparative Example 1-2 | 102 | HC-3 | 110 | LL-2 | 1 |
| Example 1-1 | 103 | HC-3 | 110 | LL-3 | 1 |
| Example 1-2 | 104 | HC-3 | 110 | LL-4 | 1 |
| Example 1-3 | 105 | HC-3 | 110 | LL-5 | 1 |
| Example 1-4 | 106 | HC-3 | 110 | LL-6 | 1 |
| Example 1-5 | 107 | HC-3 | 110 | LL-7 | 1 |
| Example 1-6 | 201 | HC-1 | 110 | LL-6 | 1 |
| Example 1-7 | 202 | HC-2 | 110 | LL-6 | 1 |
| Example 1-8 | 203 | HC-4 | 110 | LL-6 | 1 |
| Example 1-9 | 204 | HC-5 | 110 | LL-6 | 1 |
| Example 1-10 | 205 | HC-6 | 110 | LL-6 | 1 |

| | Application condition of each layer | | Characteristics | | |
|---|---|---|---|---|---|
| | Hard coat layer | | | | |
| | Heating condition | Irradiation dose of ultraviolet rays (mJ/cm$^2$) | Average reflectance (%) | Pencil hardness | Scar resistance Steel wool |
| Comparative Example 1-1 | 110° C., 10 minutes | 300 | 2.75 | 3H | DD |
| Comparative Example 1-2 | 110° C., 10 minutes | 300 | 2.65 | 3H | C to B |
| Example 1-1 | 110° C., 10 minutes | 300 | 2.67 | 4H | A |
| Example 1-2 | 110° C., 10 minutes | 300 | 2.75 | 4H | A |
| Example 1-3 | 110° C., 10 minutes | 300 | 2.81 | 4H | A |
| Example 1-4 | 110° C., 10 minutes | 300 | 2.71 | 4H | A |
| Example 1-5 | 110° C., 10 minutes | 300 | 2.65 | 4H | A |
| Example 1-6 | 110° C., 10 minutes | 300 | 2.71 | 4H | A |
| Example 1-7 | 110° C., 10 minutes | 300 | 2.71 | 4H | A |
| Example 1-8 | 110° C., 10 minutes | 300 | 2.72 | 4H | A |
| Example 1-9 | 110° C., 10 minutes | 300 | 2.71 | 4H | A |
| Example 1-10 | 110° C., 10 minutes | 300 | 2.71 | 4H | A |

TABLE 3-continued

| | | Application condition of each layer | | | |
|---|---|---|---|---|---|
| | | Hard coat layer | | Low refractive index layer | |
| | Sample No. | No. | Irradiation dose of ultraviolet rays (mJ/cm²) | No. | Application method |
| Example 1-11 | 301 | HC-3 | 110 | LL-8 | 2 |
| Comparative Example 1-3 | 302 | HC-3 | 110 | LL-9 | 2 |
| Example 1-12 | 303 | HC-3 | 110 | LL-10 | 2 |
| Example 1-13 | 401 | HC-1 | 110 | LL-10 | 2 |
| Example 1-14 | 402 | HC-2 | 110 | LL-10 | 2 |
| Example 1-15 | 403 | HC-4 | 110 | LL-10 | 2 |
| Example 1-16 | 404 | HC-5 | 110 | LL-10 | 2 |
| Example 1-17 | 405 | HC-1 | 110 | LL-11 | 2 |
| Example 1-18 | 406 | HC-7 | 110 | LL-6 | 1 |
| Example 1-19 | 407 | HC-8 | 110 | LL-6 | 1 |

| | Application condition of each layer Hard coat layer | | Characteristics | | |
|---|---|---|---|---|---|
| | Heating condition | Irradiation dose of ultraviolet rays (mJ/cm²) | Average reflectance (%) | Pencil hardness | Scar resistance Steel wool |
| Example 1-11 | — | 400 | 2.75 | 4H | A |
| Comparative Example 1-3 | — | 400 | 1.50 | 4H | C to B |
| Example 1-12 | — | 400 | 1.51 | 4H | A |
| Example 1-13 | — | 400 | 1.51 | 4H | A |
| Example 1-14 | — | 400 | 1.52 | 4H | A |
| Example 1-15 | — | 400 | 1.51 | 4H | A |
| Example 1-16 | — | 400 | 1.51 | 4H | A |
| Example 1-17 | — | 400 | 1.51 | 4H | A |
| Example 1-18 | 110° C., 10 minutes | 300 | 2.71 | 4H | A |
| Example 1-19 | 110° C., 10 minutes | 300 | 2.72 | 4H | A |

TABLE 4

| | Antireflection film | | | | | |
|---|---|---|---|---|---|---|
| | Coating solution for forming each layer | | | | | |
| | Sample No. | Hard coat layer No. | Middle refractive index layer No. | High refractive index layer No. | Low refractive index layer No. | Binder polymer |
| Comparative Example 1-4 | 501 | HC-9 | ML-1 | HL-1 | LL-9 | P-3 |
| Example 1-20 | 502 | HC-9 | ML-1 | HL-1 | LL-10 | P-3 |
| Example 1-21 | 503 | HC-9 | ML-1 | HL-1 | LL-11 | P-3 |

| | Antireflection film Coating solution for forming each layer Low refractive index layer | | | | | |
|---|---|---|---|---|---|---|
| | Hardenable compound | | | | | |
| | Sol component | | | Polymerization initiator | | |
| | Kind | SP value | Others | Kind | SP value | Others |
| Comparative Example 1-4 | b-1 | 22.4 | RMS | — | — | MPTZ |
| Example 1-20 | b-1 | 22.4 | PMS | IC-1 | 29.1 | MPTZ |
| Example 1-21 | b-1 | 22.4 | PMS | IC-4 | 24.3 | MPTZ |

TABLE 5

| | | Application condition of each layer | | | | |
|---|---|---|---|---|---|---|
| | | Hard coat layer | | | | |
| | Sample No. | No. | Irradiation dose of ultraviolet rays (mJ/cm²) | Middle refractive index layer | High refractive index layer | Low refractive index layer No. |
| Comparative Example 1-4 | 501 | HC-9 | 110 | ML-1 | HL-1 | LL-9 |
| Example 1-20 | 502 | HC-9 | 110 | ML-1 | HL-1 | LL-10 |
| Example 1-21 | 503 | HC-1 | 110 | ML-1 | HL-1 | LL-11 |

| | Application condition of each layer Low refractive index layer | | | Characteristics | | |
|---|---|---|---|---|---|---|
| | Application method | Heating condition | Irradiation dose of ultraviolet rays (mJ/cm²) | Average reflectance (%) | Pencil hardness | Scar resistance Steel wool |
| Comparative Example 1-4 | 1 | — | 400 | 0.32 | 4H | C to B |
| Example 1-20 | 1 | — | 400 | 0.32 | 4H | A |
| Example 1-21 | 1 | — | 400 | 0.32 | 4H | A |

It is understood that by using an initiator compound of the invention and an organosilane sol solution which is a hardenable compound, the resulting antireflection film becomes a film having excellent scar resistance while possessing sufficient antireflection performance.

Furthermore, Sample 106 in the foregoing tables was measured by TOF-SIMS, the measure method of which is described previously, an image was drawn by the mass number inherent to the raw material, and the distribution within a film was evaluated. As a result, an Si element as derived from the organosilane sol compound and a Cl element as derived from the initiator (IC-1) were not detected from the surface of the low refractive index layer of Sample 106. On the other hand, the both elements were detected in a stratiform state from the side of the hard coat layer of the subject low refractive index layer (lower layer of the subject low refractive index layer). It has become clear from this matter that the fluorine-containing binder polymer was localized in an upper part of the low refractive index layer, whereas the organosilane sol compound and the polymerization initiator of the invention were localized in a lower part of the low refractive index layer.

Examples 2-1 to 2-19 and Comparative Examples 2-1 to 2-3

Samples 101-1 to 407-1 were prepared in the same manner, except that in the application of a low refractive index layer in the preparation method of Samples 101 to 407 of Examples 1-1 to 1-19 and Comparative Examples 1-1 to 1-3, only the irradiation dose of ultraviolet rays was changed as shown in the following Table 6, and were evaluated in the same manner.

The irradiation dose of ultraviolet rays was adjusted by changing the quantity of light emission of an ultraviolet ray source or the coating rate.

TABLE 6

| | | Application condition of each layer | | | | | | | |
|---|---|---|---|---|---|---|---|---|---|
| | | Hard coat layer | | Low refractive index layer | | | Characteristics | | |
| | Sample No. | No. | Irradiation dose of ultraviolet rays (mJ/cm²) | No. | Heating condition | Irradiation dose of ultraviolet rays (mJ/cm²) | Average reflectance (%) | Pencil hardness | Scar resistance Steel wool |
| Comparative Example 2-1 | 101-1 | HC-3 | 110 | LL-1 | 110° C., 10 minutes | 50 | 2.75 | 3H | DD |
| Comparative Example 2-2 | 102-1 | HC-3 | 110 | LL-2 | 110° C., 10 minutes | 50 | 2.65 | 3H | DD |
| Example 2-1 | 103-1 | HC-3 | 110 | LL-3 | 110° C., 10 minutes | 50 | 2.67 | 4H | A |
| Example 2-2 | 104-1 | HC-3 | 110 | LL-4 | 110° C., 10 minutes | 50 | 2.75 | 4H | A |
| Example 2-3 | 105-1 | HC-3 | 110 | LL-5 | 110° C., 10 minutes | 50 | 2.81 | 4H | B |
| Example 2-4 | 106-1 | HC-3 | 110 | LL-6 | 110° C., 10 minutes | 50 | 2.71 | 4H | B |
| Example 2-5 | 107-1 | HC-3 | 110 | LL-7 | 110° C., 10 minutes | 50 | 2.65 | 4H | B |

TABLE 6-continued

| | | Application condition of each layer | | | | | | |
|---|---|---|---|---|---|---|---|---|
| | | Hard coat layer | | Low refractive index layer | | | | |
| | | | Irradiation dose of ultraviolet rays (mJ/cm²) | | | Irradiation dose of ultraviolet rays (mJ/cm²) | Characteristics | | |
| | Sample No. | No. | | No. | Heating condition | | Average reflectance (%) | Pencil hardness | Scar resistance Steel wool |
|---|---|---|---|---|---|---|---|---|---|
| Example 2-6 | 201-1 | HC-1 | 110 | LL-6 | 110° C., 10 minutes | 50 | 2.71 | 4H | B |
| Example 2-7 | 202-1 | HC-2 | 110 | LL-6 | 100° C., 10 minutes | 50 | 2.71 | 3H | B |
| Example 2-8 | 203-1 | HC-4 | 110 | LL-6 | 110° C., 10 minutes | 50 | 2.72 | 3H | B |
| Example 2-9 | 204-1 | HC-5 | 110 | LL-6 | 110° C., 10 minutes | 50 | 2.71 | 3H | B |
| Example 2-10 | 205-1 | HC-6 | 110 | LL-6 | 110° C., 10 minutes | 50 | 2.71 | 3H | B |
| Example 2-11 | 301-1 | HC-3 | 110 | LL-8 | — | 50 | 2.75 | 3H | A |
| Comparative Example 2-3 | 302-1 | HC-3 | 110 | LL-9 | — | 50 | 1.50 | 4H | DD |
| Example 2-12 | 303-1 | HC-3 | 110 | LL-10 | — | 50 | 1.51 | 3H | A |
| Example 2-13 | 401-1 | HC-1 | 110 | LL-10 | — | 50 | 1.51 | 4H | B |
| Example 2-14 | 402-1 | HC-2 | 110 | LL-10 | — | 50 | 1.52 | 4H | B |
| Example 2-15 | 403-1 | HC-4 | 110 | LL-10 | — | 50 | 1.51 | 3H | A |
| Example 2-16 | 404-1 | HC-5 | 110 | LL-10 | — | 50 | 1.51 | 4H | A |
| Example 2-17 | 405-1 | HC-1 | 110 | LL-11 | — | 50 | 1.51 | 4H | A |
| Example 2-18 | 406-1 | HC-7 | 110 | LL-6 | 110° C., 10 minutes | 50 | 2.71 | 4H | A |
| Example 2-19 | 407-1 | HC-8 | 110 | LL-6 | 110° C., 10 minutes | 50 | 2.72 | 4H | A |

It is understood that by using an initiator compound of the invention and an organosilane sol solution which is a hardenable compound, even the antireflection film resulting from reducing the irradiation dose of ultraviolet rays to ⅛ keeps the scar resistance while possessing sufficient antireflection performance, and therefore, it is clear that such an antireflection film is also advantageous in view of high-speed productivity.

<Preparation of Protective Film for Polarizing Plate>

Example 3

A 1.5 moles/L sodium hydroxide aqueous solution was kept at 50° C. to prepare a saponification solution. In addition, a 0.005 moles/L dilute sulfuric acid aqueous solution was prepared.

With respect to each of the antireflection films as prepared in Examples 1 and 2, the surface of the transparent support in the opposite side to the side at which the antireflection film had the low reflective index layer was subjected to a saponification treatment with the foregoing saponification solution. Next, the sodium hydroxide aqueous solution on the surface of the transparent support having been subjected to a saponification treatment was thoroughly washed with water and then washed with the foregoing dilute sulfuric acid aqueous solution. In addition, the dilute sulfuric acid aqueous solution was thoroughly washed with water, and the antireflection film was thoroughly dried at 100° C.

The surface of the transparent support of the antireflection film in the side to which the saponification treatment had been applied was evaluated with respect to a contact angle against water. As a result, the contact angle was found to be not more than 40°. There was thus prepared a protective film for polarizing plate.

[Preparation of Polarizing Plate]
[Preparation of Polarizing Film]

A 75 μm-thick polyvinyl alcohol film (manufactured by Kuraray Co., Ltd.) was dipped in an aqueous solution made of 1,000 parts by weight of water, 7 parts by weight of iodine and 105 parts by weight of potassium iodide for 5 minutes, thereby adsorbing iodine thereonto. Next, this film was uniaxially stretched 4.4 times in a longitudinal direction in a 4% by weight boric acid aqueous solution and then dried in a tense state, thereby preparing a polarizing film.

The saponified triacetyl cellulose surface of the foregoing antireflection film having been subjected to a saponification treatment (protective film for polarizing plate) was stuck on one surface of the polarizing film by using a polyvinyl alcohol based adhesive as an adhesive. In addition, a triacetyl cellulose film having been subjected to a saponification treatment in the same manner was stuck on the other surface of the polarizing film by using the same polyvinyl alcohol based adhesive.

[Evaluation in Display Device]

Transmission type, reflection type or semi-transmission type liquid crystal display devices of each of TN, STN, IPS, VA and OCB modes, in which each of the thus prepared polarizing plates of Example 3 using the antireflection film of the invention was installed in such a manner that the antireflection film became an outermost surface of a display, were excellent in antireflection performance and extremely excellent in visibility. In particular, effects thereof were remarkable in the VA mode.

Example 4

[Preparation of Polarizing Plate]

With respect to "WIDE VIEW FILM SA12B" (manufactured by Fuji Photo Film Co., Ltd.) which is an optical compensating film having an optical compensating layer, a surface thereof in the opposite side at which the optical compensating layer was located was subjected to a saponification treatment under the same condition as in Example 3.

The saponified surface of each of the antireflection films (protective films for polarizing plate) as prepared in Examples 1 and 2 was stuck on one surface of the polarizing film as prepared in Example 3 by using a polyvinyl alcohol based adhesive as an adhesive. In addition, the surface of the foregoing saponified optical compensating film in the opposite side to the side at which the optical compensating layer was located was stuck on the other surface of the polarizing film by using the same polyvinyl alcohol based adhesive.

[Evaluation in Display Device]

Transition type, reflection type or semi-transmission type liquid crystal display devices of each of TN, STN, IPS, VA and OCB modes, in which each of the thus prepared polarizing plates of Example 4 using the antireflection film of the invention was installed in such a manner that the antireflection film became an outermost surface of a display, were excellent in contrast in a bright room, very wide in viewing angle up and down, left and right, excellent in antireflection performance and extremely excellent in visibility and display quality in comparison with liquid crystal display devices installed with a polarizing plate not using an optical compensating film. In particular, effects thereof were remarkable in the VA mode.

This application is based on Japanese Patent application JP 2005-340630, filed Nov. 25, 2005, the entire content of which is hereby incorporated by reference, the same as if set forth at length.

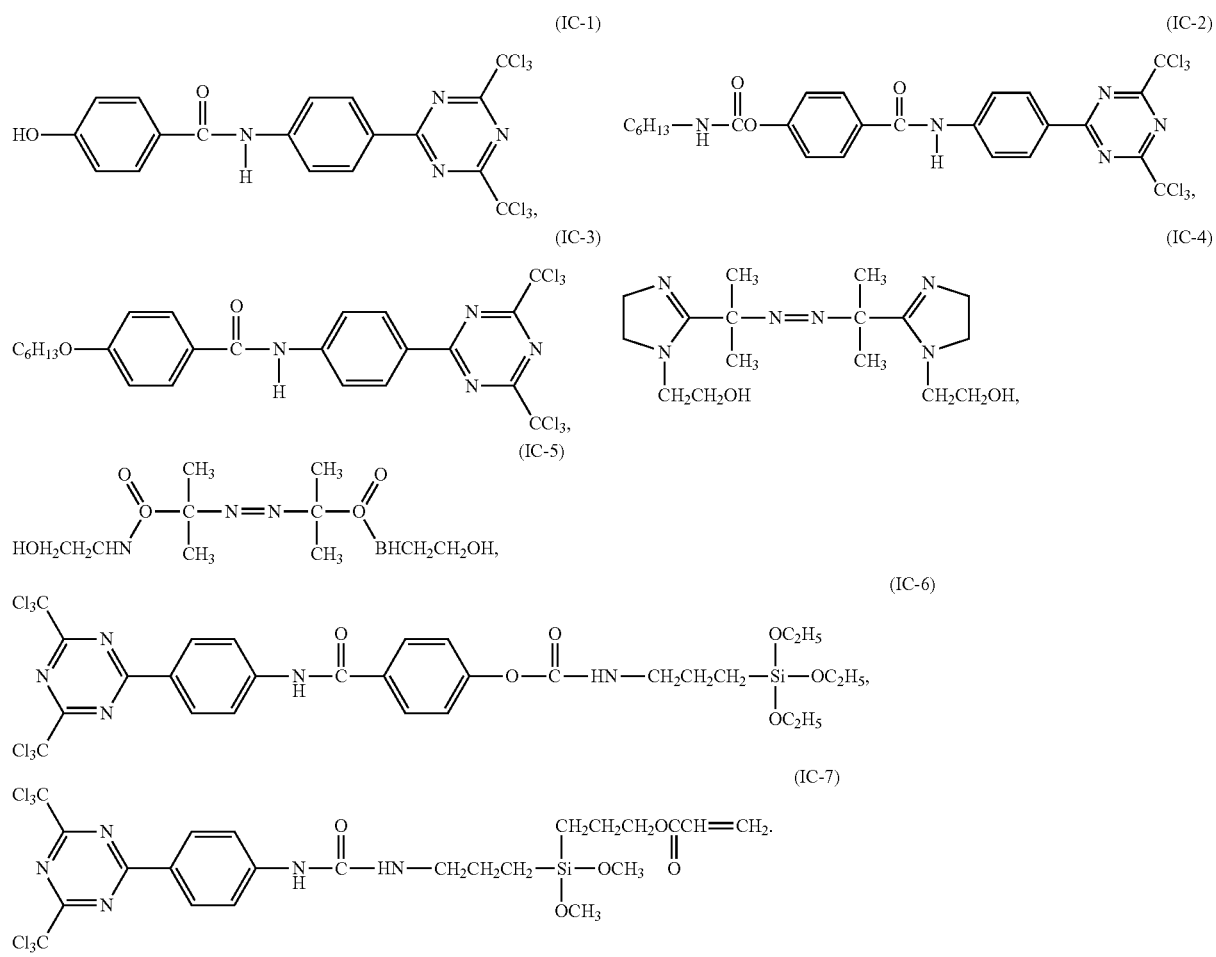

What is claimed is:

1. An antireflection film comprising a transparent support, a hard coat layer and a low refractive index layer, wherein the low refractive index layer is formed with a composition containing a binder polymer, a polymerization initiator and an ethylenically unsaturated group-containing hardenable compound,
   wherein a solubility parameter value of each of the polymerization initiator and the hardenable compound is larger than that of the binder polymer, and
   wherein the solubility parameter value of the polymerization initiator ranges from 24 to 29.1.

2. The antireflection film according to claim 1, wherein the polymerization initiator and the hardenable compound are localized and hardened in a lower part of the low refractive index layer.

3. The antireflection film according to claim 1, wherein the polymerization initiator is at least one of a thermally decomposable initiator and a photodecomposable initiator.

4. The antireflection film according to claim 1, wherein the binder polymer is at least one of a thermally hardenable fluorine-containing polymer and an ionizing radiation hardenable fluorine-containing polymer, and the hardenable compound is a non-fluorine compound.

5. The antireflection film according to claim 4, wherein the binder polymer is a thermally hardenable fluorine-containing polymer.

6. The antireflection film according to claim 1, wherein the hardenable compound is at least one of a hydrolyzate of an organosilane and a partial condensate of the hydrolyzate.

7. The antireflection film according to claim 1, wherein the low refractive index layer contains a compound in which the hardenable compound and the polymerization initiator are intramolecularly connected to each other.

8. The antireflection film according to claim 1, wherein the low refractive index layer contains an inorganic filler selected from the group consisting of a silica particle and a hollow silica particle.

9. A process for producing an antireflection film according to claim 1, which comprises:
   coating the composition;
   drying the coated composition; and
   hardening the dried composition upon irradiation with ionizing radiations under an atmosphere having an oxygen concentration of not more than 3% by volume.

10. The process according to claim 9, which comprises:
    coating the composition;
    drying the coated composition;
    thermally hardening the dried composition; and
    hardening the thermally hardened composition upon irradiation with ionizing radiations under an atmosphere having an oxygen concentration of not more than 3% by volume.

11. A polarizing plate comprising two protective films and a polarizing film provided between the protective films, wherein at least one of the protective films is an antireflection film produced by the process according to claim 9.

12. A display device comprising the antireflection film produced by the process according to claim 9, wherein the low refractive index layer is provided in a viewing side of the display device.

13. A polarizing plate comprising two protective films and a polarizing film provided between the protective films, wherein at least one of the protective films is the antireflection film according to claim 1.

14. A display device comprising the polarizing plate according to claim 13, wherein the low refractive index layer is provided in a viewing side of the display device.

15. A display device comprising the antireflection film according to claim 1, wherein the low refractive index layer is provided in a viewing side of the display device.

16. The antireflection film according to claim 1, wherein the polymerization initiator is selected from the group consisting of acetophenone, benzoin, benzophenone, phosphine oxide, ketal, anthraquinone, thioxanthone, azo compound, peroxide, 2,3-dialkyldione compound, disulfide compound, fluoroamine compound, aromatic sulfonium, onium salt, borate salt, active halides, organic or inorganic peroxide and organic azo or diazo compound.

17. The antireflection film according to claim 1, wherein the polymerization initiator is represented by at least one of formulae (IC-1), (IC-2), (IC-3), (IC-4), (IC-5), (IC-6) and (IC-8):